(12) United States Patent
Mazzola et al.

(10) Patent No.: US 12,190,201 B2
(45) Date of Patent: Jan. 7, 2025

(54) QUANTUM RESOURCE ESTIMATION USING A RE-PARAMETERIZATION METHOD

(71) Applicants: International Business Machines Corporation, Armonk, NY (US); Goldman Sachs & Co. LLC, New York, NY (US)

(72) Inventors: Guglielmo Mazzola, Zurich (CH); Stefan Woerner, Zurich (CH); Rajiv Krishnakumar, Geneva (CH); William Joseph Zeng, New York, NY (US); Nikitas Stamatopoulos, New York, NY (US); Shouvanik Chakrabarti, Hyattsville, MD (US)

(73) Assignees: INTERNATIONAL BUSINESS MACHINES CORPORATION, Armonk, NY (US); Goldman Sachs & Co. LLC, New York, NY (US)

( * ) Notice: Subject to any disclaimer, the term of this patent is extended or adjusted under 35 U.S.C. 154(b) by 1061 days.

(21) Appl. No.: 17/110,900

(22) Filed: Dec. 3, 2020

(65) Prior Publication Data

US 2022/0188679 A1 Jun. 16, 2022

(51) Int. Cl.
*G06N 10/00* (2022.01)
*G06F 17/18* (2006.01)
*G06N 7/08* (2006.01)

(52) U.S. Cl.
CPC ............. *G06N 10/00* (2019.01); *G06F 17/18* (2013.01); *G06N 7/08* (2013.01)

(58) Field of Classification Search
CPC ........ G06N 10/00; G06N 10/20; G06N 10/60; G06N 3/047; G06Q 40/06
See application file for complete search history.

(56) References Cited

U.S. PATENT DOCUMENTS

| 10,810,665 | B2 | 10/2020 | Woerner et al. | |
|---|---|---|---|---|
| 2018/0336015 | A1* | 11/2018 | Roetteler | G06F 7/721 |
| 2020/0394537 | A1* | 12/2020 | Wang | G06N 10/00 |

FOREIGN PATENT DOCUMENTS

WO 2019/177951 A1 9/2019

OTHER PUBLICATIONS

Eldar et al., "Local Hamiltonians Whose Ground States are Hard to Approximate," arXiv (2016)) (Year: 2016).*

(Continued)

*Primary Examiner* — Kakali Chaki
*Assistant Examiner* — Kevin L. Smith
(74) *Attorney, Agent, or Firm* — Amin, Turocy & Watson, LLP

(57) ABSTRACT

Systems, computer-implemented methods, and computer program products to facilitate estimation of quantum resources to calculate an expectation value of a stochastic process using a re-parameterization method are provided. According to an embodiment, a system can comprise a processor that executes computer executable components stored in memory. The computer executable components can comprise a re-parameterization component that applies a quantum fault-tolerant operation to a variationally prepared quantum state corresponding to a probability distribution to produce a quantum state corresponding to a target probability distribution. The computer executable components can further comprise an estimation component that estimates at least one defined criterion of a quantum computer to be used to compute an expectation value of a stochastic process associated with the target probability distribution.

20 Claims, 19 Drawing Sheets

(56) References Cited

OTHER PUBLICATIONS

Gao et al., "A quantum machine learning algorithm based on generative models," Sci. Adv. (2018) (Year: 2018).*
Stamatopoulos et al., "Option Pricing using Quantum Computers," arXiv (2019) (Year: 2019).*
Nikitas Stamatopoulos, "Option Pricing using Quantum Computers," YouTube generated transcript of presentation at Q2B 2019 (Feb. 2020) <https://www.youtube.com/watch?v=_e0TndqTxbo> (Year: 2020).*
Tang et al., "Quantum Computation for Pricing the Collateral Debt Obligations," arXiv (Aug. 6, 2020) (Year: 2020).*
Mell et al., "The NIST Definition of Cloud Computing," Recommendations of the National Institute of Standards and Technology, NIST Special Publication 800-145, Sep. 2011, 7 pages.
Aaronson et al., "Quantum Approximate Counting, Simplified," Symposium on Simplicity in Algorithms, arXiv:1908.10846v5 [quant-ph], 2020, 13 pages.
Bhaskar et al., "Quantum Algorithms and Circuits for Scientific Computing," Quantum Information and Computation 16, No. 3 & 4, arXiv:1511.08253 [quant-ph], 2016, 43 pages.
Black et al., "The pricing of options and corporate liabilities," The Journal of Political Economy, vol. 81, No. 3, May-Jun. 1973, 19 pages.
Brassard et al., "Quantum Amplitude Amplification and Estimation," Contemporary Mathematics, arXiv:quant-ph/0005055, 2002, 32 pages.
Cuccaro et al., "A new quantum ripple-carry addition circuit," arXiv:quant-ph/0410184, 2004, 9 pages.
Dawson et al., "The Solovay-Kitaev Algorithm," Quantum Information and Computation, arXiv:quant-ph/0505030, 2005, 15 pages.
Draper et al., "A logarithmic-depth quantum carry-lookahead adder," Quant. Inf. Comp. vol. 6, No. 4-5, arXiv:quant-ph/0406142, 2006, 21 pages.
Egger et al., "Credit risk analysis using quantum computers," arXiv:1907.03044v1 [quant-ph], 2019, 8 pages.
Gidney, "Asymptotically efficient quantum karatsuba multiplication," arXiv:1904.07356v1 [quant-ph], 2019, 11 pages.
Grover et al., "Creating superpositions that correspond to efficiently integrable probability distributions," arXiv:quant-ph/0208112, 2002, 2 pages.
Haner et al., "Optimizing quantum circuits for arithmetic," arXiv:1805.12445v1 [quant-ph], 2018, 12 pages.
Holmes et al., "Efficient Quantum Circuits for Accurate State Preparation of Smooth, Differentiable Functions," arXiv:2005.04351v1 [quant-ph], 2020, 12 pages.
Kaneko et al., "Quantum pricing with a smile: Implementation of local volatility model on quantum computer," arXiv:2007.01467v1 [quant-ph], 2020, 29 pages.
McArdle et al., "Variational ansatz-based quantum simulation of imaginary time evolution," Nature Partner Journals, Quantum Information, 2019, 6 pages.
Montanaro et al., "Quantum speedup of monte carlo methods," Proceedings of the Royal Society A: Mathematical, Physical and Engineering Sciences, 2015, 20 pages.
Muñoz-Coreas et al., "T-count and Qubit Optimized Quantum Circuit Design of the Non-Restoring Square Root Algorithm," J. Emerg. Technol. Comput. Syst., arXiv:1712.08254v3 [quant-ph], Oct. 2018, 16 pages.
Nakaji, "Faster amplitude estimation," arXiv:2003.02417v3 [quant-ph], 2020, 13 pages.
Parent et al., "Improved reversible and quantum circuits for karatsuba-based integer multiplication," arXiv:1706.03419v1 [quant-ph], 2017, 16 pages.
Peruzzo et al,, "A variational eigenvalue solver on a photonic quantum processor," Nature Communications, 2014, 7 pages.
Plesch et al., "Quantum State Preparation with Universal Gate Decompositions," Physical Review A, arXiv: 1003.5760v2 [quant-ph], 2011, 5 pages.
Rebentrost et al., "Quantum computational finance: Monte Carlo pricing of financial derivatives," Physical Review A, arXiv:1805.00109v2 [quant-ph], 2018, 12 pages.
Ross et al., "Optimal ancilla-free clifford+T approximation of z-rotations," Quantum Information and Computation, arXiv:1403.2975 [quant-ph], 2016, 40 pages.
Rubinstein et al., "Simulation and the Monte Carlo Method," John Wiley & Sons, 2016, 396 pages.
Selinger, "Efficient Clifford+T approximation of single-qubit operators," arXiv:1212.6253 [quant-ph], 2012, 17 pages.
Stamatopoulos et al., "Option pricing using quantum computers," Quantum, arXiv:1905.02666v5 [quant-ph], 2020, 20 pages.
Stokes et al., "Quantum natural gradient," Quantum, arXiv:1909.02108v3 [quant-ph], 2020, 15 pages.
Suzuki et al., "Amplitude estimation without phase estimation," Quantum Information Processing, 2020, 17 pages.
Takahashi et al., "Quantum addition circuits and unbounded fan-out," Quantum Information and Computation, vol. 10, No. 9 & 10, arXiv:0910.2530 [quant-ph], 2010, 17 pages.
Tanaka et al., "Amplitude estimation via maximum likelihood on noisy quantum computer," arXiv:2006.16223 [quant-ph], 2020, 25 pages.
Thapliyal, "Mapping of Subtractor and Adder-Subtractor Circuits on Reversible Quantum Gates," Springer Berlin Heidelberg, 2016, 25 pages.
Vazquez et al., "Efficient state preparation for quantum amplitude estimation," arXiv:2005.07711v1 [quant-ph], 2020, 12 pages.
Venkateswaran et al., "Quantum approximate counting with non-adaptive grover iterations," arXiv:2010.04370v1 [quant-ph], 2020, 13 pages.
Lee et al., "Quantum shift register," arXiv:quant-ph/0112107, 2001, 3 pages.
Woerner et al., "Quantum risk analysis," Nature Partner Journals, Quantum Information, 2019, 8 pages.
Zoufal et al., "Quantum generative adversarial networks for learning and loading random distributions," Nature Partner Journals, Quantum Information, 2019, 9 pages.
Barkoutsos et al., "Quantum algorithms for electronic structure calculations: Particle-hole hamiltonian and optimized wave-function expansions," Phys. Rev. A 98, arXiv: 1805.04340v1 [quant-ph], 2018, 14 pages.
Bocharov et al., "Efficient synthesis of universal repeat-until-success quantum circuits," Physical Review Letters 114, arXiv:1404.5320v2 [quant-ph], 2015, 15 pages.
Grinko et al., "Iterative quantum amplitude estimation," arXiv:1912.05559v2 [quant-ph], 2019, 13 pages.
Kim et al., "Efficient decomposition methods for controlled-r n using a single ancillary qubit," www.nature.com/scientificreports, 2018. 7 pages.
Nielsen et al., "Quantum Information and Quantum Computation," Cambridge University Press, 2010, 8 pages.
Ollitrault et al., "Non-adiabatic molecular quantum dynamics with quantum computers," arXiv:2006.09405v1 [quant-ph], 2020, 12 pages.
Sellinger, "Quantum circuits of T-depth one," Physical Review A, arXiv:1210.0974 [quant-ph], 2013, 5 pages.
Wiesner, "Simulations of many-body quantum systems by a quantum computer," arXiv:quant-ph/9603028, 1996, 3 pages.
Zalka, "Simulating quantum systems on a quantum computer," Proceedings of the Royal Society of London. Series A: Mathematical, Physical and Engineering Sciences, 1998, 11 pages.
Tang et al., "Quantum Computation for Pricing the Collateral Debt Obligations", arXiv preprint arXiv:2008.04110, Aug. 6, 2020, 11 pages.
Stamatopoulos et al., "Option Pricing using Quantum Computers," Quantum 4 (2020): 291, 20 pages.
International Search Report and Written Opinion received for PCT Application Serial No. PCT/IB2021/061336 dated Apr. 3, 2022, 11 pages.

* cited by examiner

QUANTUM RESOURCE ESTIMATION USING A RE-PARAMETERIZATION METHOD

BACKGROUND

The subject disclosure relates to estimation of quantum resources to calculate an expectation value of a stochastic process, and more specifically, to estimation of quantum resources to calculate an expectation value of a stochastic process using a re-parameterization method.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that can facilitate estimation of quantum resources to calculate an expectation value of a stochastic process using a re-parameterization method are described.

According to an embodiment, a system can comprise a processor that executes computer executable components stored in memory. The computer executable components can comprise a re-parameterization component that applies a quantum fault-tolerant operation to a variationally prepared quantum state corresponding to a probability distribution to produce a quantum state corresponding to a target probability distribution. The computer executable components can further comprise an estimation component that estimates at least one defined criterion of a quantum computer to be used to compute an expectation value of a stochastic process associated with the target probability distribution.

According to another embodiment, a computer-implemented method can comprise applying, by a system operatively coupled to a processor, a quantum fault-tolerant operation to a variationally prepared quantum state corresponding to a probability distribution to produce a quantum state corresponding to a target probability distribution. The computer-implemented method can further comprise estimating, by the system, at least one defined criterion of a quantum computer to be used to compute an expectation value of a stochastic process associated with the target probability distribution.

According to another embodiment, a computer program product comprising a computer readable storage medium having program instructions embodied therewith, the program instructions executable by a processor to cause the processor to apply a quantum fault-tolerant operation to a variationally prepared quantum state corresponding to a probability distribution to produce a quantum state corresponding to a target probability distribution. The program instructions are further executable by the processor to cause the processor to estimate at least one defined criterion of a quantum computer to be used to compute an expectation value of a stochastic process associated with the target probability distribution.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As referenced herein, a "derivative" and/or a "derivative asset" is a contract between an issuer and a holder, which is valid until its expiration date. As referenced herein, an "entity" can comprise a human, a client, a user, a computing device, a software application, an agent, a machine learning (ML) model, an artificial intelligence (AI), and/or another entity. It will be understood that when an element is referred to herein as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling.

Figure 1:
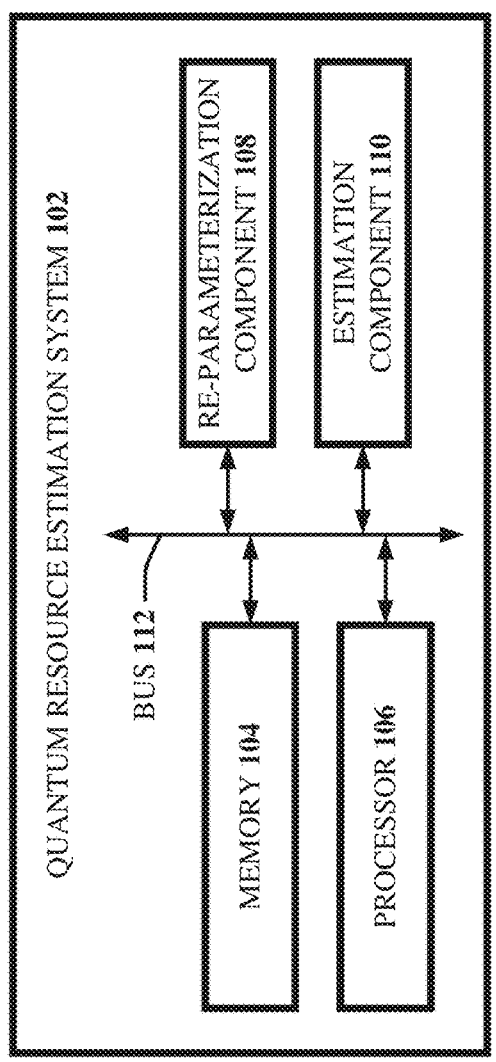
FIGS. 1, 2, and 3 illustrate block diagrams of example, non-limiting systems that can each facilitate estimation of quantum resources to calculate an expectation value of a stochastic process using a re-parameterization method in accordance with one or more embodiments described herein.
Figure 2:
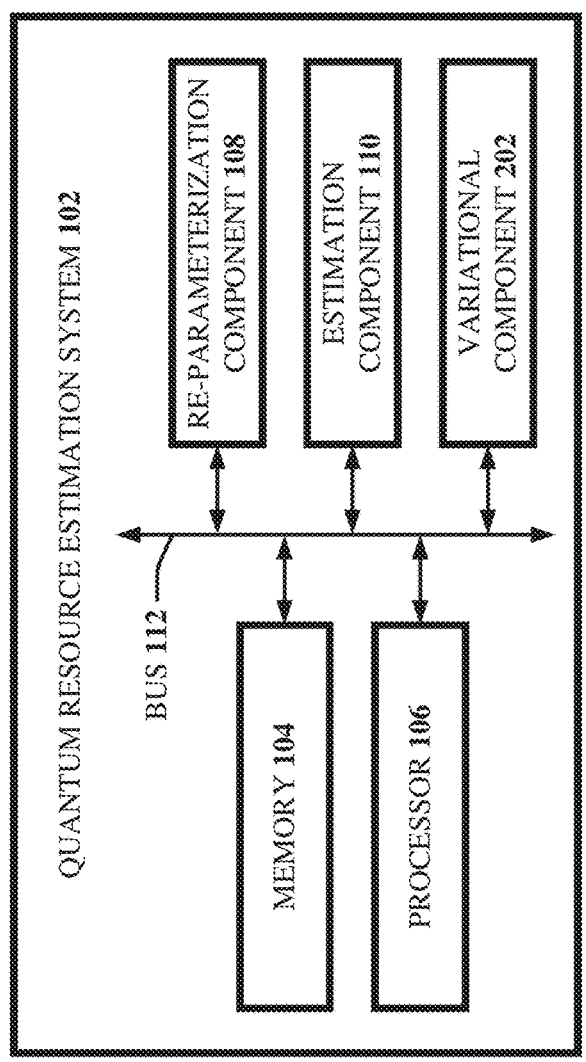
Figure 3:
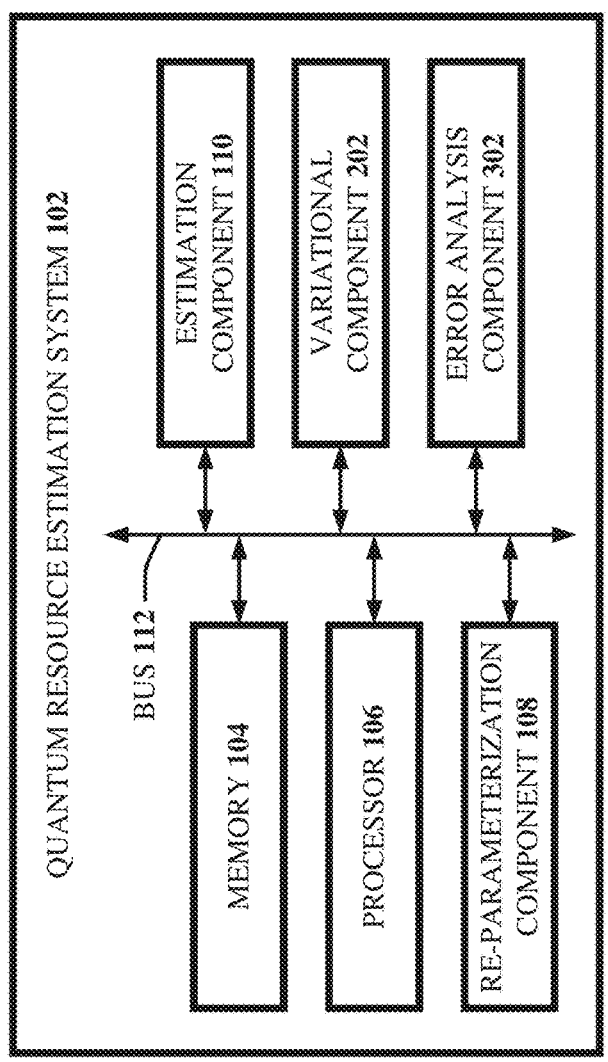

FIGS. 1, 2, and 3 illustrate block diagrams of example, non-limiting systems 100, 200, and 300, respectively, that can each facilitate estimation of quantum resources to calculate an expectation value of a stochastic process using a re-parameterization method in accordance with one or more embodiments described herein. System 100, 200, and 300 can each comprise a quantum resource estimation system 102. Quantum resource estimation system 102 of system 100 depicted in FIG. 1 can comprise a memory 104, a processor 106, a re-parameterization component 108, an estimation component 110, and/or a bus 112. Quantum resource estimation system 102 of system 200 depicted in FIG. 2 can further comprise a variational component 202. Quantum resource estimation system 102 of system 300 depicted in FIG. 3 can further comprise an error analysis component 302.

Although some embodiments of the subject disclosure describe an example application of quantum resource estimation system 102 to estimate quantum resources to calculate an expectation value of a stochastic process such as, for instance, a derivative asset, it should be appreciated that the subject disclosure is not so limiting. For example, quantum resource estimation system 102 can estimate quantum resources to calculate an expectation value of another stochastic process (e.g., any type of stochastic process).

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100, system 200, system 300, and/or quantum resource estimation system 102 can further comprise various computer and/or computing-based elements described herein with reference to operating environment 1100 and FIG. 11. In several embodiments, such computer and/or computing-based elements can be used in connection with implementing one or more of the systems, devices, components, and/or computer-implemented operations shown and described in connection with FIG. 1, FIG. 2, FIG. 3, and/or other figures disclosed herein.

Memory 104 can store one or more computer and/or machine readable, writable, and/or executable components and/or instructions that, when executed by processor 106 (e.g., a classical processor, a quantum processor, and/or another type of processor), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to quantum resource estimation system 102, re-parameterization component 108, estimation component 110, variational component 202, error analysis component 302, and/or another component associated with quantum resource estimation system 102 as described herein with or without reference to the various figures of the subject disclosure.

Memory 104 can comprise volatile memory (e.g., random access memory (RAM), static RAM (SRAM), dynamic RAM (DRAM), and/or another type of volatile memory) and/or non-volatile memory (e.g., read only memory (ROM), programmable ROM (PROM), electrically programmable ROM (EPROM), electrically erasable programmable ROM (EEPROM), and/or another type of non-volatile memory) that can employ one or more memory architectures. Further examples of memory 104 are described below with reference to system memory 1116 and FIG. 11. Such examples of memory 104 can be employed to implement any embodiments of the subject disclosure.

Processor 106 can comprise one or more types of processors and/or electronic circuitry (e.g., a classical processor, a quantum processor, and/or another type of processor and/or electronic circuitry) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor. Further examples of processor 106 are described below with reference to processing unit 1114 and FIG. 11. Such examples of processor 106 can be employed to implement any embodiments of the subject disclosure.

Quantum resource estimation system 102, memory 104, processor 106, re-parameterization component 108, estimation component 110, variational component 202, error analysis component 302, and/or another component of quantum resource estimation system 102 as described herein can be communicatively, electrically, operatively, and/or optically coupled to one another via bus 112 to perform functions of system 100, system 200, system 300, quantum resource estimation system 102, and/or any components coupled therewith. Bus 112 can comprise one or more memory bus, memory controller, peripheral bus, external bus, local bus, a quantum bus, and/or another type of bus that can employ various bus architectures. Further examples of bus 112 are described below with reference to system bus 1118 and FIG. 11. Such examples of bus 112 can be employed to implement any embodiments of the subject disclosure.

Quantum resource estimation system 102 can comprise any type of component, machine, device, facility, apparatus, and/or instrument that comprises a processor and/or can be capable of effective and/or operative communication with a wired and/or wireless network. All such embodiments are envisioned. For example, quantum resource estimation system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Quantum resource estimation system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a wire and/or a cable. For example, quantum resource estimation system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a data cable including, but not limited to, a High-Definition Multimedia Interface (HDMI) cable, a recommended standard (RS) 232 cable, an Ethernet cable, and/or another data cable.

In some embodiments, quantum resource estimation system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) via a network. For example, such a network can comprise wired and/or wireless networks, including, but not limited to, a cellular network, a wide area network (WAN) (e.g., the Internet), a local area network (LAN), and/or another network. Quantum resource estimation system 102 can communicate with one or more external systems, sources, and/or devices, for instance, computing devices using virtually any desired wired and/or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. Therefore, in some embodiments, quantum resource estimation system 102 can comprise hardware (e.g., a central processing unit (CPU), a transceiver, a decoder, quantum hardware, a quantum processor, and/or other hardware), software (e.g., a set of threads, a set of processes, software in execution, quantum pulse schedule, quantum circuit, quantum gates, and/or other software) or a combination of hardware and software that can facilitate communicating information between quantum resource estimation system 102 and external systems, sources, and/or devices (e.g., computing devices, communication devices, and/or another type of external system, source, and/or device).

Quantum resource estimation system 102 can comprise one or more computer and/or machine readable, writable, and/or executable components and/or instructions that, when executed by processor 106 (e.g., a classical processor, a quantum processor, and/or another type of processor), can facilitate performance of operations defined by such component(s) and/or instruction(s). Further, in numerous embodiments, any component associated with quantum resource estimation system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, re-parameterization component 108, estimation component 110, variational component 202, error analysis component 302, and/or any other component associated with quantum resource estimation system 102 as disclosed herein (e.g., communicatively, electronically, operatively, and/or optically coupled with and/or employed by quantum resource estimation system 102), can comprise such computer and/or machine readable, writable, and/or executable component(s) and/or instruction(s). Consequently, according to numerous embodiments, quantum resource estimation system 102 and/or any components associated therewith as disclosed herein, can employ processor 106 to execute such computer and/or machine readable, writable, and/or executable component(s) and/or instruction(s) to facilitate performance of one or more operations described herein with reference to quantum resource estimation system 102 and/or any such components associated therewith.

Quantum resource estimation system 102 can facilitate (e.g., via processor 106) performance of operations executed by and/or associated with re-parameterization component 108, estimation component 110, variational component 202, error analysis component 302, and/or another component associated with quantum resource estimation system 102 as disclosed herein. For example, as described in detail below, quantum resource estimation system 102 can facilitate (e.g., via processor 106): applying a quantum fault-tolerant operation to a variationally prepared quantum state corresponding to a probability distribution to produce a quantum state corresponding to a target probability distribution; and/or estimating at least one defined criterion of a quantum computer to be used to compute an expectation value of a stochastic process associated with the target probability distribution.

In another example, as described in detail below, quantum resource estimation system 102 can further facilitate (e.g., via processor 106): applying a transformation operation to the variationally prepared quantum state to produce the quantum state corresponding to the target probability distribution with a defined mean of the target probability distribution, a defined standard deviation of the target probability distribution, and/or one or more explicit parameters that specify the target probability distribution; applying the quantum fault-tolerant operation to the variationally prepared quantum state to prepare the quantum state as a superposition over possible paths of a discrete time multivariate stochastic process; training a variational quantum circuit to prepare the variationally prepared quantum state and to reduce computational costs of quantum arithmetic operations performed by the quantum computer to compute the expectation value of the stochastic process associated with the target probability distribution; training the variational quantum circuit using a Hamiltonian operator to generate a ground state corresponding to the target probability distribution; calculating one or more errors associated with at least one of: application of the quantum fault-tolerant operation to the variationally prepared quantum state to produce the quantum state, estimation of the at least one defined criterion, or computation of the expectation value of the stochastic process associated with the target probability distribution.

In the above examples, the at least one defined criterion can comprise an attribute, a condition, a property, a parameter, and/or a configuration of the quantum computer that enables the quantum computer to achieve a defined quantum advantage in computing the expectation value of the stochastic process associated with the target probability distribution. In the above examples, the probability distribution can comprise a standard normal probability distribution and the target probability distribution can comprise a normal probability distribution.

In accordance with various embodiments of the subject disclosure described herein, to perform one or more of the above described operations, quantum resource estimation system 102, re-parameterization component 108, estimation component 110, variational component 202, and/or error analysis component 302 can define and/or implement one or more of the algorithms (e.g., Algorithm 2.1, 3.1, 3.2, 4.1, and/or 4.2) and/or one or more of the equations (e.g., Equations (1)-(109)) described below with reference to Sections 1.0-11.0. For example, with reference to Sections 3.2 and 10.0 described below, re-parameterization component 108 can apply a quantum fault-tolerant operation to a variationally prepared quantum state corresponding to a probability distribution (e.g., a standard normal probability distribution) to produce a quantum state corresponding to a target probability distribution (e.g., a normal probability distribution). In this example, re-parameterization component 108 can apply the quantum fault-tolerant operation to the variationally prepared quantum state to prepare the quantum state as a superposition over possible paths of a discrete time multivariate stochastic process. In this example, re-parameterization component 108 can apply a transformation operation to the variationally prepared quantum state to produce the quantum state corresponding to the target probability distribution with at least one of: a defined mean of the target probability distribution; a defined standard deviation of the target probability distribution; or one or more explicit parameters that specify the target probability distribution.

In another example, with reference to Sections 3.1.2 and 3.2.3 described below, estimation component 110 can estimate at least one defined criterion of a quantum computer to be used to compute an expectation value of a stochastic process associated with the target probability distribution. For instance, estimation component 110 can estimate at least one defined criterion of a quantum computer to be used to compute a value of an asset such as, for example, a derivative asset associated with the target probability distribution. For example, estimation component 110 can estimate at least one defined criterion including, but not limited to, an attribute, a condition, a property, a parameter, a configuration, and/or another criterion of the quantum computer that enables the quantum computer to achieve a defined quantum advantage in computing an expectation value of a stochastic process (e.g., the value of a derivative asset) associated with the target probability distribution.

In another example, with reference to Sections 3.2.1 and 11.0 described below, variational component 202 can train a variational quantum circuit to prepare the variationally prepared quantum state. For instance, variational component 202 can train a variational quantum circuit to prepare the variationally prepared quantum state by training the variational quantum circuit using a Hamiltonian operator to generate a ground state corresponding to the target probability distribution. It should be appreciated that variational component 202 can train a variational quantum circuit to prepare the variationally prepared quantum state to reduce computational costs of quantum arithmetic operations performed by the quantum computer to compute the expectation value of the stochastic process (e.g., the value of a derivative asset) associated with the target probability distribution.

In another example, with reference to Section 3.2.2 described below, error analysis component 302 can calculate one or more errors associated with at least one of: application of the quantum fault-tolerant operation to the variationally prepared quantum state to produce the quantum state; estimation of the at least one defined criterion; or computation of the expectation value of the stochastic process (e.g., the value of a derivative asset) associated with the target probability distribution.

In accordance with various embodiments and as described in the following sections, quantum resource estimation system 102 can determine an upper bound on the resources (e.g., quantum computing resources) involved to provide a valuable quantum advantage in pricing derivatives. To do so, quantum resource estimation system 102 can provide the first complete resource estimates for useful quantum derivative pricing, using automatically callable (auto-callable) option and a target accrual redemption forwards (TARF) derivatives as example benchmark use cases. Quantum resource estimation system 102 can overcome blocking challenges in the known approaches and provide a new method for quantum derivative pricing—the re-parameterization method—that avoids them. It should be appreciated that the re-parameterization method that can be defined and/or implemented by quantum resource estimation system 102 as described in the sections below hybridizes pre-trained variational circuits with fault-tolerant quantum computing to dramatically reduce resources (e.g., quantum computing resources) involved with estimating the value of a derivative. As described below and in accordance with various embodiments of the subject disclosure, quantum resource estimation system 102 can determine that the auto-callable option and TARF derivatives as example benchmark use cases involve, for instance: approximately 8,000 (8 k) logical qubits; an approximate T-depth of 50 million; and an estimated logical clock speed of approximately 10 megahertz (MHz) to achieve a defined quantum advantage.

1.0 Derivative Pricing

The pricing of derivative contracts using Monte Carlo methods consumes significant computation in the financial sector, and quantum advantage in this application would be very valuable. In accordance with various embodiments and as described in the following sections, quantum resource estimation system 102 can provide the first detailed resource estimates of the conditions involved with achieving a quantum advantage in derivative pricing. To accomplish this, quantum resource estimation system 102 can define and/or implement the new methods described below in accordance with one or more embodiments of the subject disclosure to load stochastic processes into a quantum computer.

As defined above and as referenced herein, a "derivative" and/or a "derivative asset" is a contract between an issuer and a holder, which is valid until its expiration date. Examples of these derviatives assets include, but are not limited to, a forward contract, an option, an auto-callable option, a target accrual redemption note (TARN), a TARF, and/or another derivative asset. Each derivative defines a payoff that defines what the holder stands to gain. Payoffs depend on the value of one or more underlying assets across the duration of the contract. Examples of these underlying assets include, but are not limited to, stocks, currencies, commodities, and/or another underlying asset. Derivative contracts are ubiquitous in the finance domain with various uses from hedging risk to speculation. The goal of derivative pricing is to determine the value of entering the derivative contract today, given uncertainty about future values of the underlying assets and consequently the payoff.

The underlying asset is typically modeled as a stochastic process under assumptions like no-arbitrage. No-arbitrage is the assumption that no specific asset is priced differently in different marketplaces such that one can never buy an asset from one marketplace and immediately sell it at another for a profit. A common model is that the underlying assets evolve under geometric Brownian motion. Let $\vec{S}^t \in \mathbb{R}_+^d$ be a vector of values for d underlyings at time t. Let $(\vec{S}^0, \ldots, \vec{S}^T) = \vec{\omega} \in \vec{\Omega}$ be a path of a discrete time multivariate stochastic process describing the values of those assets. Both notations are used herein for a path. The corresponding probability density function is denoted by $\bar{p}(\bar{\omega})$. Let $f(\bar{\omega}) = f(\vec{S}^0, \ldots, \vec{S}^T) \in \mathbb{R}$ be the payoff of some derivative on those assets. Equation (1) defined below can be used to price the derivative.

$$\mathbb{E}(f) = \int_{\bar{\omega} \in \bar{\Omega}} \bar{p}(\bar{\omega}) f(\bar{\omega}) d\bar{\omega}. \tag{1}$$

If the underlying stochastic processes are modeled with geometric Brownian motion then they have transition probabilities $$P(\vec{S}^t | \vec{S}^{t-1}) = \frac{\exp\left(-\frac{1}{2}(\ln \vec{S}^t - \vec{\mu}^{t-1})^T \Sigma^{-1} (\ln \vec{S}^t - \vec{\mu}^{t-1})\right)}{(2\pi)^{d/2} (\det \Sigma)^{1/2} \prod_{j=1}^d S_j^t}. \tag{2}$$

where $$\ln \vec{S}^t = (\ln S_1^t, \ln S_2^t, \ldots, \ln S_d^t)^T \tag{3}$$

$$\vec{\mu}^{t-1} = (\mu_1^{t-1}, \mu_2^{t-1}, \ldots, \mu_d^{t-1})^T$$

$$\mu_j^{t-1} = (r - 0.5\sigma_j^2)\Delta t + \ln S_j^{t-1}.$$

Note that Equation (2) defined above at time t has a dependency on the asset vector at time t−1 via $\ln S_j^{t-1}$ in $\mu_j^{t-1}$. The parameters r and $\sigma_j$ are the risk-free rate and the volatility of the j-th asset respectively, $\Delta t$ is the time duration between steps of the stochastic process, and $\Sigma$ is the d×d positive-definite covariance matrix of the d underlyings $$\Sigma = \Delta t \begin{bmatrix} \sigma_1^2 & \rho_{12}\sigma_1\sigma_2 & \cdots & \rho_{1d}\sigma_1\sigma_d \\ \rho_{21}\sigma_2\sigma_1 & \sigma_2^2 & \cdots & \rho_{2d}\sigma_2\sigma_d \\ \vdots & \vdots & \ddots & \vdots \\ \rho_{d1}\sigma_d\sigma_1 & \cdots & \cdots & \sigma_d^2 \end{bmatrix} \tag{4}$$

where $-1 \leq \rho_{ij} \leq 1$ is the correlation between assets i and j. The probability of any particular path $\bar{\omega} \in \bar{\Omega}$ is then $$\bar{p}(\bar{\omega}) = \Pi_{t=1}^T P(\vec{S}^t | \vec{S}^{t-1}). \tag{5}$$

The risk-free rate referenced above is the rate of return of investing in a risk-free asset. Although such an asset is purely theoretical, treasury bonds are typically used to represent such an asset and approximate r as the yield of the treasury bond minus the current inflation rate.

Classically some simple derivatives under this model are easy to price, such as European call options that can be priced analytically using the Black-Scholes equation. Easy to price derivatives are often path independent, where the payoff is only a function of the final prices at exercise time $f(\bar{\omega}) = f(\vec{S}^T)$. This contrasts with path dependent derivatives that are more difficult to price. Path dependent derivatives are often priced in practice with classical Monte Carlo methods.

Using classical Monte Carlo, the accuracy of derivative pricing converges as $O(1/\sqrt{M})$, where M is the number of samples. In general cases, quantum algorithms based on amplitude estimation can be used to improve this to $O(1/M)$. Recent work has considered how to specialize this advantage to options pricing and risk analysis. As this is only a quadratic speedup, the subject disclosure focuses on derivatives that are complicated enough to have a large M in practice. In accordance with various embodiments and as described in the following sections, quantum resource estimation system 102 can provide end to end quantum resource estimates for two examples of such derivatives, auto-callable options and TARFs, which are both computationally expensive, path-dependent derivatives. In doing so, quantum resource estimation system 102 (e.g., via re-parameterization component 108, estimation component 110, and/or variational component 202) can detail and optimize the loading into quantum states of the underlying distribution over asset paths. This loading step was left open (e.g., unresolved) in prior art technologies and quantum resource estimation system 102 (e.g., via estimation component 110) can provide the first account of the resources involved to accomplish such a loading step.

In addition to estimating the resources that can be used for path loading, quantum resource estimation system 102 can also provide several optimizations, including intentional shifts from price space to return space calculations and the new re-parameterization method. These methods reduce the resources significantly and are summarized in Table 1.

| Method | (d, T) Auto | (d, T) TARF | Error Auto | Error TARF | T-count Auto | T-count TARF | T-depth Auto | T-depth TARF | # Logical Qubits Auto | # Logical Qubits TARF |
|---|---|---|---|---|---|---|---|---|---|---|
| Riemann Sum | (3, 20) | (1, 26) | $2 \times 10^{-3}$ | | $\geq 10^{13}$ | $\geq 10^{18}$ | $\geq 10^{13}$ | $\geq 10^{18}$ | — | — |
| Riemann Sum (no-norm) | | | | | $1.4 \times 10^{11}$ | $5.5 \times 10^{10}$ | $1.9 \times 10^8$ | $1.7 \times 10^8$ | 24 k | 15 k |
| Re-parameterization | | | | | $4.2 \times 10^9$ | $3 \times 10^9$ | $4.6 \times 10^7$ | $6.2 \times 10^7$ | 7.5 k | 9.5 k |

Table 1 depicted above illustrates the resources estimated by implementing quantum resource estimation system 102 in accordance with one or more embodiments of the subject disclosure to price derivatives using different methods for a target error of $2 \times 10^{-3}$. In such implementation of quantum resource estimation system 102, a basket of auto-callable (auto) options with 5 auto-call dates and a knock-in put option, and a TARF with one underlying and 26 simulation dates. In such implementation of quantum resource estimation system 102, it was determined that Grover-Rudolph methods are not applicable in practice and that Riemann summation methods can involve normalization assumptions to avoid errors that grow exponentially in T. Even if those normalization issues were avoided, as detailed in the Riemann Sum (no-norm) row of Table 1, the re-parameterization method that can be defined and/or implemented by quantum resource estimation system 102 in accordance with one or more embodiments of the subject disclosure performs best. Section 3.1 below describes the Riemann summation normalization and the detailed resource estimation that can be defined by and/or implemented by estimation component 110 is discussed in below in Sections 3.1.2 and 3.2.3.

1.1 Discretized Derivative Pricing

In order to map a derivative pricing problem into quantum states, the values $\vec{S}^t$ are discretized. Classically, this is not that important as high precision is available, but in order to study the minimal qubit criteria, discretization is explicitly considered.

Let each value $\vec{S}^t$ be discretized into a different n-qubit registers, that is, mapped to a regular grid. The discrete space of paths can then be defined as $\omega \in \Omega$. The price expectation is now a sum $$\mathbb{E}(f) = \Sigma_{\omega \in \Omega} p(\omega) f(\omega), \quad (6)$$

where the probability $p(\omega)$ can be defined in multiple ways. For instance, the midpoints of the grid cells can be taken so that $$p(\omega) = \Pi_{t=1}^{T} P(\vec{S}^t | \vec{S}^{t-1}), \quad (7)$$

where the $\vec{S}^t$ are restricted to discrete midpoints. Or $p(\omega)$ can be defined as an integral over the discrete cells. These representations are the same in the limit of fine grids and in accordance with one or more embodiments of the subject disclosure, the midpoint method is used.

1.2 Price Space vs. Return Space

As described above, geometric Brownian motion can be used to model the price on underlying assets. As referenced herein, this is called the price space description of the underlying stochastic process. In price space, transition probabilities are given by a multivariate log-normal distribution.

An alternative, but equivalent representation, is to consider the stochastic process on the log-returns of the underlying assets, and perform all calculations in return space. When asset prices obey a log-normal distribution, then the log-returns are distributed normally. A vector of underlying log-returns for d assets at time t can be defined as $\vec{R}^t = (R_1^t, R_2^t, \ldots, R_d^t)$. The transition probabilities can then be given by a multivariate normal distribution $$P(\vec{R}^t) = \frac{\exp\left(-\frac{1}{2}(R^t - \vec{\mu})^T \Sigma^{-1} (R^t - \vec{\mu})\right)}{(2\pi)^{d/2} (\det \Sigma)^{1/2}}, \quad (8)$$

where, $$\mu = (\mu_1, \mu_2, \ldots \mu_d)^T, \quad (9)$$

$$\mu_j = (r - 0.5\sigma_j^2)\Delta t, \quad (10)$$

and $\sigma$, $\Delta t$, $\Sigma$, and r are the same Brownian motion parameters as in price space. Note that this is no longer conditioned on the value at the previous time step. In fact, the path distribution in return space includes dT independent Gaussians.

Note the overloaded notation from the price space formulation as these representations are interchangeable. At any time t' the price of asset j can be calculated from return space using $$S_j^{t'} = S_j^0 \prod_{t=1}^{t'} e^{R_j^t}. \quad (11)$$

This calculation is used when the stochastic process has been modelled in return space but the payoff is defined in terms of asset prices. In the various embodiments of the subject disclosure described herein, it will be made clear from the context which space such embodiments are operating in.

Switching between price space and return space changes from log-normal distribution loading to normal distribution loading. In general, the loading of normals is easier since their underlying stochastic evolution is independent of the price at a previous time step which can be seen by comparing Equation (3) and Equation (10) defined above. As such, the probability distribution $P(\vec{R}^1, \vec{R}^2, \ldots, \vec{R}^T)$ across all T timesteps of the stochastic process can be computed simultaneously with $$P(\vec{R}) \equiv P(\vec{R}^1, \vec{R}^2, \ldots, \vec{R}^T) = \frac{\exp\left(\sum_{t=1}^{T} -\frac{1}{2}(\vec{R}^t - \vec{\mu})\Sigma^{-1}(\vec{R}^t - \vec{\mu})\right)}{(2\pi)^{dT/2}(\det \Sigma)^{T/2}}. \quad (12)$$

This advantage can compensate for the quantum arithmetic used to evaluate the exponentials in Equation (11) defined above. In various embodiments of the subject disclosure, quantum resource estimation system 102 can leverage this advantage by using the re-parameterization method described herein. Additionally, when working with derivatives that have payoffs defined in terms of log-returns directly and are independent of individual asset prices, this is another reason quantum resource estimation system 102 can work in return space.

2.0 Core Approach

The approach of the subject disclosure to derivative pricing extends the quantum mean estimation method. Let the normalized payoff of any path be given by $$\tilde{f}(\omega) = \frac{f(\omega) - f_{min}}{f_{max} - f_{min}} \in [0, 1]. \quad (13)$$

Algorithm 2.1 defined below can proceed in four phases. First, a probability distribution is loaded in the form of a superposition over all possible paths. Second, payoffs for all possible paths are calculated in quantum parallel. Third, the expected payoff is stored in the amplitude of a marked state. Fourth, amplitude estimation is used to read out the amplitude using $\mathcal{O}(1/\epsilon)$ queries for a given target accuracy $\epsilon > 0$.

Algorithm 2.1—Core Approach to Derivative Pricing

Use parameters n, d, and T that are all positive integers.

Obtain an operator $\mathcal{P}$ for loading a probabilistically weighted superposition of paths onto a register of ndT-qubits.

1. Apply operator $\mathcal{P}$ to prepare the quantum state $$\mathcal{P} |0\rangle = \Sigma_\omega \sqrt{p(\omega)} |\omega\rangle. \quad (14)$$

2. Calculate $\delta(\omega) = \arcsin \sqrt{\tilde{f}(\omega)}$ into a quantum register $$\Sigma_\omega \sqrt{p(\omega)} |\omega\rangle |\delta(\omega)\rangle. \quad (15)$$

3. Introduce an ancilla qubit and rotate the value of the $\tilde{f}(\omega)$ register into its amplitude:

$$\Sigma_\omega \sqrt{p(\omega)(1-\tilde{f}(\omega))} |\omega\rangle |0\rangle + \Sigma_\omega \sqrt{p(\omega)\tilde{f}(\omega)} |\omega\rangle |1\rangle. \quad (16)$$

4. Use amplitude estimation to extract the probability of the Ancilla being $|1\rangle$, which is the (e.g., discretized) expected payoff $\mathbb{E}(\tilde{f})$. Rescale this to obtain $\mathbb{E}(f) = (f_{max} - f_{min}) \mathbb{E}(\tilde{f}) + f_{min}$.

Note that Steps 1-3 in the Algorithm 2.1 load the exact answer after a single execution. Were it possible to read out an amplitude directly, then quantum resource estimation system 102 could compute the expectation over all paths in a constant number of queries. This is, unfortunately, not possible, and so amplitude estimation introduces a linear overhead to extract an answer to a given precision. This can be a key conceptual difference from classical Monte Carlo where samples from paths are taken. In Algorithm 2.1, quantum resource estimation system 102 can compute (e.g. all) possible paths and take (e.g., amplitude estimated) samples of the expected payoff.

Another distinguishing feature of the quantum approach is that quantum resource estimation system 102 can normalize the payoff in order to store it in the amplitude of a state. This normalization can be rescaled at the end and can have an impact on error scaling, as errors are also scaled up. In the Riemann summation method, discussed in Section 3.1, a version of this normalization rescaling can rapidly accumulate errors.

2.1 Amplitude Estimation for Derivative Pricing

Typically, path-dependent derivatives like auto-callables and TARFs are priced using Monte Carlo methods. Paths $\omega=(\vec{S}^0, \vec{S}^1, \ldots, \vec{S}^T)$ are generated by modeling the underlying stochastic process and then the expected payoff is calculated using the estimator $$\mathbb{E}(f) \approx \frac{1}{M}\sum_{\omega=1}^{M} f(\omega). \quad (17)$$

This estimator converges to the true expected value with error $\epsilon=O(M^{-1/2})$ by the Central Limit Theorem.

This convergence can be quadratically accelerated to $\epsilon=O(M^{-1})$ using quantum amplitude estimation for Monte Carlo. Amplitude estimation takes as input a unitary operator $\mathcal{A}$ on n+1 qubits such that $$\mathcal{A}|0\rangle_{n+1} = \sqrt{1-a}|\psi_0\rangle_n|0\rangle + \sqrt{a}|\psi_1\rangle|1\rangle, \quad (18)$$

where the parameter a is unknown. Here the final qubit acts as a label to distinguish $|\psi_0\rangle$ states from $|\psi_1\rangle$ states.

Amplitude estimation determines a by repeated applications of the operator (often referred to as the Grover operator) $\mathcal{Q}=\mathcal{A} S_0 \mathcal{A}^\dagger S_{\psi_0}$, where $S_0=\mathbb{I}-2|0\rangle_{n+1}\langle 0|_{n+1}$ and $S_{\psi_0}=\mathbb{I}-2|\psi_0\rangle_n|0\rangle\langle 0|\langle\psi_0|_n$ are reflection operators. By using phase estimation and the quantum Fourier transform a can be determined with accuracy $O(M^{-1})$. Unfortunately, the depth of the resulting quantum circuits scales as $O(1/\epsilon)$ and involves the use of a resource expensive quantum Fourier transform. Recent developments have introduced other approaches that aim to reduce the resources to perform amplitude estimation and can remove quantum phase estimation.

The most efficient variant of amplitude estimation known to date is Iterative Quantum Amplitude Estimation (IQAE). It has been shown empirically that IQAE outperforms the other known variants. Although it omits quantum phase estimation, it achieves a four times better performance than the canonical phase estimation approach. Further, it has been shown that for practical considerations, the following bound holds:

$$N_{oracle}^{wc} \le \frac{1.4}{\epsilon}\log\left(\frac{2}{\alpha}\log_2\left(\frac{\pi}{4\epsilon}\right)\right), \quad (19)$$

where $N_{oracle}^{wc}$ denotes the worst-case number of oracle calls, that is, applications of Q, to achieve an estimation error of $\epsilon>0$ with confidence level $1-\alpha$, $\alpha\in(0,1)$.

2.2 Path Distribution Loading

In order for Algorithm 2.1 to achieve a practical quantum advantage, the resources to perform path loading and payoff calculation are taken into account. In some cases, there is an analytic form that can simplify path loading. For example, in the case of path-independent derivatives, a distribution over paths is not involved. All that is involved is a distribution over final underlying prices $S^T$, such as the log-normal distribution given by the Black-Scholes model. This means that the distribution could be analytically computed and then loaded either variationally or explicitly into quantum states. Unfortunately for quantum advantage, the analytic form for this distribution means that these derivatives are typically easy classically. Thus, in accordance with various embodiments of the subject disclosure, quantum resource estimation system 102 can focus on path dependent derivatives where a superposition over paths is to be computed.

While the loading of general distributions is exponentially hard, several methods have been proposed. If the distribution is efficiently integrable, then there does exist an efficient quantum algorithm for loading, the Grover-Rudolph method. However, the algorithm has limited applicability in practice for derivative pricing, because the relevant probability distributions still involve Monte Carlo integration, albeit quantumly, which is precisely what can be avoided by using Amplitude Estimation. More details on the insufficiency of this method are detailed in Section 7.0.

An alternative method to load the path distribution can involve use of a quantum Generative Adversarial Network (qGAN). While this has appeal for lower overhead loading, it is not yet clear how to anticipate what the overhead from training a given qGAN will be in practice.

2.3 Error Analysis

This section investigates the various elements that contribute to the overall error in the quantum approach to option pricing. There are three main components that introduce error in the approach of Algorithm 2.1. Let $f_\delta = f_{max} - f_{min}$.

Truncation Error: The price of a derivative is determined by an integral over all the possible values of the underlying price or return. It is not feasibly compute an integral over an infinite domain, and thus quantum resource estimation system 102 can restrict the domain of integration as follows: the prices and/or log-returns are restricted to a range $[B_l, B_u]$. This restriction of the domain leaves out a probability mass of $\alpha$. Given an upper bound of $P_{max}$ on the density functions at each step and an upper bound $f_\delta$ on the payoff, a truncation error can be incurred which is denoted by $\epsilon_{trunc} = P_{max}^T f_\delta \alpha$.

Discretization Error: This error (denoted by $\epsilon_{disc}$) arises from the use of a Riemann Sum over a finite grid of points to approximate the integral. This error can be reduced by increasing the number of qubits (n) to approximate the sum.

Amplitude Estimation Error: Amplitude estimation incurs an error of $\epsilon_{amp}$ when using $1/\epsilon_{amp}$ repetitions of the state preparation procedure and price computation.

The truncation and discretization errors are described in more detail below.

2.3.1 Truncation Error

The section presents the truncation error in return space as it then extends to price space straightforwardly. Denote the maximum eigenvalue of the covariance matrix $\Sigma$ by $\sigma_{max}$. Using Chernoff tail bounds on Gaussians, the probability that the log-returns for asset i lie outside of the interval $[\mu_i - w\sigma_{max}, \mu_i + w\sigma_{max}]$ is upper bounded by $2e^{-w^2/2}$. By the union bound the probability that any log-return (e.g., d assets over T time steps) lies outside the interval $[B_l = (r-0.5\sigma_{max}^2)\Delta t - w\sigma_{max}, B_u = (r-0.5\sigma_{max}^2)\Delta t + w\sigma_{max}]$ is upper bounded by $2dTe^{-w^2/2}$. Let the initial asset prices lie in the range $S_{min}^0, S_{max}^0$. Then the corresponding interval in price space is given by $[S_{min}^0 e^{B_l T}, S_{max}^0 e^{B_u T}]$.

Quantum resource estimation system 102 can then define the truncated window of values for dT different n-qubit registers that are w standard deviations around the mean for each time step. The truncation error is then given by $$\epsilon_{trunc} \leq 2dTf_\delta e^{-w^2/2}. \quad (20)$$

2.3.2 Discretization Error

The final output of the amplitude estimation algorithm represents a Riemann Sum that approximates the truncated multidimensional integral. The integral is over dT variables corresponding to d assets over T time steps. Assume that each underlying asset and/or return is restricted to an interval $[B_l, B_u]$. To compute the discretization error, apply a multidimensional variation of the midpoint rule as follows: let there be n qubits used to represent each underlying asset, the domain is divided into $2^{ndT}$ cells, and corresponding to each value of the register associate the value of the integrand at the midpoint of the corresponding cell. Assume that $\beta$ provides an upper bound on the second derivatives of the integrand (e.g., this can be restated as saying that the deviation from linearity over a range of length l is bounded by $\beta l^2/2$).

Consider the error from discretization that accumulates over a single cell. Each cell has side length $(B_u-B_l)/2^n$ and is a hypercube of dimension l. Note by symmetry that the linear component of the deviation from the value at the center of the cell integrates to 0 over the cell. The error in each cell can thus be bounded by the integral of the term $\beta x^2/2$ over a dT-hypercube of side length $l=(B_u-B_l)/2^n$ centered at the origin.

$$\int_{-l/2}^{l/2} \cdots \int_{-l/2}^{l/2} \beta x^2/2 = l^{dT-1} \beta [\beta x^3/6]_{-l/2}^{l/2} = \frac{\beta l^{dT+2}}{24} = \frac{\beta(B_u-B_l)^{dT+2}}{24 \cdot 2^{n(dT+2)}}. \quad (21)$$

Aggregating the error over all the cells provides $$\epsilon_{disc} = \frac{\beta(B_u-B_l)^{dT+2}}{24 \cdot 2^{2n}} \quad (22)$$

In terms of the number of standard deviations used in the discretization and the largest eigenvalue of the covariance matrix $\sigma_{max}$, the total discretization error is bounded by $$\epsilon_{disc} \leq \frac{\beta(2w\sigma_{max})^{dT+2}}{24 \cdot 2^{2n}}. \quad (23)$$

For a target discretization error, Equation (23) also gives the total number of qubits that can be used to represent d assets for T timesteps, given by $$ndT = dT \lceil \frac{1}{2}(\log_2(\beta/24) - \log_2(\epsilon_{disc}) + (dT+2)\log_2(2w\sigma_{max})) \rceil \quad (24)$$

The truncation and discretization errors apply in general to the methods introduced herein, though each method has additional method-specific error sources which are discussed separately for each method.

3.0 Methods for Advantage in Quantum Derivative Pricing

The following sections describe two approaches that can work effectively to perform quantum derivative pricing in practice: Riemann summation and the re-parameterization method of the subject disclosure. Riemann summation was introduced previously and described herein in accordance with one or more embodiments of the subject disclosure is the first resource analysis for its application to achieve a quantum advantage. This analysis uncovers limitations in error scaling due to normalization. The new re-parameterization method that can be defined and/or implemented by quantum resource estimation system 102 in accordance with one or more embodiments of the subject disclosure as described below avoids the downsides of other methods and offers the first end to end path to quantum advantage in practice.

3.1 Riemann Summation

The Riemann summation method gives an approach to construct the $\mathcal{P}$ path loading operator in Algorithm 2.1. Let $N=2^{ndT}$ be the size of the Hilbert space that contains all possible paths. Let $\tilde{P}_{max}$ be the maximum value of the d-asset multivariate transition probabilities from Equation (2). Then $\tilde{P}(\vec{S}^t|\vec{S}^{t-1}) = P(\vec{S}^t|\vec{S}^{t-1})/\tilde{P}_{max} \in [0,1]$ is the normalized transition probabilities over all choices of $\vec{S}^t$ and $\vec{S}^{t-1}$. Let the asset price for each asset at each timestep be discretized in the interval $[0, S_{max}]$. The steps of the method summarized in Algorithm 3.1 defined below calculate the price of the derivative with a normalization factor $1/P_{max}^T$, with $P_{max} = \tilde{P}_{max} S_{max}^d$. Note that the normalization factor in the final step scales exponentially in T. If $P_{max} < 1$ no normalization is involved and this factor is redundant. However, if $P_{max} > 1$, the error increases exponentially, which renders this approach impractical.

Algorithm 3.1—Riemann Summation Pricing

Use parameters n, d, and T that are all positive integers.

Obtain access to operators $W_t$, $t=1, \ldots, T$ that apply the transition probabilities of the stochastic process into an ancilla via $$W_t|\vec{S}^t\rangle_n|\vec{S}^{t-1}\rangle_n|0\rangle \mapsto |\vec{S}^t\rangle_n|S^{t-1}\rangle_n[\sqrt{1-\tilde{P}(\vec{S}^t|\vec{S}^{t-1})}|0\rangle + \sqrt{\tilde{P}(\vec{S}^t|\vec{S}^{t-1})}|1\rangle] \quad (25)$$

1. Apply Hadamards to ndT qubits to prepare an equal superposition of all paths.

2. Load the initial prices $\vec{S}^0$ into the zero-th nd-qubit register.

3. Apply each of the T transition operators $W_t$ to construct $$\frac{1}{\sqrt{N}} \sum_\omega |\vec{S}^0 \ldots \vec{S}^T\rangle [\ldots + \sqrt{\prod_{t=1}^T \tilde{P}(\vec{S}^t|\vec{S}^{t-1})}|1 \ldots 1\rangle_T] = \frac{1}{\sqrt{P_{max}^T}} \frac{1}{\sqrt{N}} \sum_\omega |\vec{S}^0 \ldots \vec{S}^T\rangle [\ldots + \sqrt{p(\omega)}|1 \ldots 1\rangle_T], \quad (26)$$

where $N=2^{ndT}$.

4. Calculate $\delta(\omega) = \arcsin\sqrt{\tilde{f}(\omega)}$ into a quantum register, obtaining $$\frac{1}{\sqrt{P_{max}^T}} \frac{1}{\sqrt{N}} \sum_\omega |\vec{S}^0 \ldots \vec{S}^T\rangle[\ldots + \sqrt{p(\omega)}|1 \ldots 1\rangle_T]|\delta(\omega)\rangle. \quad (27)$$

5. Introduce an ancilla qubit and rotate the value of the $\tilde{f}(\omega)$ register into its amplitude:

$$\ldots + \frac{1}{\sqrt{P_{max}^T}} \frac{1}{\sqrt{N}} \sum_\omega \sqrt{p(\omega)\tilde{f}(\omega)}|\omega\rangle|1 \ldots 1\rangle_T|1\rangle. \quad (28)$$

6. Use amplitude estimation to extract the probability of the ancilla being $|1\rangle$, which is the (e.g., discretized)

expected payoff $\mathbb{E}(\tilde{f}(\omega)/P_{max}{}^T)$. Rescale this to obtain $\mathbb{E}(f) = P_{max}{}^T ((f_{max} - f_{min}) \mathbb{E}(\tilde{f}) + f_{min})$.

The normalization factor $P_{max}$ is easier to handle in return space where the probability density function is given by Equation (8). If the log-returns are discretized at each timestep for each asset to $\pm w$ times the asset's volatility $\sigma_j$, then $$P_{max} = \frac{(2w)^d \prod_{j=1}^{d} \sigma_j}{(2\pi)^{d/2} (\det \Sigma)^{1/2}}. \tag{29}$$

When the d assets are uncorrelated, then $$P_{max} = \left(\frac{2w}{\sqrt{2\pi}}\right)^d, \tag{30}$$

and therefore, choose $w \leq \pi/\sqrt{2}$ for $P_{max} \leq 1$. However, choosing a small discretization window $w$ increases the truncation error described in Section 2.3.1, and for $w \leq \pi/\sqrt{2}$ then $\epsilon_{trunc} \geq 2e^{-\pi^2/4} \sim 0.17$, which increases proportionally to the number of assets and timesteps in the computation.

3.1.1 Riemann Summation Error Analysis

In addition to the truncation and discretization errors from Section 2.3, the Riemann summation approach includes errors due to scaling considerations and quantum arithmetic.

When working in return space, one transition operator is used which computes Equation (12) and performs the amplitude encoding of $\sqrt{p(\omega)}$ in Equation (26). Assuming the transition operator introduces a maximum additive error $\epsilon_{dens}$ and the payoff operator computing Equation (27) and Equation (28) introduces payoff error $\epsilon_f$, the total arithmetic error of the quantity that can be estimated using amplitude estimation is $$\epsilon_{arith} = \frac{1}{N} \sum_{\omega} [(p(\omega) + \epsilon_{dens})(f(\omega) + \epsilon_f) - p(\omega)f(\omega)]. \tag{31}$$

Ignoring quadratic error terms, then $$\epsilon_{arith} \approx \frac{1}{N} \sum_{\omega} p(\omega)\epsilon_f + \frac{1}{N} \sum_{\omega} f(\omega)\epsilon_{dens} \leq \frac{\epsilon_f}{(2W\sigma_{max})^{dT}} + f_\delta \epsilon_{dens}, \tag{32}$$

where the log-returns for each asset and each timestep have been constructed to discretize the domain $[-w\sigma_{max}, w\sigma_{max}]$.

The probability density error $\epsilon_{dens}$ arises from the computation of $|\arcsin \sqrt{P(\vec{R})}\rangle$ with $P(\vec{R})$ given by Equation (12), and the ancilla rotation in Equation (26). The term inside the exponential in Equation (12) can be written as $$-\tfrac{1}{2} \Sigma_{t=1}^{T} (\vec{R}^t - \vec{\mu})^T \Sigma^{-1} (\vec{R}^t - \vec{\mu}) = -\tfrac{1}{2} \Sigma_{t=1}^{T} \Sigma_{i=1}^{d} \Sigma j = i^d C_{ij} \overline{R}_i^t \overline{R}_j^t, \tag{33}$$

where $\overline{R} = R - \mu$ and $C_{ij}$ are classical variables containing volatility and correlation parameters from the correlation matrix $\Sigma$. In Equation (33), each calculation of $\overline{R}$ thus incurs an error of $\epsilon_A$ and there are $(d+d_2) \cdot T$ multiplications in total. Each $\overline{R}$ term is bounded by $|w|\sigma_{max}$ by construction, where each quantum register representing a log-return $R$ is constructed to represent values in the window $[-w\sigma_{max}, w\sigma_{max}]$.

Using the error analysis for addition and multiplication in Section 8.2, the total error in computing Equation (33) is $$\epsilon_{sum} = \left(\frac{2w\sigma_{max} + n}{2^{n-p}} + \frac{1}{4^{n-p}}\right)(d + d_2) \cdot T. \tag{34}$$

Then using the error propagation analysis in Section 8.2 to compute the exponential, square root, arcsine and sine functions on quantum registers which already contain arithmetic errors, $\epsilon_{dens}$ can be bounded by $$\epsilon_{dens} \leq \epsilon_{sin} + \epsilon_{arcsin} - \arcsin(0.5 - (\epsilon_{sq} + \sqrt{\epsilon_{exp} + \epsilon_{sum}})) + \arcsin(0.5) \tag{35}$$

Each rescaling performed to the input variables introduces a corresponding rescaling error. In addition to the $P_{max}$ rescaling described in the previous section, quantum resource estimation system 102 can also scale the payoff by $1/f_\delta$ to lie in $[0,1]$. The final answer can be multiplied by $P_{max}{}^T f_\delta$ a to account for these rescalings, and the error in the estimate of the truncated integral by amplitude estimation is therefore scaled by $P_{max}{}^T f_\delta$. Quantum resource estimation system 102 can then bound the error in the Riemann Summation approach $$\epsilon_{total} \leq \epsilon_{trunc} + P_{max}{}^T f_\delta (\epsilon_{disc} + \epsilon_{arith} + \epsilon_{amp}), \tag{36}$$

where $\epsilon_{trunc}$, $\epsilon_{disc}$, and $\epsilon_{amp}$ are defined as in Section 2.3.

3.1.2 Resource Estimates

As an example, consider a basket auto-callable with 5 autocall dates and parameters $T=20$, $d=3$, and target an error of $\epsilon_{total}/f_\delta \leq 2 \times 10^{-3}$. Choose $w \sim 5$ for the truncation error in Equation (20) to be within the total target error, and Equation (30) gives $P_{max} \approx 4^3$. This makes the scaling factor prohibitively large with $P_{max}{}^T \approx 10^{40}$. However, there may be some methods to deal with this normalization issue, such as a method inspired by importance sampling and discussed in Section 9.2. Thus, assume that some method is invented to deal with the normalization, and set $P_{max} = 1$.

Then, using resource calculations as discussed in Section 9.1, bound $\epsilon_{arith} \leq 2 \times 10^{-3}$ with $n=34$ and $p=2$. Here p is the integer part of the fixed point representation as defined in Equation (63). The Q operator in this case uses 21 k qubits and has a T-depth of 23 k, including the resources to compute prices from log-returns using Equation (11). For a choice of $\Delta t = 1/20$ and $\sigma_{min} = 0.1$ compute that $\beta \approx 17$. Choose $\sigma_{max} = 0.4$ and $w=5$. Thus for the choice of n, $\epsilon_{disc} \approx f_\delta 10^{-5}$ and $$\epsilon_{trunc} \leq f_\delta \cdot 10^{-4}. \tag{37}$$

If a target $\epsilon_{amp}$ is chosen for the amplitude estimation of $10^{-3}$ and a target confidence level of $\alpha = 10^{-2}$ then $N_{oracle}{}^{wc} \leq 8$ k can be obtained. This means that the total T-depth is about $1.9 \times 10^8$.

Using the same analysis, for a TARF contract (e.g., with reference to Section 4.2) with $d=1$, $T=26$ and $\Delta t = 1/26$, assuming the underlying has annualized volatility $\sigma = 0.4$, a target error of $\epsilon_{total}/f_\delta \leq 2 \times 10^{-3}$ can be achieved with a total T-depth of $1.7 \times 10^8$ and 15 k qubits.

3.2 Re-Parameterization Method

The limitations of normalization in Riemann summation motivate the development and implementation of a new method to load stochastic processes. In the re-parameterization method, quantum resource estimation system 102 can shift to modelling assets in return space. As described in Section 1.2, in return space underlying assets include uncorrelated normal distributions. Recognize that these different distributions can be loaded by preparing (e.g., in parallel) many standard normals and then applying affine transformations to obtain the means and standard deviations. This approach extracts a specific subroutine-loading a standard normal into a quantum state—and uses it as a resource to load the full distribution of underlying paths. The normal loading subroutine itself can then be precomputed and optimized using variational methods. This is an advantageous combination of fault-tolerant quantum computing with variational compilation and will be discussed in Section 3.2.1. Overall the re-parameterization method avoids the normalization issues in Riemann summation and reduces the computational costs and/or resources. The steps in re-parameterization pricing are described in Algorithm 3.2 defined below. Note that a path $\omega_R \in \Omega_R$ in this context refers to a series of log-returns $\vec{R}^1, \ldots, \vec{R}^T$. The re-parameterization method removes the problematic dependence on $P_{max}$, and the operators $\mathcal{G}_j$ can be implemented with relatively few resources using variationally trained circuits as described in the following sections.

Algorithm 3.2—Re-Parameterization Method Pricing

Use parameters n, d, and T that are all positive integers.

Obtain access to an operator $\mathcal{G}$ that loads a standard Gaussian distribution $\Sigma_i \sqrt{g_i} |i\rangle$ into an n-qubit register. Let $g_i$ be the value of the probability mass function for a standard Gaussian distribution discretized into $2^n$-bins.

1. Apply dT Gaussian operators $\mathcal{G}$, to ndT qubits. This constructs $$\bigotimes_{t=1}^{T} \bigotimes_{j=1}^{d} \mathcal{G}|0\rangle_n = \sum_{\omega_{\bar{R}}} \sqrt{p(\omega_{\bar{R}})} |\omega_{\bar{R}}\rangle_{ndT}, \quad (38)$$

where $\omega_{\bar{R}}$ runs over all $2^{ndT}$ different realizations of this multivariate standard Gaussian, and $p(\omega_{\bar{R}})$ denotes the corresponding probabilities.

2. Let $\Sigma=LL^T$ be the Cholesky decomposition of the covariance matrix. Perform affine transformations $\vec{R}^t = \vec{\mu}^t + L^T \vec{\bar{R}}^t$ to adjust the center and volatility of each Gaussian. Denote the corresponding return paths and probabilities by $\omega_R$ and $p(\omega_R)$, respectively.

3. If the payoff can be computed directly from the log-returns, then directly calculate $\delta(\omega_R) = \arcsin\sqrt{f(\omega_R)}$ into a quantum register $$\Sigma_{\omega_R} \sqrt{p(\omega_R)} |\omega_R\rangle |\delta(\omega_R)\rangle. \quad (39)$$

If the payoff is defined in terms of prices and not just log-returns, then first compute the price space path $\omega$ for each asset using $\vec{S}^t = \vec{S}^0 e^{\Sigma_{j=1}^t \vec{R}^j}$. This calculation can be done in parallel for each asset (e.g., each derivative asset).

4. Introduce an ancilla qubit and rotate the value of the $f(\omega_R)$ register into its amplitude:

$$\Sigma_{\omega_R} \sqrt{p(\omega_R)(1-f(\omega_R))} |\omega_R\rangle |0\rangle + \Sigma_{\omega_R} \sqrt{p(\omega_R)f(\omega_R)} |\omega_R\rangle |1\rangle. \quad (39)$$

5. Use amplitude estimation to extract the probability of the ancilla being $|1\rangle$, which is the (e.g., discretized) expected payoff $\mathbb{E}(\tilde{f})$. Rescale this to obtain $\mathbb{E}(f) = (f_{max} - f_{min})\mathbb{E}(\tilde{f}) + f_{min}$.

3.2.1 Variationally Trained Gaussian Loaders

The standard Gaussian loading operator $\mathcal{G}$ can be pre-computed because, in the re-parameterization method, it is problem independent. This section describes an approach to variationally optimize this operator. Consider the case of preparing a standard normal distribution $g(x_i)$ defined a discretized mesh of points $x_i = -w + i\Delta x$, with $i = 0, \ldots 2^n - 1$, and $\Delta x = 2w/2^n$. In the following example the domain is fixed to $w=5$ so that the full range of value considered is $2w=10$. This choice leaves outside the domain a probability mass of $\sim 5 \times 10^{-7}$. Finally, take into account the different metrics used to normalize a function in real-space and a wavefunction in a quantum register, which is normalized in such a way that the sum of its squared elements is one, therefore, aim to load in the quantum register the following distribution (e.g., the target distribution):

$$g(x_i) \times \Delta x, \Sigma_i g(x_i) \times \Delta x = 1. \quad (41)$$

Notice that, due to the finite truncation domain, the target distribution is normalized to $1-\alpha$. In principle, the distribution can be re-normalized to one in the chosen interval of width 2w. Either way this choice provides a negligible difference when compared with the error observed in the training.

The variational ansatz of choice is represented by a so-called Ry–Controlled NOT (Ry–CNOT) ansatz, with linear connectivity (e.g., with reference to Section 11.0). The various embodiments of the subject disclosure provide a novel strategy to optimize the circuit in this context, which relies on a energy-based method, and is also detailed in Section 11.0. In short, the target cost function is the energy of the associate quantum harmonic oscillator problem, whose ground state is naturally Gaussian. Note that the solution (e.g., the modulus square of the solution) of the discretized quantum harmonic oscillator can coincide to a Normal distribution only in the limit of $\Delta x \to 0$. To fix this, perform a subsequent re-optimization targeting directly the infinity-norm between the two distributions.

$$L_\infty = \max_i |g(x_i) \times \Delta x - \tilde{g}(x_i)| \quad (42)$$

where the quantum state encoded in the register is defined by coefficients $\sqrt{\tilde{g}(x_i)}$.

Notice that training directly with Equation (42) as a cost function is not efficient and a pre-training using the energy based approach is used. Observe how the $L_\infty$ cost-function displays a much more corrugated landscape in the circuit parameter space compared to the energy of the associate quantum harmonic oscillator problem.

Figure 4:
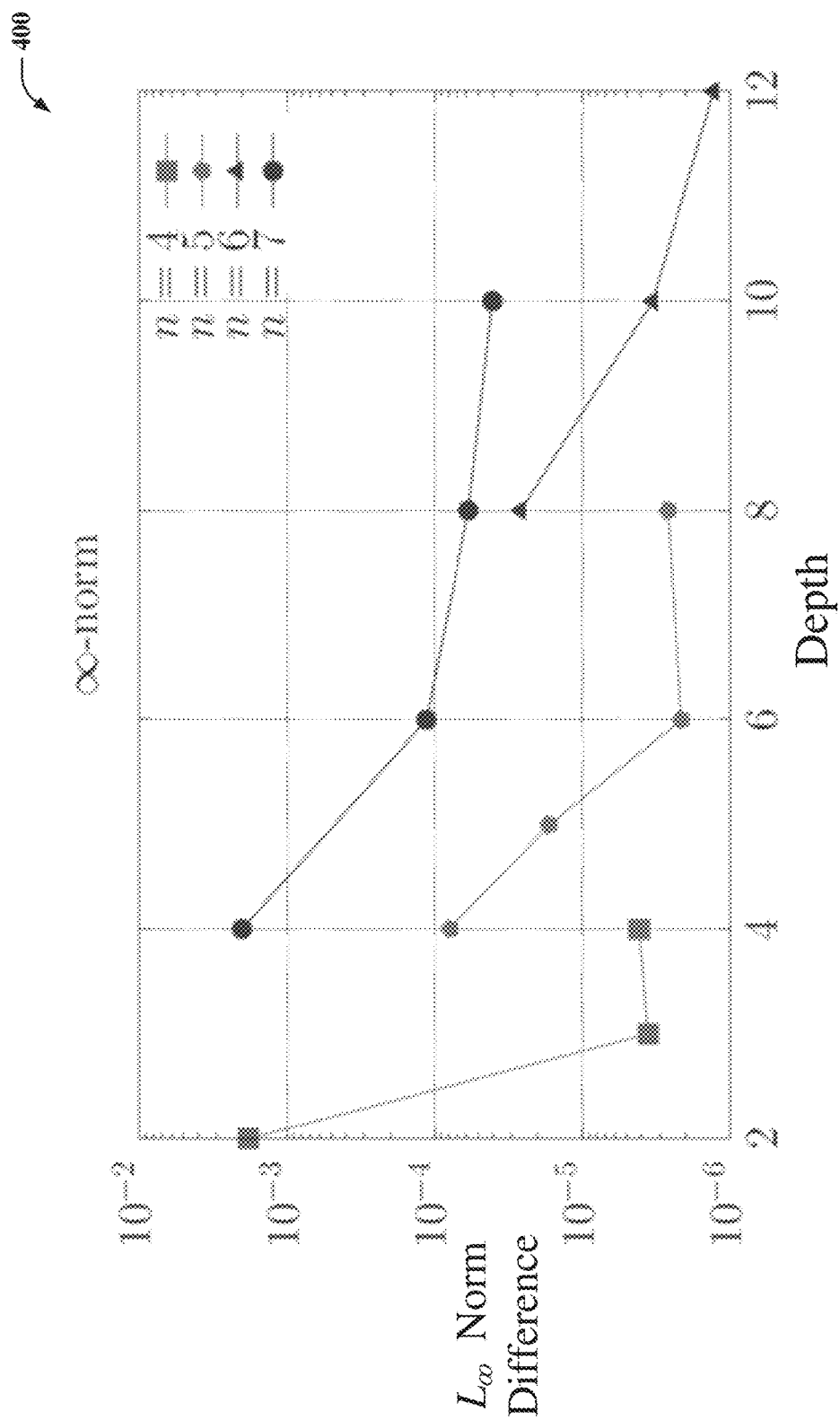
FIGS. 4, 6A, 6B, 6C, 7A, 7B, 8A, 8B, 9A, 9B, and 9C illustrate example, non-limiting graphs that can facilitate estimation of quantum resources to calculate an expectation value of a stochastic process using a re-parameterization method in accordance with one or more embodiments described herein.

Notice that the circuits to encode these Gaussian states for different choices of register size n can be pre-trained in advance and so training is not included as part of the runtime for any given derivative pricing problem. Show in FIG. 4 are results for different register sizes and depth of circuit ansatz. More details are provided in Section 11.0.

FIG. 4 illustrates an example, non-limiting graph 400 that can facilitate estimation of quantum resources to calculate an expectation value of a stochastic process using a re-parameterization method in accordance with one or more embodiments described herein. Repetitive description of like elements and/or processes employed in respective embodiments is omitted for sake of brevity.

Graph 400 illustrates $L_\infty$ errors from training (e.g., via quantum resource estimation system 102 and/or variational component 202) variational Ry-CNOT circuits to approximate $\mathcal{G}$ for different register sizes n. This numerical study shows that the state that can be prepared variationally approaches the target exponentially fast in the depth, hence in the number of gate operations. This observation is in good agreement with the expected behaviour from the Solovay- Kitaev theorem, that provides an upper bound for the number of gates that can be used to achieve a desired accuracy for cost function. Indeed, for any target operation $U \in SU(2^n)$, there is a sequence $S=U_{s_1} U_{s_2} \ldots U_{s_D}$ of operators in a dense subset of $SU(2^n)$, such that error in the energy $\xi$ decreases exponentially with the depth $D=O(\log^c(1/\varepsilon))$. Although the subset of $SU(2^n)$ operations generated by the entangler blocks in the circuit does not generate a dense subset of $SU(2^n)$ arbitrarily close to the exact unitary U (e.g., generator of the target state), it can be numerically observed that the exponential decrease of the error with the number of gates still holds.

This section ends by investigating the portability of these results in the fault-tolerant regime, which can enable application of the whole derivative pricing algorithm. While the numerical results provide evidence for a rather efficient Gaussian state preparation in terms of circuit depths for a Ry–CNOT, an additional step is made in view of a fault-tolerant implementations of such circuit. In this new-framework, the continuous rotation Ry gate is expanded as a finite product of discrete operations. Following again the Solovay-Kitaev theorem, or more specialized results [27], it is possible to have also an efficient representation of any SU(2) operator with a sequence of Clifford+T-gates that scale logarithmically with the threshold error $\epsilon$. Investigate how the results obtained before can be transferred in this regime where rotation's angles can take only discretized value. Therefore, assume that each parameter $\vartheta_{q_i}^k$ can only be represented by the format $j*2\pi/M_{digit}$, where j is an integer. Numerically show in Section 11.0 is how the error introduced by such digitization decreases systematically with the mesh size as $1/M_{digit}$.

3.2.2 Error Analysis

The total error in the re-parameterization approach is $$\frac{\epsilon_{total}}{f_\delta} \leq \epsilon_{trunc} + \epsilon_{disc} + \epsilon_{arith} + \epsilon_{amp}, \quad (43)$$

where $\epsilon_{trunc}$, $\epsilon_{disc}$, and $\epsilon_{amp}$ are the truncation, discretization, and amplitude estimation error bounded in Section 2.3. Here, the term $\epsilon_{arith}$ arises from the individual errors introduced during the preparation of the Gaussians and the calculation of the payoff. Assuming that each Gaussian $g(x_i)$ prepared has $L_\infty$ error $\epsilon_{dens}$ and the payoff calculation introduces a max error of $\epsilon_f$, the total error will be $$\epsilon_{arith} = \sum_{x_1=-w}^{w} \ldots \sum_{x_{dT}=-w}^{w} \left[ \prod_{i=1}^{dT} (g(x_i) + \epsilon_{dens})(f(x) + \epsilon_f) - \prod_{i=1}^{dT} g(x_i) f(x) \right], \quad (44)$$

where $x=(x_1, x_2, \ldots, x_{dT})$. Expanding the integrand and keeping only the linear error terms, gives $$\epsilon_{arith} \leq 2wdTf_\delta \epsilon_{dens} + \epsilon_f \quad (45)$$

where $\sum_{-w}^{w} g(x) \leq 1$ is used due to truncation of the probability mass function.

3.2.3 Resource Estimates

Calculate the resources that can be involved for the same basket auto-callable as in Section 3.1.2, where d=3, T=20, $\Delta t=1/20$, $\sigma_{max}=0.4$, $\sigma_{min}=0.1$ and w=5, and the contract has 5 autocall dates. Further assume that each Gaussian is prepared with n=5 qubits, such that $\epsilon_{dens}=2\times 10^{-6}$, $\epsilon_{amp}=\epsilon_f=10^{-4}$, which gives a total error of $\epsilon_{total}/f_\delta \approx 2 \times 10^{-3}$.

From FIG. 4 it can be observed that Gaussian states can be prepared with $L_\infty \sim 2 \times 10^{-6}$ using 5 qubits and circuit depth 6, requiring 7 layers of Ry gates. With these inputs and using the resource calculations described in Section 10.0, constructing the Q operator using re-parameterization involves 7.5 k qubits and has a T-depth of 5.7 k, which includes the computation of prices from log-returns, Equation (11). For a target confidence level of $\alpha=10^{-2}$, the total T-depth is $4.6 \times 10^7$. With the re-parameterization method, pricing the TARF of Section 3.1.2 with d=1, T=26, $\Delta t=1/26$ and $\sigma=0.4$ to accuracy $\epsilon_{total}/f_\delta \approx 2 \times 10^{-3}$ uses a total T-depth of $6 \times 10^7$ and 9.5 k qubits.

4.0 Payoffs

4.1 Auto-Callable Contracts

An auto-callable contract is typically defined in terms of asset returns relative to predefined reference levels, and includes a notional value which is used to calculate the dollar value of the contract. For a single underlying, an auto-callable can include:

- a set of binary options $\{(K_i, t_i, f_i)\}_{i=0 \ldots m-1}$ each with strike $K_i$, exercise time $t_i$, and fixed payoff $f_i$. Assume these are sorted so that $t_i < t_{i+1}$.
- a short knock-in put with strike $K_o$ and barrier b, and
- the condition that if any binary option pays off then all subsequent options at later times and the put are knocked out.

The strike and barrier parameters are defined in terms of returns of the underlying asset price S(t) relative to a reference level, which without loss of generality can be taken to be the initial spot price of the underlying $S_0$. The payoff $f_i$ of the binary options is similarly defined as a dimensionless parameter denoting a return. In return space, where the basis vectors represent log-returns of the underlying asset (see Section 1.2), checking whether the underlying asset has crossed a strike or barrier K given a log-return value R, can involve checking whether $e^R \geq K$. Let $\hat{f}_i$ be the normalized payoff given by $$\hat{f}_i = \frac{e^{-rt_i} f_i + e^{-rt_{m-1}} K_o}{e^{-rt_{max}} f_{max} + e^{-rt_{m-1}} K_o}. \quad (46)$$

Algorithm 4.1—Auto-Callable Payoff Implementation

Obtain an auto-callable with parameters $\{(K_i, t_i, f_i)\}_{i=0 \ldots m-1}$, $K_o$ and b.

1. For each time step $t=1 \ldots T$ assume access to the cumulative return $|e^{\Sigma_{i=0}^t R^i} \rangle = |R_c^t \rangle$, calculated by the path distribution loading method of choice.

2. For each $t_i$ apply in parallel a comparator to obtain the strike register $|R_c^{t_i} < K_i \rangle_m$.

Figure 5:
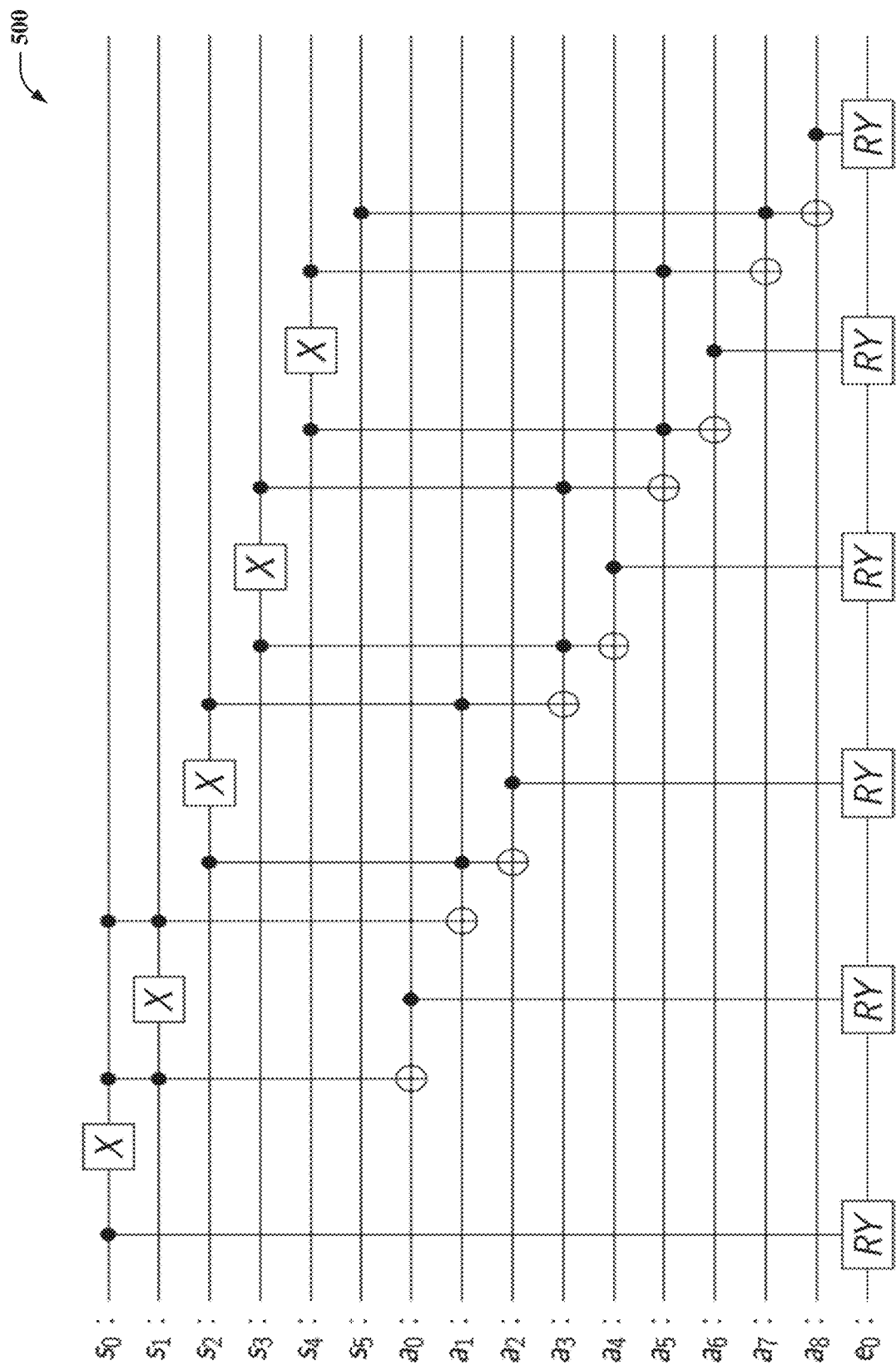
FIG. 5 illustrates an example, non-limiting circuit that can facilitate estimation of quantum resources to calculate an expectation value of a stochastic process using a re-parameterization method in accordance with one or more embodiments described herein.

3. Let $\theta_i = \arcsin(\sqrt{\hat{f}_i})$. Serially, for each bit of the strike register apply a controlled rotation of $\theta_i$ into an accumulator qubit conditioned on all previous bits having been zero. This is illustrated in FIG. 5. This introduces an m-qubit ancilla register a.

4. For each cumulative return $|R_c^t \rangle$ apply in parallel a comparators to obtain a register $|R_c^t < b \text{AND} R_c^t < K_o \rangle_T$, denoting if the put option has been knocked in and if it is in the money. Then OR these bits together to obtain $|put \rangle_1$, which holds whether the payoff from the put option is considered.

5. Compute $|R_c^t - K_o\rangle$ and normalize it using Equation (46) to obtain the put option payoff $|f_p\rangle$. Compute arcsin($\sqrt{f_p}$).

6. Then control on both $|put\rangle$ and $a[m-1]$ to rotate $|arcsin(\sqrt{f_p})\rangle$ bitwise into the target qubit using controlled $R_y$ rotations.

FIG. 5 illustrates an example, non-limiting circuit 500 that can facilitate estimation of quantum resources to calculate an expectation value of a stochastic process using a re-parameterization method in accordance with one or more embodiments described herein. Repetitive description of like elements and/or processes employed in respective embodiments is omitted for sake of brevity.

Circuit 500 comprises an example, non-limiting circuit that can be used to accumulate binary option payoffs in an auto-callable with 5 binary options. Here the qubits $s_0, \ldots, s_5$ represent the boolean comparisons for the 5 strike values $K_i$. A payoff $f_i$ (e.g., given by a particular phase in the RY rotation) only occurs if no previous payoff has happened. The overall payoff is loaded into the amplitude of qubit $e_0$.

Amplitude estimation allows calculation of the expected return of the contract $\mathbb{E}_R(f)$, and its dollar value will be given by $V = N \cdot \mathbb{E}_R(f)$, where N is the notional value specified in the contract. An auto-callable can also be defined on a basket of assets instead of just one. Typical examples include BestOf and WorstOf, where the return of the contract is based on the return of the best or the worst performing asset in the basket respectively. These can be treated similarly to the single-asset case where the return of each asset $|R_c^T - K_o\rangle_{j=1, \ldots, d}$ is first compared to find the largest or smallest (e.g., as appropriate).

Steps 2 and 4 in Algorithm 4.1 defined above can be performed with logical operation circuits (e.g., Comparator, AND, OR) which introduce no error, while steps 3 and 6 involve use of controlled-Ry rotations whose decomposition into T-gates is a function of an additive error $\epsilon$, which can be chosen depending on the desired accuracy of the calculation. Step 5 is the most resource heavy component of the payoff circuit, which can involve the computation of the quantum register $|R_c^t - K_o\rangle$, the division of that register by the classical constant in the denominator of Equation (46), as well as the computation of the square root and arcsine of the register. Describe in detail in Section 8.1 are the resource criteria for all the above circuit components, and the corresponding arithmetic and gate synthesis error in Section 8.2.

Again consider the auto-callable contract from Section 3.1.2 and Section 3.2.3 with 5 autocall dates, defined on d=3 assets and simulated using T=32 timesteps. Target a total additive payoff error $\epsilon_f$ which when distributed across the operations of steps 3, 5, 6 in Algorithm 4.1 determines the resources that can be used by each component. For $\epsilon_f = 10^{-4}$, the circuit computing the auto-callable payoff involves 1.6 k qubits and a T-depth of 2 k, assuming computations can be parallelized wherever possible.

4.2 TARFs

This section describes the TARF implementation for a single underlying in price space.

A TARF is:

A forward price F, payment dates $t_1, \ldots, t_m$, and two strike prices $K_{upper}$ and $K_{lower} \leq F$, a knock-out price $K_o$, and an accrual cap $C \in \mathbb{R}_+$. Assume dates are sorted so that $t_i \leq t_{i+1}$.

At each time $t_i$ the TARF has a payoff $$f_i = \begin{cases} S^i - F \text{ if } S^i > K_{upper} \\ 2(S^i - F) \text{ if } S^i < K_{lower} \\ 0 \quad \text{otherwise.} \end{cases} \quad (47)$$

a knock-out condition that if at any $t_i$ the price is above $K_o > F$ all subsequent payoffs are knocked out an accrual cap condition such that if the total gain accumulated by any payment date exceeds C the contract holder only receives a payoff such that the total gains equals C and the rest of the forward contracts are knocked out.

Let $\tilde{f}_i$ be the normalized payoff given by $$\tilde{f}_i = \frac{e^{-rt_i} f_i + \sum_{j=1}^{m-1} e^{-rt_j} 2TF}{\sum_{j=1}^{C/(K_o - F)} e^{-rt_j}(K_o - F) + \sum_{k_j=1}^{m-1} e^{-rt_j} 2TF}. \quad (48)$$

Algorithm 4.2—TARF Payoff Implementation

Obtain a TARF with parameters (F, $t_1, \ldots, t_m$, $K_{upper}$, $K_{lower}$, $K_o$, C).

1. Begin with a knock-out and accrual cap qubit $|0\rangle_o, |0\rangle_c$

2. For all times $t_i$ apply in parallel three comparators and combine some of their results to obtain the registers $|S^{t_i} > K_o\rangle_m, |K_{upper} < S^{t_i} < K_o\rangle_m, |S^{t_i} < K_{lower}\rangle_m$ 3. For each $t_i$:
   (a) OR $|S^{t_i} > K_o\rangle_i$ with $|\bullet\rangle_o$ onto a new qubit which can be relabelled $|\bullet\rangle_o$
   (b) Compute the payoff (e.g., conditioned on the different strike qubits) and add the payoff to a register keeping track of the total payoff to obtain $|\Sigma_{j=1}^{i} f_j\rangle_i$
   (c) Apply a comparator to compute whether the accrual cap has been reached to obtain $|\Sigma_{j=1}^{i} f_j > C\rangle_i$
   (d) Compute the amount that makes the total equal to C to obtain $|C - \Sigma_{i=1}^{i-1} f^j\rangle_i$
   (e) Compute the normalized payoff $\tilde{f}_i$ in the cases for which the accrual cap was and was not reached in parallel and add the appropriate one controlled on the AND of the respective condition, the NOT of the (e.g., new) knock out qubit $|\bullet\rangle_o$ and NOT of the accrual cap qubit $|\bullet\rangle_c$ to obtain $|\Sigma_{j=1}^{i} \tilde{f}_j\rangle_i$.
   (f) AND the $|\Sigma_{i=1}^{i-1} = f_j > C\rangle_i$ and cap qubit $|\bullet\rangle_c$ and store the result into a new qubit which can be relabelled $|\bullet\rangle_c$ 4. Compute $\theta = \arcsin(\sqrt{\Sigma_{j=1}^{T} \tilde{f}_j})$ into $|\theta\rangle$ 5. On a final encoding qubit $|0\rangle_e$, apply a series of controlled $R_y$ rotation of angle $2^{-i}$ controlled for each qubit i of $|\theta\rangle$.

5.0 Discussion

The various embodiments of the subject disclosure described herein provide a thorough resource and error analysis to price financial derivatives using quantum computers. In particular, these various embodiments use auto-callables and TARFs as example case studies, which are two types of path-dependent options that are relevant in practice and difficult to price classically. To this extent, the various embodiments of the subject disclsoure provide a new method to load stochastic processes that overcomes the limitations of existing approaches. Although these various embodiments involve geometric Brownian motion, the subject disclosure is not so limiting, as the approach described herein can be easily extended, for example, to stochastic or local volatility methods by loading multiple independent stochastic processes and having a conditional or non-stationary re-parametrization.

The resource estimates provided herein give a target performance threshold for quantum computers capable of demonstrating advantage in derivative pricing. Assuming a target of 1 second for pricing an auto-callable option, the quantum processor would have a logical clock rate of 10 MHz at a code distance that can support $10^1$ 1 logical operations.

Although current estimates of the logical clock rate are around 10 kilohertz (kHz), that is, approximately three orders of magnitude below, future work on algorithms, circuit optimization, error correction, and hardware will continue to improve the resource criteria and runtimes. For example, in the case of Shor's algorithm, the estimated resource criteria have reduced by almost three orders of magnitude through careful analysis across several publications. The subject disclsoure described herein represents the first milestone on the journey towards Quantum Advantage for pricing financial derivatives.

6.0 Background on Derivatives 6.1 Forwards

An example of a derivative is a forward contract, often simply called a forward. With a forward, the holder promises to buy or sell a certain asset to the issuer on a specified date in the future at a fixed price F known as the forward price. A simple path-independent example is where the holder promises to buy x amount of an asset at F dollars per asset m months from now. Forwards are typically settled in cash, that is, instead of the money and asset exchanging hands on the expiration date, a payoff is determined based on the value of the asset and there is only an exchange of money determined by this payoff. For example, if the price at the expiration date T of the asset is $S^T$, the payoff is given by $f(S^T)=x(S^T-F)$, where if $f(S^T)>0$, the contract holder makes a profit (and the issuer a loss) and the opposite if $f(S^T)<0$.

6.2 Options

Another example of a derivative is an option. Options can be viewed as conditional forwards. With an option contract, the holder has the option to buy or sell a certain asset to the issuer on some future date at a pre-determined price, unlike the forward where the issuer is obliged to buy or sell the asset. If the holder chooses to buy or sell the asset, they have chosen to exercised the option. Similarly to the forwards, option contracts are usually settled in cash based on the value of the asset on the exercise date. An example of a path-independent option with a single underlying asset is a European call option, where the issuer has the option of buying an asset at a strike price K on expiration date. The payoff on expiration date can then be written as $f(S^T)=\max(S^T-K, 0)$. A European put option is where the issuer has the option of selling an asset at a strike price K on expiration date, which gives a payoff of $f(S^T)=\max(K-S^T,0)$. Another example of a path-independent option is a binary option which has a fixed payoff if the underlying asset is above or below the strike at time T.

6.3 Path-Dependence and Discounted Payoffs

An example of a path-dependent derivative is a knock-out European call option. This is the same as a European call option, but with an additional knock-out price $\pi$. If at any time from 0 to T the underlying asset goes above this value, then the contract is worth nothing. This path-dependent payoff function has the form $$f(S^0, S^1, \ldots, S^T) = \begin{cases} S^T - K & \text{if } S^T > K \text{ and } S^i < \pi, \forall i \in \{0, \ldots, T\} \\ 0 & \text{otherwise.} \end{cases} \quad (49)$$

The inclusion of the value of the underlying at times other than T is what introduces path dependence. Another example is a knock-in t option which has payoff $$f(S^0, S^1, \ldots, S^T) = \begin{cases} K - S^T & \text{if } S^T > K \text{ and } S^i < \pi, \forall i \in \{0, \ldots, T\} \\ 0 & \text{otherwise.} \end{cases} \quad (50)$$

Here the contract is knock-in because it only has non-zero payoff if the asset goes below some value $\pi$. in the amount the asset is below the strike price K.

In the examples discussed so far, there has only been one payment date where an exchange takes place between the contract issuer and holder, at time T. It is possible for some path-dependent options to have several payment dates, where several payments are made at different times throughout the course of the contract duration.

Now to introduce the notion of a discounted payoff. As expected, the price today for any derivative is related to its expected payoff in the future. However, the time delay for the payoff to account for the opportunity cost of investing in a risk-free asset with interest rate r can also be considered. If a contract has a payoff $f^i$ at time $t_i$ from today, the discounted payoff can be defined as $$e^{-rt_i}f^i. \quad (51)$$

The price of a derivatives contract is given by the expected value of the discounted payoff under the stochastic process for the underlying assets. In practice, path-dependent derivatives are much more difficult to price computationally and are often priced using Monte Carlo simulations of the paths. This is in contrast to some models for path-independant derivatives that can even have analytic solutions, such as the Black-Scholes model for European call options. Path-dependent options present an opportunity to use quantum speedups for Monte Carlo to gain advantage.

6.4 Auto-Callable Options

A typical example of an auto-callable ('automatically callable') option is a set of binary options, each of which pays different fixed payouts at different payment dates and then knocks out the whole product (e.g., voids all future payoffs) if it makes a payout at any of the payment dates. More formally, let $(K, t_i, f^i)$ be a binary option that has payoff $f^i$ if the underlying asset value is above strike price K at time $t_i$. An auto-callable is then a set $$\{(K,t_1,f_1),(K,t_2,f_2), \ldots ,(K,T,f_T)\}, \quad (52)$$

where $\{t_i\}$ and $\{f_i\}$ typically increase linearly. If any of the binary options $(K, t_i, f_i)$ pays out (is in the money), then all subsequent options $\{(K, t_j, f_j)\}_{j>i}$ are knocked out (e.g., voided).

In practice, these binary options are often bundled with a short knock-in put option, that is, a knock-in put option given to the issuer by the holder, which mitigates risk for the issuer and decreases the price for the client. As with the set of binary options, this put option is also knocked out if any of the binary options $(K, t_i, f^i)$ pays out.

As is common with many options, auto-callables can be expanded to have multiple underlying assets. In this case, it is typical to tie the overall option payoff to the best or worst performing asset, where performance is defined in terms of returns and the payoff of the knock-in put option is proportional to the return of the best or worst performing asset if that asset is below the strike price. Note that the strike for the underlying j will often be the same in return space, that is, the strike price for each asset $K_j$ can be written as $kS_j^0$ where k is the same constant for all underlying assets. Thus, if the worst performing asset is in the money (e.g., above the strike price), then so are all the other assets. Conversely, if the best performing asset is below the strike price (or out of the money), then so are all the other assets. In principle the different underlying assets could have independent strike prices but since this in not common, the assumption can be made that all the strike prices are defined as $kS_j^0$.

The contingent payoffs and the knock-in put mean that auto-callables have a payoff that is strongly path dependent. This means that they are computationally expensive to price in practice, sometimes taking five to ten seconds using classical Monte Carlo methods with at least forty thousand paths.

6.5 Target Accrual Redemption Forwards

A target accrual redemption note (TARN) is any derivative whose payoff is capped at a specified target amount. The term historically referred only to notes, hence the name, but has now come to include any derivative with an accrual cap. The various embodiments of the subject disclosure uses a commonly used TARN called a target accrual redemption forward (TARF) as an example case study to implement quantum resource estimation system 102. A TARF is a set of forwards with a couple of knock-out conditions. Specifically, it is a derivative with a single underlyer with several (e.g., 20-60) payment dates and a forward price F. Throughout the contract, there can be two fixed strike prices $K_{upper}=F$ and $K_{lower}<F$. At each payment date $t_i$, there are several payoff possibilities:

$$f^i = \begin{cases} S^{t_i} - F & \text{if } S^{t_i} > K_{upper} \\ 0 & \text{if } K_{lower} \leq S^{t_i} \leq K_{upper} \\ a(S^{t_i} - F) & \text{if } S^{t_i} < K_{lower} \end{cases} \quad (53)$$

where $S^{t_i}$ is the price of the underlyer at the payment date $t_i$ and $\alpha$ is a positive constant. Note that when $S^{t_i}<K_{lower}$, the payoff is negative and hence the holder of the derivative takes a loss. The constant $\alpha$ makes this loss asymmetric if it happens and is often one or two.

In addition, a TARF will have two knock-out conditions based on a knock-out threshold $\pi$ and accrual cap C. The first condition states that if at any payment date the price of the underlying is greater or equal to $\pi$, the derivative contract is immediately knocked out (e.g., without payment for that date). The second condition is if at any payment date $t_i$ the total gains of the holder are going to exceed the accrual cap C due to the payoff $f^i$, the contract holder instead only receives the amount such that their total gains sum up to C and the contract is then knocked out.

7.0 Insufficiency of Grover-Rudolph Loading

The Grover-Rudolph algorithm is often cited as a method to efficiently create quantum superpositions that correspond to classical distributions. For a given probability distribution $\{p_i\}$ of a random variable x, the algorithm creates a quantum superposition of the form $$|\psi(\{p_i\})\rangle = \Sigma_i \sqrt{p_i}|i\rangle. \quad (54)$$

The algorithm is inductive in nature and starts by assuming that there is a way to divide the probability distributions into some number $2^m$ of regions in the domain of interest and create the state $$|\psi_m\rangle = \Sigma_{i=0}^{2^m-1} \sqrt{p_i^{(m)}}|i\rangle, \quad (55)$$

where $p_i^{(m)}$ is the probability for the random variable to lie in region i. Then it aims to add one qubit to the state of Equation (55), to further subdivide the $2^m$ regions into a $2^{m+1}$ discretization of the probability distribution with an evolution of the form $$\sqrt{p_i^{(m)}}|i\rangle \to \sqrt{\alpha_i}|i\rangle|0\rangle + \sqrt{\beta_i}|i\rangle|1\rangle, \quad (56)$$

where $\alpha_i(\beta_i)$ is the probability for the random variable to lie in the left or right half of region i. Letting $x_L^i$ and $x_R^i$ denote the left and right boundaries of region i, the function $$f(i) = \frac{\int_{x_L^i}^{\frac{x_R^i - x_L^i}{2}} p(x)dx}{\int_{x_L^i}^{x_R^i} p(x)dx} \quad (57)$$

is the probability that, given x lies in region i, it also lies in the left half of the region. If a circuit can be constructed that can perform the computation $$\sqrt{p_i^{(m)}}|i\rangle|0\ldots0\rangle \to \sqrt{p_i^{(m)}}|i\rangle|\theta_i\rangle \quad (58)$$

with $\theta_i = \arccos\sqrt{f(i)}$, then a controlled rotation of angle $\theta_i$ on the m+1th qubit yields $$\sqrt{p_i^{(m)}}|i\rangle|0\rangle \to \sqrt{p_i^{(m)}}|i\rangle|\theta_i\rangle(\cos\theta_i|0\rangle + \sin\theta_i|1\rangle). \quad (59)$$

After uncomputing $|\theta_i\rangle$, $$|\psi_{m+1}\rangle = \Sigma_{i=0}^{2^{m+1}-1} \sqrt{p_i^{(m+1)}}|i\rangle, \quad (60)$$

which is the extension of the state in Equation (55) to one extra qubit. Performing this iteration $n=\log_2 N$ times gives a discretization of the distribution over N total number of points across n qubits.

In practice, the efficiency of the Grover-Rudolph method relies on the ability to perform the integrals in Equation (57) in superposition. The argument in the original formulation is that probability distributions that can be integrated efficiently classically using probabilistic methods (e.g., using Monte Carlo) can be equivalently efficiently integrated quantumly. However, since the ultimate goal in quantum derivative pricing is to provide a faster alternative to Monte Carlo integration over a probability distribution, performing this integral as part of an initial state preparation without any corresponding quantum speedup, nullifies the advantage offered by amplitude estimation as an alternative to Monte Carlo. While efficient from a complexity point of view, this means that Grover-Rudolph is insufficient as a method for quantum advantage in derivative pricing.

More recently, an approximate method to implement the Grover-Rudolph algorithm for standard normal probability distributions was presented, where the authors suggest the expression in Equation (57), written as $$g(x, \delta) = \frac{\int_x^{x+\delta/2} p(x)dx}{\int_x^{x+\delta} p(x)dx}, \quad (61)$$

can be approximated as $$g(x,\delta) \approx 1/2 + 1/8 \delta x + \mathcal{O}(\delta^2), \quad (62)$$

for small $\delta$. As the $\delta$ parameter decreases with each iteration of the Grover-Rudolph algorithm adding a qubit to the discretization, the authors highlight that for $m \geq 7$ the approximation in Equation (62) becomes sufficiently accurate. However, because the Grover-Rudolph construction is iterative, the $m < 7$ terms can be computed before the above approximation becomes possible. As such, the integrals in Equation (57) are computed classically and then loaded into the corresponding quantum registers. While this approximation allows the simplification of the general Grover-Rudolph algorithm for standard normal distributions after a certain point in the iteration, it does not change the fact that it can involve computing integrals over the entire domain of the probability distribution, thus making it practically infeasible for the same reason as the original Grover-Rudolph method.

8.0 Fixed-Point Quantum Arithmetic Resources

This section describes preliminaries for common quantum arithmetic operations and the synthesis of arbitrary rotations. These operations are used in resource estimation and error analysis. Quantum arithmetic can be involved in path loading using the Riemann summation method (Section 3.1) and the re-parameterization method (Section 3.2), as well as the payoff calculation described in Section 4.0. For the Riemann sum method, all the arithmetic operations involved in Equation (12) can be performed, as well as computation of the arcsine and square root of a quantum register for the payoff calculation in Equation (15). Algorithms to perform individual arithmetic operations efficiently have been identified, where resources are usually reported as a number of Toffoli gates or T-gates. In cases where arithmetic algorithms are performed from previous work in the literature, the gate cost in terms of the gate set reported by the authors has been reported herein.

In the fault-tolerant setting, estimation of the T-depth of the circuits in a Clifford+T gate set decomposition can be made and the assumption can be made that Toffoli gates can be constructed with a T-depth of one using ancilla qubits. For each operation the assumption can be made that the resulting circuits can be parallelized wherever possible.

8.1 Resource Estimation

Perform all calculations in fixed-point arithmetic. An n-bit representation of a number x is $$x = \underbrace{x_{n-1} \ldots x_{n-p}}_{p} . \underbrace{x_{n-p-1} \ldots x_0}_{n-p}, \quad (63)$$

where $x_i \in {0,1}$ denotes the i-th bit of the binary representation of x and p denotes the number of bits to the left of the binary decimal point. The choice of n and p controls the error that can be allowed in each calculation as well as the resources that can be used to perform arithmetic on the registers. Once the values of (n, p) are chosen so that the overall arithmetic error is acceptable for the problem under consideration, keep them constant throughout the analysis. It is possible to tailor these values for different components of the circuit and reduce the overall resources that can be used, but for simplicity of description in the subject disclosure, this potential optimization can be ignored.

Let $TF_f$ and $T_f$ denote the number of Toffoli gates and the T-depth used to compute an arithmetic function or logical operation f. The estimates for the operations are functions of the fixed-point register size (n, p) that will be used to represent the underlying quantum states involved in the computations.

Addition and/or Subtraction

Perform addition of two n-qubit registers in place with Toffoli cost $2n-1$. Note that subtraction is given by $a-b = \sim(\sim a + b)$ and so can be implemented as an addition with 2n extra X gates, which does not change the Toffoli count.

Consider the T-depth cost of controlled and uncontrolled addition, where addition circuits can be constructed with T-depth $T_{add} = 10$ independent of the register size, and controlled addition with T-depth cost of $\mathcal{O}(n)$ for registers of size n.

Multiplication

For multiplication, use a controlled addition circuit and a Toffoli count of $$TF_{mul}(n,p) = 3/2 n^2 + 3np + 3/2 n - 3p^2 + 3p. \quad (64)$$

This method can also be used for division of a quantum register by a classical value, which can be done by inverting the classical value and employing the multiplication algorithm.

The fixed-point multiplication method involves n controlled additions, which thus has T-depth cost of $\mathcal{O}(n^2)$. These methods can use ancilla qubits proportional to the register size, but the circuits include uncomputing the ancillas, meaning that they can be reused for each subsequent addition that is not done in parallel. Because the computations can be parallelized across the d assets and T timesteps, include an additional T*d*n qubits when counting the total to account for these potential ancilla qubits.

Additionally parallelize each multiplication circuit, by considering the register of one factor as $z \geq 1$ independent registers of size n/z, and each controlled addition can happen in parallel for the z subregisters. This can use $n \cdot (z-1)$ extra qubits and $z-1$ additions to accumulate the z sub-results into the final result. $z=1$ denotes that no extra parallelization is employed. If the pairwise accumulation additions can be parallelized as well, a total T-depth cost of parallelized fixed-point multiplication can be given by $$T_{mul}(n, z) = \left\lceil \frac{n}{z} \right\rceil \cdot n + \lceil \log_2 z \rceil \cdot T_{add}. \quad (65)$$

Square Root

Employ a square root algorithm that can be extended for quantum registers in fixed-point representation. For an (n, p)-sized number x, compute $\sqrt{x}$ by treating x as an n-digit integer, and then shifting the result to the right $(n-p)/2$ times. This amounts to performing $$\sqrt{x} \mapsto \sqrt{\frac{x * 2^{n-p}}{2^{n-p}}}. \quad (66)$$

The Toffoli count of this square root algorithm is $$TF_{sq}(n, p) = \frac{n^2}{2} + 3n - 4. \quad (67)$$

The T-depth of this algorithm as reported by the authors is given $T_{sq}(n)=5n+3$ and can use $2n+1$ qubits.

Logical Operations

For comparisons between quantum registers or between a quantum register and a constant, use a logarithmic comparator with Toffoli/T-depth of $2\lfloor\log_2(n-1)\rfloor+5$, which includes uncomputing the intermediate ancillas. The logical OR operation for a 2-qubit input can be performed with a Toffoli/T-depth of one.

Exponential

A generic quantum algorithm can be used to calculate smooth classical functions using a parallel piecewise polynomial approximation. Apply this to estimate the resources of computing exponentials. The algorithm takes parameters k and M, which control the polynomial degree chosen for the piecewise approximations and the number of domain subintervals respectively. The total number of Toffolis is given by $$TF_{exp}(n,p,k,M)=3/2n^2k+3npk+7/2zk-3p^2d+3pk-d+2Md \\ (4\lceil\log_2 M\rceil-8)+4Mn. \quad (68)$$

This algorithm, which can also be used to compute the arcsine function, involves k iterations of a multiplication and an addition, where k-degree polynomials are used for the approximation. Additionally, for M chosen subintervals, it involves M comparison circuits between the n-qubit input register and a classical value. Using a comparator with T-depth of $2\lfloor\log_2(n-1)\rfloor+5$, the T-depth of a parallel polynomial evaluation circuit is $$T_{pp}(n,z)=k(T_{mul}(n,z)+T_{add})+M(2\lfloor\log_2(n-1)\rfloor+5), \quad (69)$$

where z is the optional parallelization factor introduced in the resource estimation above for the multiplication circuit.

The qubit count for the parallel polynomial evaluation scheme for choices of the polynomial degree k and number of subintervals M is $$q_{pp}(n,k,M)=n(d+1)+\lceil\log_2 M\rceil+1. \quad (70)$$

Arcsine

To calculate the arcsine, employ the above described generic quantum algorithm just as can be done for the exponential. However, because the derivative $$\frac{d\arcsin(x)}{x}=\frac{1}{\sqrt{1-x^2}} \quad (71)$$

diverges near $\pm 1$, the authors of the generic quantum algorithm use the transformation $$\arcsin(x)=\frac{\pi}{2}-2\arcsin\left(\sqrt{\frac{1-x}{2}}\right) \quad (72)$$

to handle the interval $x\in[0.5,1]$. Since the computation of the arcsine can involve a conditional square root evaluation of the argument and, whenever an arcsine is calculated, calculate the square root as well (e.g Equation (15)), and use the transformation $$\arcsin(\sqrt{x})=\frac{\pi}{2}-\arcsin(\sqrt{1-x}). \quad (73)$$

The resource estimation considerations then follow similarly to those in a prior art approach. Obtain:

A comparator to check if $x<0.25$ ($\sqrt{x}<0.5$) that indicates whether the above transformation should be applied, which can use two Toffoli gates assuming the value in the quantum register is normalized.

A conditional subtraction and conditional copy depending on the comparator value above to either prepare $\sqrt{x}$ or $\sqrt{1-x}$. A conditional copy can use n Toffolis, a conditional subtraction can use $TF_{add}+n$ Toffoli gates.

$TF_{sq}$ Toffoli gates for the square root computation.

The Toffoli gates used for the polynomial evaluation to compute the arcsine.

A conditional copy and conditional subtraction depending again on the comparator result from the first step, to get either $\arcsin(\sqrt{x})$ for $x<0.25$ or $\pi/2-\arcsin(\sqrt{1-x})$ otherwise.

With the above considerations and the Toffoli count for the polynomial approximation of $\arcsin(x)$, the total Toffoli count for computing $|\arcsin\sqrt{x}\rangle$ is $$TF_{arcsq}(n,p,k,M)=k\left(\frac{3}{2}n^2+n\left(3p+\frac{7}{2}\right)-3(p-1)p-1\right)+ \\ \frac{n^2}{2}+11n+2Md(4\lceil\log_2 M\rceil-8)+4Mn-2. \quad (74)$$

The T-depth for computing $\arcsin(\sqrt{x})$ of a number x represented in a register of size (n, p), calculated similarly to the exponential is $$T_{arcsq}(n,p,z)=T_{sq}(n)+T_{pp}(n,z)+8n+6, \quad (75)$$

where $T_{sq}(n)=5n+3$ is the T-depth for the square root algorithm.

The operation will involve $q_{arcsq}$ qubits, where the qubit criteria for the arcsine can be given by Equation (70) for a choice of k and M, and $2n+1$ for the square root operation $$q_{arcsq}(n,k,M)=q_{pp}(n,k,M)+2n+1 \quad (76)$$

$R_y$

Use $R_y(\theta)$ rotations in the variational preparation of Gaussians discussed in Section 3.2.1 and controlled-$R_y$ rotations to encode the payoff into the amplitude of an ancilla in Equation (16) as well as the transition probabilities in the Riemann summation method. Using the Repeat-Until-Success method, an arbitrary single-qubit unitary can be performed within precision $\epsilon$ with a T-depth of approximately $1.15\log_2(1/\epsilon)$ using one ancilla qubit and measurement.

When the angle $\theta$ to rotate is stored in a separate register $|\theta\rangle$, obtain and/or use a series of $R_y(\theta_k)$ rotations, each controlled on the kth qubit of $|\theta\rangle$ where $$\theta_k=\frac{2^k}{2^{n-p}}. \quad (77)$$

A single controlled-$R_n$ can be performed with an $R_n$-depth of one, $R_n$-count of 3 and with a single ancilla qubit using a decomposition. However each rotation contributes an error $\epsilon$ so if $|\theta\rangle$ is an n-qubit register (e.g., with p bits to the left of the binary point), the end-to-end operation can be performed to precision $\epsilon$ with T-depth of at most $1.15n\log_2(n/\epsilon)$. Reduce this depth slightly by noticing that the amplitude increase due to any controlled-$R_n$ rotation where $\theta_k<\arcsin(\epsilon)$ is less than $\epsilon$ and hence is uneccesary. Therefore using that observation and Equation (77), compute the total number of rotations to be n−max($\lfloor\log_2(\arcsin(\epsilon)\rfloor+(n-p),0)$. This gives a final T-depth for a controlled-Ry(θ) operation of $$T_{Ry}(n,p,\epsilon)=1.15\tilde{n}\log_2(\tilde{n}/\epsilon) \qquad (78)$$

where $\tilde{n}=n-\max(\lfloor\log_2(\arcsin(\epsilon)\rfloor+(n-p),0)$.

8.2 Error Analysis

Given the fixed-point representation of Equation (63), each arithmetic operation involving registers results in some approximation error, depending on the specific method used. Outlined here is the arithmetic error associated with each of the operations described in the previous section.

Addition and/or Multiplication

Use a fixed-point addition and a multiplication method, where the addition of two (n, p)-sized registers introduces an error bounded by $$\epsilon_A = \frac{1}{2^{n-p}},$$

and the error associated with multiplication is at most $$\epsilon_M(n,p) = \frac{n}{2^{n-p}}. \qquad (79)$$

For (n, p)-sized registers X and Y, where each register already contains additive errors $\epsilon_X$, $\epsilon_Y$ and each factor X, Y is bounded above by b, the error in the computation of X·Y is given by $$\epsilon_{mul}=b^*(\epsilon_X+\epsilon_Y)+\epsilon_X\epsilon_Y+\epsilon_M(n,p) \qquad (80)$$

Exponential

Employ parallel polynomial evaluation methods to estimate the resources and associated error in computing exponentials. The error associated with the algorithm depends on choices for the degree of the polynomial approximation and the number of subintervals chosen, but the authors of such algorithm provide explicit error estimates and corresponding resources for errors ranging from $10^{-5}$ to $10^{-9}$. Use these in the overall error estimate. Compute the exponential of a register that itself contains arithmetic error ξ. Denoting the error in computing the exponential of a register $\epsilon_{exp}$, the total arithmetic error in computing the exponential of a register can be approximated to first order in ξ in the Taylor expansion of exp(−x+ξ) as $$\bar{\epsilon}_{exp} \lesssim \epsilon_{exp}+\xi. \qquad (81)$$

Square Root

As discussed in the previous section, for square root computations consider a square root algorithm, extended for quantum registers in fixed-point representation. The mapping in Equation (66) can introduce a maximum error of $$\epsilon_{sq} = \frac{1}{2^{(n-p)/2}}. \qquad (82)$$

When computing the square root of a register x which already contains (e.g., positive) additive error ξ, the total additive error from the square root operation is bounded by $\epsilon_{sq}+\sqrt{\xi}$. This is easily seen by observing that with a square-root algorithm which gives an estimate $\hat{x}$ with $|\sqrt{x}-\hat{x}|\leq\epsilon_{sq}$, then $$|\sqrt{x+\xi}-\hat{x}|\leq|\sqrt{x}-\hat{x}|+\sqrt{\xi}$$

$$\leq\epsilon_{sq}+\sqrt{\xi}$$

where the first inequality follows from $(\sqrt{x}+\sqrt{\xi})^2=x+\xi+2\sqrt{x\xi}\geq x+\xi$, for positive x and ξ.

Arcsine

For the arcsine calculation again use the polynomial evaluation method, where the sample resource estimates for error rates range from $10^{-5}$ to $10^{-9}$. Bound the error from the computation of arcsine on a register containing an arithmetic error ξ to begin with. As discussed in Section 8.1 compute arcsin(x) for x≤0.5. In addition, when computing the function arcsin(x) in the algorithms of the subject disclosure described herein, only do it for x≥0. This gives a domain of 0≤x≤0.5 for arcsin(x) error calculation. Given this domain, notice that the slope of arcsin(x) is always monotonically increasing with a maximum at x=0.5. Therefore computing the error when x=0.5 gives the upper bound:

$$\bar{\epsilon}_{arcsin} \leq |\arcsin(0.5)-\arcsin(0.5-\xi)|+\epsilon_{arcsin}, \qquad (83)$$

where $\epsilon_{arcsin}$ is the error from the computation of the arcsine, given a choice of polynomial degree and number of subintervals.

Sine

As discussed in the previous section, compute the sin(θ) function with a series of controlled-Ry rotations controlled on qubits from a register containing the angle θ. Bound the error from the computation of sin(θ) when the register that is supposed to represent θ is actually representing θ+ξ due to an arithmetic error. To quantify the upper bound, notice that in the domain of 0≤θ<π/2, the slope of sin(θ) is monotonically decreasing, and therefore has a maximum slope at θ=0. Therefore computing the error when θ=0 gives the upper bound:

$$\bar{\epsilon}_{sin}\leq|\sin(0+\xi)-\sin(0)|+\epsilon_{sin}$$

$$\leq\xi+\epsilon_{sin} \qquad (84)$$

where the inequality sin(a+b)≤sin(a)+b for b≥0 has been used and where $\epsilon_{sin}$ is the error arising from the gate decomposition of the Ry operator described in Section 8.1.

9.0 Riemann Summation

9.1 Riemann Summation Path Loading Resource Estimates

This section examines the T-depth and qubit count to compute Equation (12) in a quantum register, and encode that value into the amplitude of an ancilla qubit as described in Algorithm 3.1. The calculation is done in log-return space (with reference to Section 1.2) and it involves the resource estimates for the operations described in Section 8.1.

Let $T_f$ and $q_f$ denote the T-depth and qubit count for an operation f respectively. Assuming the computation across the d assets and T timesteps can be parallelized wherever possible, the contributions to the resources for computing $|\arcsin\sqrt{P(\vec{R})}\rangle$ with $P(\vec{R})$ given by Equation (12) are

- $T_{add}$ for computing the terms (R−μ) which can be done in parallel for d assets and T timesteps, where T*d*n qubits are used to hold the log-returns R for all assets and timesteps.
- $T_{mul}$ for all $R^2$ terms in the expansion of Equation (33) (e.g., in parallel for all d and T), obtaining and/or using T*d*n additional qubits.
- $T_{mul}*d_2/(d/2)$ for all $R_iR_j$ terms in the expansion of Equation (33) (e.g., parallel in d, T) and T*$d_2$*n qubits.
- $T_{add}*\lceil\log(d_2+d)\rceil$ to sum all the terms in Equation (33) in parallel. The qubits from the previous step can be reused here.

$T_{exp}$ to calculate the exponential in Equation (8), using $q_{exp}$ extra qubits with $q_{exp}$ given by Equation (70) for a choice of parameter values determined by the desired approximation accuracy.

$T_{arcsq}$ to calculate the arcsin and square root in $|arcsin\sqrt{P(\vec{R})}\rangle$, with qubit resources given by Equation (76).

$T_{add}*(T-1)$ and $(T-1)*d*n$ qubits to calculate all the sums $R_j^{t-1}+R_j^{t-2}+\ldots+R_j^{t=t'}$ for $t' \in [2, T]$ in Equation (11).

$T_{exp}$ to calculate the prices across all assets and all timesteps in Equation (11) in parallel, using $q_{exp}*d*T$ more qubits.

A T-depth of $1.15n \log_2(n/\epsilon)$ to perform the ancilla rotation to precision $\epsilon$, controlled on the register where $|arcsin\sqrt{P(\vec{R})}\rangle$ is computed. This involves n ancilla qubits using the controlled-$R_y$ decomposition.

Moreover, include an additional register of size $T*d*n$ to implement the addition circuit with constant T-depth and $(z-1)*T*d$ extra qubits if the parallel multiplication scheme described in Section 8.1 is used to calculate prices across assets and timesteps, where $z \geq 1$ is the optional parallelization factor chosen. Note that extra qubit counts to compute the $(R-\mu)$ terms and the sum in Equation (33) have not been included because these can be done in place using the existing registers to hold each $R_i$. This is possible because after computing the sums and exponentials in Equation (11) (e.g., which can be done before computing the sums) the values of $R_i$ are not used again.

The total T-depth of the Riemann summation path loading process to precision $\epsilon$ for d assets and T timesteps using registers of size (n, p) is then $$T_{RS}(n,p,d,T,\epsilon)=n^2+2n^2d_2/d+10(d_2+d)+10T+9n+5+ 1.15n \log_2(n/\epsilon)+2T_{exp}(n,p,\epsilon)+T_{arcsin}(n,p,\epsilon), \quad (85)$$

where the dependency of $T_{exp}$ and $T_{arcsin}$ on $\epsilon$ denotes that the polynomial approximation parameters k and M in Equation (69) for each function will depend on the target accuracy of the process. The total number of qubits involved is $$q_{RS}(n,p,d,T,\epsilon)=Tn(4d+d_2)+3n+1+q_{exp}(n,p,\epsilon) (1+dT)+q_{arcsin}(n,p,\epsilon). \quad (86)$$

9.2 Importance Sampling for Normalization in Riemann Summation

This section introduces a technique closely related to classical importance sampling to overcome the problem of the exponentially increasing scaling shown in Algorithm 3.1. The main idea is to approximate the target distribution by another distribution that can be loaded efficiently and then use quantum arithmetic only to adjust for the (e.g., multiplicative) error.

Suppose a univariate probability density function $f: [0,1] \to [0, P]$, with $P>1$ and $\int_{x=0}^1 f(x)dx=1$ and a payoff function $g: [0,1] \to [0,1]$. In the considered context, g will be applied only once. Thus, it can be assumed that it takes values in [0,1] without changing the overall complexity of the approach. As introduced before, consider the scaled function $f(x)/P$ and a corresponding operator $\mathcal{F}$, as well as a corresponding operator $\mathcal{G}$ to prepare a state on n+2 qubits given by $$\frac{1}{\sqrt{N}}\sum_{i=0}^{N-1}|i\rangle_n(\sqrt{1-f(x_i)/P}|0\rangle+\sqrt{f(x_i)/P}|1\rangle) \quad (87)$$

$$(\sqrt{1-g(x_i)}|0\rangle+\sqrt{g(x_i)}|1\rangle),$$

where $x_i=i/N$. Then, the probability of measuring $|11\rangle$ in the last two qubits is given by $$\frac{1}{PN}\sum_{i=0}^{N-1}f(x_i)g(x_i), \quad (88)$$

and when multiplied with P corresponds to the Riemann sum approximating $\int_{x=0}^1 f(x)g(x)dx = \mathbb{E}[g(X)]$ for $X \sim f$.

Further, consider a probability distribution $h(x_i) \in [0,1]$ that can be efficiently loaded into a quantum state, that is, where it is known how to efficiently construct a quantum operator $\mathcal{H}$ such that $$\mathcal{H}|0\rangle_n = \Sigma_{i=0}^{N-1}\sqrt{h(x_i)}|i\rangle_n. \quad (89)$$

Suppose there exists h such that $f(x)/(h(x)N) \in [0,1]$ for all x, then construct a new operator $\mathcal{F}_h$ defined as $$\mathcal{F}_h:|i\rangle_n|0\rangle \mapsto |i\rangle_n(\sqrt{1-f(x_i)/(h(x_i)N)}|0\rangle + \sqrt{f(x_i)/(h(x_i)N)}|1\rangle). \quad (90)$$

Combining $\mathcal{H}$ and $\mathcal{F}_h$ leads to $\mathcal{F}$ $$\mathcal{F}_h\mathcal{H}|0\rangle_n|0\rangle = \Sigma_{i=0}^{N-1}\sqrt{h(x_i)}|i\rangle_n(\ldots + \sqrt{f(x_i)/h(x_i)N)}|1\rangle)(\ldots+\sqrt{g(x_i)}|1\rangle), \quad (91)$$

which implies a probability of measuring $|11\rangle$ in the last two qubits given by $$\frac{1}{N}\sum_{i=0}^{N-1}f(x_i)g(x_i), \quad (92)$$

that is, the Riemann sum approximating $\int_{x=0}^1 f(x)g(x)dx = \mathbb{E}[g(X)]$ for $X \sim f$. Thus, if such a probability distribution h can be found, construct a state that directly corresponds to $\mathbb{E}[g(X)]$ without rescaling by multiplying P. It can be easily seen that for $P \leq 1$, $h(x)=1/N$ can be set to recover the original approach without importance sampling.

In case of multivariate probability density functions, three cases are distinguished. First, separable functions that can be written as a product of univariate functions $f_t$ for $t=0, \ldots, T$. In this case, the univariate approach can be applied directly and a corresponding $h_t$ for each $f_t$ can be found. Second, non-separable multivariate probability density functions $f: [0,1]^d \to [0, P]$, with $P>1$ and $\int_{x \in [0,1]^d} f(x)dx=1$. Suppose each dimension is discretized using n qubits, that is, have in total $N^d$ grid points. Then, find a probability distribution h such that $f(x)/(h(x)N^d) \in [0,1]$ for all x, and the analysis is analog to the univariate case. Last, consider the case of a multivariate probability density function coming from a stochastic process and given by $$f(x_0, \ldots, x_T)=f_0(x_0)\Pi_{t=1}^T f_t(x_t|x_{t-1}), \quad (93)$$

where $x_t \in [0,1]^d$ and $f_0(x_0)$, $f_t(x_t|x_{t-1}) \in [0, P]$ for $t=0, \ldots, T$. Suppose a separable probability distribution $$h(x_0, \ldots, x_T)=\Pi_{t=0}^T h_t(x_t), \quad (94)$$

that can be loaded efficiently as well as a corresponding decomposition $h_t(x_t)=h_t^r(x_t)h_t^{r+1}(x_t)$, with $h_T^{T+1}(x)=1$. Then, $$\frac{f(x_0, \ldots, x_T)}{N^{(T+1)d}} = \frac{f_0(x_0)}{h_0^0(x_0)N^d}h_0^0(x_0)h_0^1(x_0)\prod_{t=1}^{T}\frac{f_t(x_t \mid x_{t-1})}{h_{t-1}^t(x_{t-1})h_t^t(x_t)N^d}h_t^t(x_t)h_t^{t+1}(x_t). \quad (95)$$

Thus if h is found such that the individual $h_t$ can be efficiently loaded and $$\frac{f_0(x_0)}{h_0^0(x_0)N^d} \in [0,1], \forall x_0 \quad (96)$$

$$\frac{f_t(x_t \mid x_{t-1})}{h_{t-1}^t(x_{t-1})h_t^t(x_t)N^d} \in [0,1], \forall x_{t-1}, x_t, t=1, \ldots, T, \quad (97)$$

then, efficiently load the stochastic processes without the exponential scaling overhead $P^{T+1}$. Again, it can be easily seen that for P≤1, $h_t(x_t)=h_t^r(x_t)=1/N^d$ can be set and $h_t^{t+1}(x_t)=1$ to recover the original approach without importance sampling.

Note that even though an h that satisfies all criteria may not always be found, this approach can still help to lower the overhead coming from scaling.

10.0 Re-Parameterization Path Loading Resource Estimates

To prepare the standard normal distributions that can be used by quantum resource estimation system 102 in implementing the re-parameterization loading approach of the subject disclosure, quantum resource estimation system 102 (e.g., via variational component 202) can employ the variational method described in Section 3.2.1 and the corresponding gate and/or qubit cost depending on the desired accuracy of the approximation. In addition to that, the cost of computing the affine transformation $\vec{R}^t = \vec{\mu}^t + L^T \vec{R}^t$ as described in Algorithm 3.2 will also be incurred. Note that the affine transformation is used to calculate the asset prices from the log-returns, which for asset j at time t' will be $$S_j^{t'} = S_j^{t=0} e^{\mu_j t' + \Sigma_{i=0}^d L_{ji}{}^T \overline{R}_i(t')} = e^{\ln S_j^{t=0} + \mu_j t' + \Sigma_{i=0}^d L_{ji}{}^T \overline{R}_i(t')}, \quad (98)$$

where $\overline{R}_i(t')$ is the ith component of the sum $(\vec{R}(t=1)+\vec{R}(t=2)+\ldots+\vec{R}(t=t'))$. One complication in Equation (98) is that each asset price cannot be computed fully in parallel across the d assets, because the log-returns of any correlated assets will contribute to the computation of each other's price. In the case where all assets are pairwise correlated, quantum resource estimation system 102 can compute the contributions to each asset's price from the log-returns of all d assets at that timestep, requiring in total $d^2$ additions to compute all asset prices per timestep. However, quantum resource estimation system 102 can perform d additions in parallel where the contribution of asset j's return to the price of asset (j+i) % d is computed for a choice of i∈[0, d−1], since all d such operations have distinct source and target registers. Then d rounds of additions will compute the term $\Sigma_{i=0}^d L_{ji}{}^T \overline{R}_i(t')$ for all assets, and if quantum resource estimation system 102 computes $(\vec{R}(t=1)+\vec{R}(t=2)+\ldots+\vec{R}(t=t'))$ in a separate register for each t', the above calculation can be also parallelized across all timesteps.

The arithmetic error in computing Equation (98) can be reduced (e.g., minimized) by increasing the qubit register sizes to accommodate the largest values possible for the sums over the timesteps T and assets d. If each gaussian prepared in Equation (38) is discretized using n qubits, then $n+\lceil \log_2 T \rceil$ qubits will be enough to hold the largest value of the expression $(\vec{R}(t=1)+\vec{R}(t=2)+\ldots+\vec{R}(t=t'))$. An additional $\lceil \log_2 d \rceil$ qubits will achieve the same for $\Sigma_{i=0}^d L_{ji}{}^T \overline{R}(t')$, assuming the coefficients $|L_{ji}{}^T|\leq 1$ for all i, j. This condition is not hard to satisfy for typical situations of practical interest, which can be argued by looking at the elements of the covariance matrix $\Sigma_{ij}=\Delta t \rho_{ij}\sigma_i\sigma_j$ (e.g., where by definition $|\rho_{ij}|\leq 1$). Typically, annualized volatilities are smaller than 100% (i.e. $\sigma_i<1$) and the timestep usually satisfies $\Delta t<1$, meaning the price of the underlying assets can be sampled more frequently than just yearly. If neither condition is satisfied however, quantum resource estimation system 102 can choose a smaller $\Delta t$ to ensure $|\Sigma_{ij}|<1$, at the cost of increasing the number of timesteps in the calculation.

The contributions to the T-depth and qubit count for loading the paths and computing the asset prices in the re-parameterization approach for a derivative defined on d assets T timesteps are $T_R(n)\cdot(L+1)$ T-depth for loading the gaussian states in Equation (38) using the variational method from Section 3.2.1, where each Gaussian is prepared in parallel and the variational ansatz has depth L. This step involves T*d*n qubits where n qubits are used to prepare each Gaussian state.

$T_{add}*(T-1)$ for calculating all the sums $(\vec{R}(t=1)+\vec{R}(t=2)+\ldots+\vec{R}(t=t'))$ for t'∈[2, T] in Equation (98), involving an extra $T*d*(n+\lceil \log_2 T \rceil)$ qubits.

$T_{add}*d$ to compute all contributions to $\Sigma_{i=0}^d L_{ji}{}^T \overline{R}_i(t')$ in Equation (98) and $T*d*\lceil \log_2 d \rceil$ more qubits.

$T_{add}$ to compute the $\mu_j t'+\ln S_j^{t=0}$ contribution in Equation (98) across assets and timesteps.

$T_{exp}$ to compute the exponential in Equation (98) across assets and timesteps, and $q_{exp}*d*T$ additional qubits with $q_{exp}$ given by Equation (70).

All in all, the total T-depth for path loading using the re-parameterization method to precision ϵ for d assets and T timesteps is $$T_{RP}(n,d,T,L,\epsilon)=1.15n\log_2(n/\epsilon)(L+1)+10(d+T)+T_{exp}(n,\epsilon), \quad (99)$$

with qubit count $$q_{RP}(n,d,T)=(n+\overline{n}+q_{exp}(\overline{n},\epsilon))dT, \quad (100)$$

where $\overline{n}=n+\lceil \log_2 T \rceil + \lceil \log_2 d \rceil$.

11.0 Method for Gaussian Loader Training

This section describes an approximate method to initialize the quantum register using the Variational Quantum Eigensolver (VQE) approach. This algorithm features a parametrized circuit which in turn produces a parametrized state $|\psi(\{\theta\})\rangle$ that approximately represents the target state $|\phi_0\rangle$ and updates its parameters $\{\theta\}$ to optimize the expectation value of a suitable cost function. Here it is shown that the choice of the cost function to optimize is crucial for the success of the training.

Energy Based Training

As a first method, quantum resource estimation system 102 can adopt a physics based approach and define an operator H, such that its expectation E value assumes its lowest possible value, $E_0$, when evaluated on the target state, $$E_0 = \langle \psi_0 | H | \psi_0 \rangle \quad (101)$$

In physics application, the operator H is usually called Hamiltonian, E the energy, and $|\phi_0\rangle$ the ground state. It is well known the Gaussian function $$\phi_0(x) = \left(\frac{m}{\pi}\right)^{1/4} e^{-m(x-x_0)^2} \tag{102}$$

is the ground state of the quantum harmonic oscillator Hamiltonian $$H = P^2 2m + m(X-x_0)^2 2, \tag{103}$$

where X is the position operator in real space, and P=−iddx is the momentum operator, m is a parameter that determines the variance of the desired Gaussian distribution, and $x_0$ is the center of gaussian distribution. In this case, to find a state $\phi_0(x)$ such that $\phi_0^2(x) = \mathcal{N}(x_0, \sigma)$, quantum resource estimation system 102 can tune m to m=1/(2σ²).

Notice that it is always possible to find a generating Hamiltonian function such that its ground state is the square root of the smooth distribution function to be loaded (e.g., the target probability distribution).

To translate such considerations into an operational workflow quantum resource estimation system 102 can define a way to compute the expectation value of Equation (103) using a quantum computer. To this end it can be observed that the operator $X^2$ is diagonal in the computational basis, so it can be measured directly from the bit-string histogram counts $N_{counts}(j)$ generated by the repeated wavefunction collapses. The operator $P^2$ is diagonal in the momentum basis. This implies the addition of a centered Quantum Fourier Transform (QFT) circuit after the state preparation block. Quantum resource estimation system 102 can use the centered Fourier transform to allow for negative momenta. As described above, quantum resource estimation system 102 can work in a discrete position space $x_i = -w + i\Delta x$, with i=0, ... $2^n-1$, and $\Delta x = 2w/2^n$. Without loss of generality quantum resource estimation system 102 can choose the domain to be centered in zero. The energy, $E = E_{X^2} + E_{P^2}$, can be computed in the following way, $$E_{X^2} = \frac{1}{N_{shots}} \sum_{j=0}^{N} \frac{m}{2} N_{counts}(j)(j \times \Delta x - x_0)^2 \tag{104}$$

$$E_{P^2} = \frac{1}{N_{shots}} \sum_{j=0}^{N} \frac{1}{2m} N_{counts}(j)(j \times \Delta p)^2 \tag{105}$$

where $N_{shots}$ is the total number of circuit repetitions for the spacial and momentum basis. $N_{counts}(j)$ (with $0 \leq N_{counts}(j) \leq N_{shots}$, $\Sigma_j N_{counts}(j) = N_{shots}$) is the number of measurements that collapsed onto the qubit basis state corresponding to the binary representation of integer j. This strategy bypasses the use of a Pauli representation of Equation (103), which would include an exponentially increasing number of Pauli string to be measured with the qubit register size.

The first step of the program is to verify numerically the possibility to prepare a state that is systematically converging to Equation (102), using a quantum circuit. Adopting a variational approach will circumvent costly quantum arithmetic operations at the expense of introducing sources of error which are always present in numerical variational approaches. The most trivial one concerns the possibility of getting trapped in local minima during the (classical) optimization procedure. The second, and more profound one, is linked with the representational power of trial states produced by the (e.g., shallow) quantum circuits.

The main choice for the ansatz is the so-called $R_y$–CNOT circuit. The initial state, defined on a n qubits register, which quantum resource estimation system 102 can set to $|0\rangle^{\otimes n}$, is evolved under the action of the unitary $U(\vec{\theta})$ to give the trial wave function $|\psi(\vec{\theta})\rangle$.

The circuit is made of a series of L blocks built from single-qubit rotations $U_R(\vec{\theta}^k)$, followed by an entangler $U_{ENT}$, that spans the length of the qubit register. In the experimental case studies described above, quantum resource estimation system 102 chose the choice of a ladder of CNOTs gate with linear connectivity, such that qubit $q_i$ is target of qubit $q_{i-1}$ and the controls qubit $q_{i+1}$, with i=1, ..., n−2. One additional layer of $U_R$ gates is applied at the end, such that the number of variational parameters is n×(L+1).

Since the single-qubit rotations are all local operations, $U_R(\vec{\theta}^k)$ can be written as a tensor product of the rotations of a single qubit:

$$U_R(\vec{\theta}^k) = \bigotimes_{i=0}^{n-1} R_Y(\vartheta_{qi}^k), \tag{106}$$

$R_y(\vartheta_{q_i}^k)$ is a rotation on the Y-axis on the Bloch sphere of qubit $q_i$, and k=1, ..., L+1. The full unitary circuit operation is described by $$U(\vec{\theta}) = U_R(\vec{\theta}^{L+1}) \overbrace{U_{ENT} U_R(\vec{\theta}^L) \ldots U_{ENT} U_R(\vec{\theta}^1)}^{L\text{-times}}, \tag{107}$$

and the parametrized state as $$|\psi(\vec{\theta})\rangle = U(\vec{\theta})|0\rangle^{\otimes n} \tag{108}$$

Notice that the unitary $U(\vec{\theta})$ describes the full circuit, but not the pre-measurement change of basis that can be involved to collapse the wavefunction in momentum space as explained above.

For each n and L parameters quantum resource estimation system 102 can repeat the optimization runs, for instance, eight times in order to gather sufficient statistics, as the optimizations can remain stuck in suboptimal minima. Since quantum resource estimation system 102 can use classical emulation of the quantum circuits the only source of error in the optimizations is originated from the classical optimizer. In the experimental runs performed by quantum resource estimation system 102 to implement the above described case studies, quantum resource estimation system 102 first performed a warm up run with the COBYLA optimizer, followed by a longer run using the BFGS optimizer. To enhance the efficiency the optimizations, the starting point for the VQE run at depth L, uses the optimal parameters found at previous optimisation at the depth at L−2 or L−1 when available. Notice that the part of the algorithm that concerns the classical optimization feedback can be greatly improved, for example, using gradient based methods or imaginary-time inspired update schemes.

$L_\infty$ Training Refinements

Figure 6A:
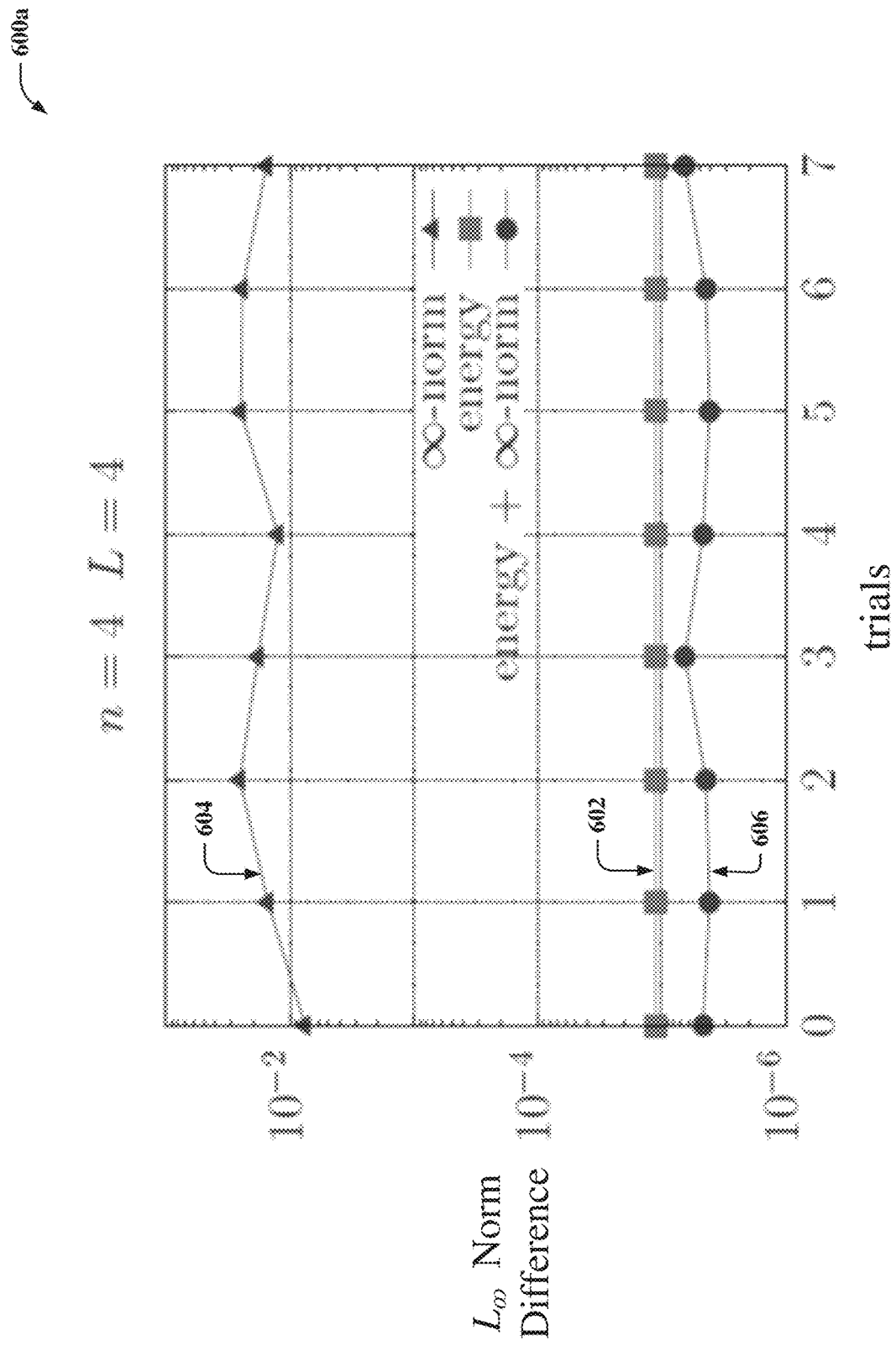
Figure 6B:
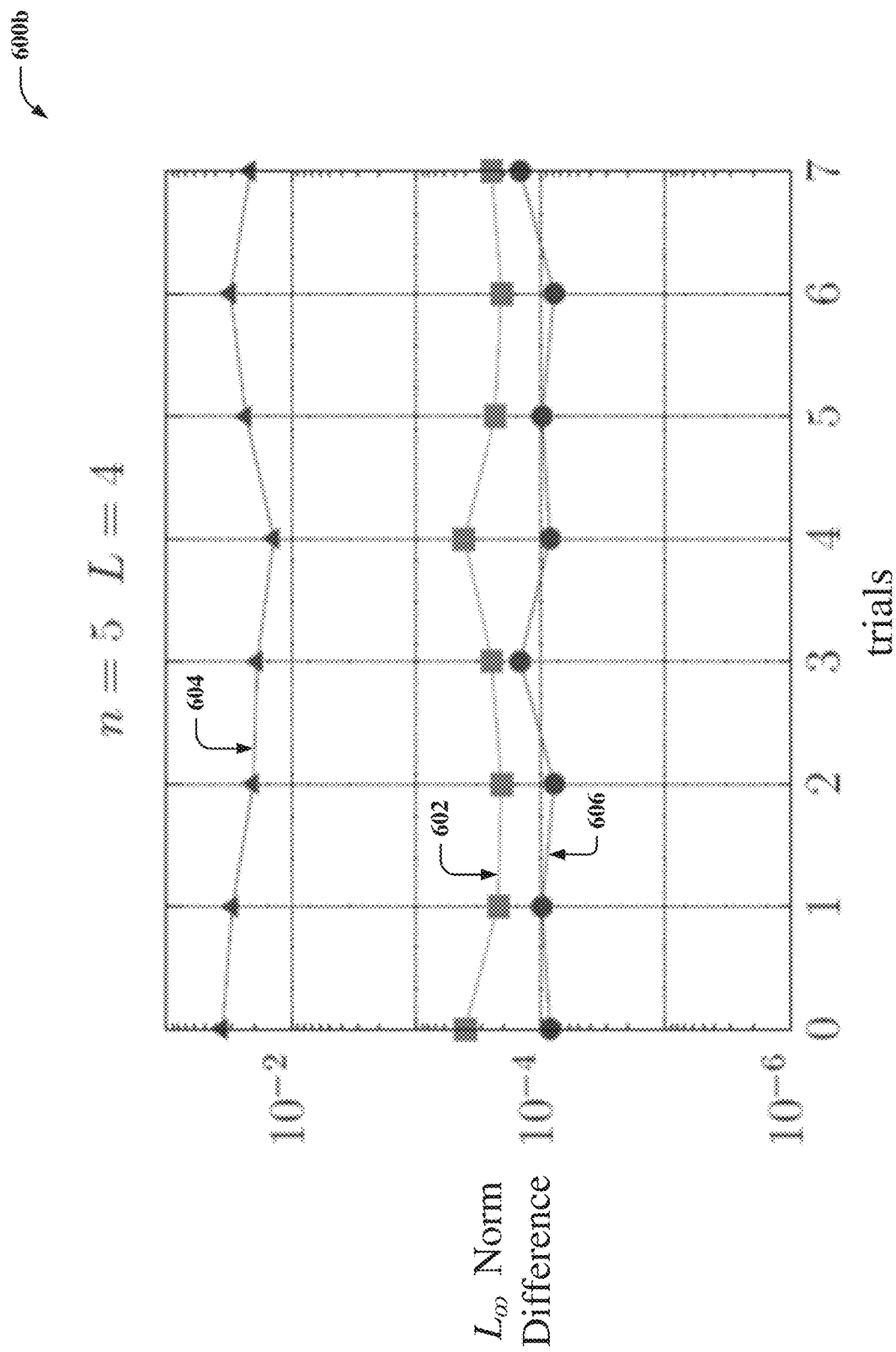
Figure 6C:
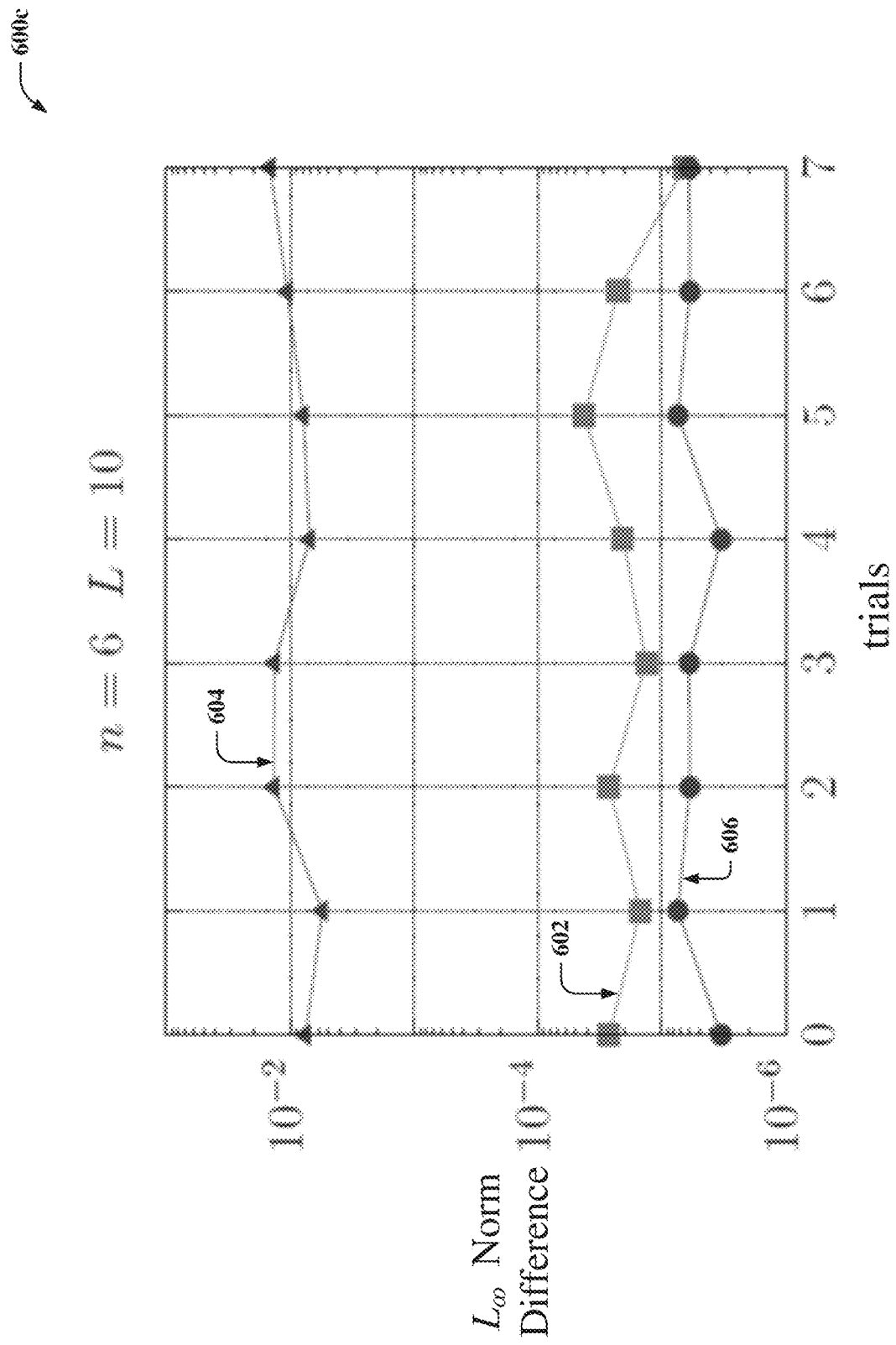

As described above, quantum resource estimation system 102 can use the pre-optimized circuits obtained using the energy optimization method as a starting guess for the re-optimization following the $L_\infty$ as cost function. In FIGS. 6A, 6B, and 6C it is shown how the direct $L_\infty$ optimization always fails to provide acceptable results.

FIGS. 6A, 6B, and 6C illustrate example, non-limiting graphs 600a, 600b, 600c, respectively, that can facilitate estimation of quantum resources to calculate an expectation value of a stochastic process using a re-parameterization method in accordance with one or more embodiments described herein. Repetitive description of like elements and/or processes employed in respective embodiments is omitted for sake of brevity.

In each of graphs 600a, 600b, and 600c depicted in FIGS. 6A, 6B, and 6C, respectively, optimization runs obtained with the energy-based method are represented by plot 602. In each of graphs 600a, 600b, and 600c depicted in FIGS. 6A, 6B, and 6C, respectively, the direct $L_\infty$ optimization is represented by plot 604. In each of graphs 600a, 600b, and 600c depicted in FIGS. 6A, 6B, and 6C, respectively, the mixed strategy where the energy based optimization is further refined using the $L_\infty$ optimization is represented by plot 606. To obtain the data plotted in each of graphs 600a, 600b, and 600c, quantum resource estimation system 102 can perform eight independent runs at given parameters n qubits and L.

Figure 7A:
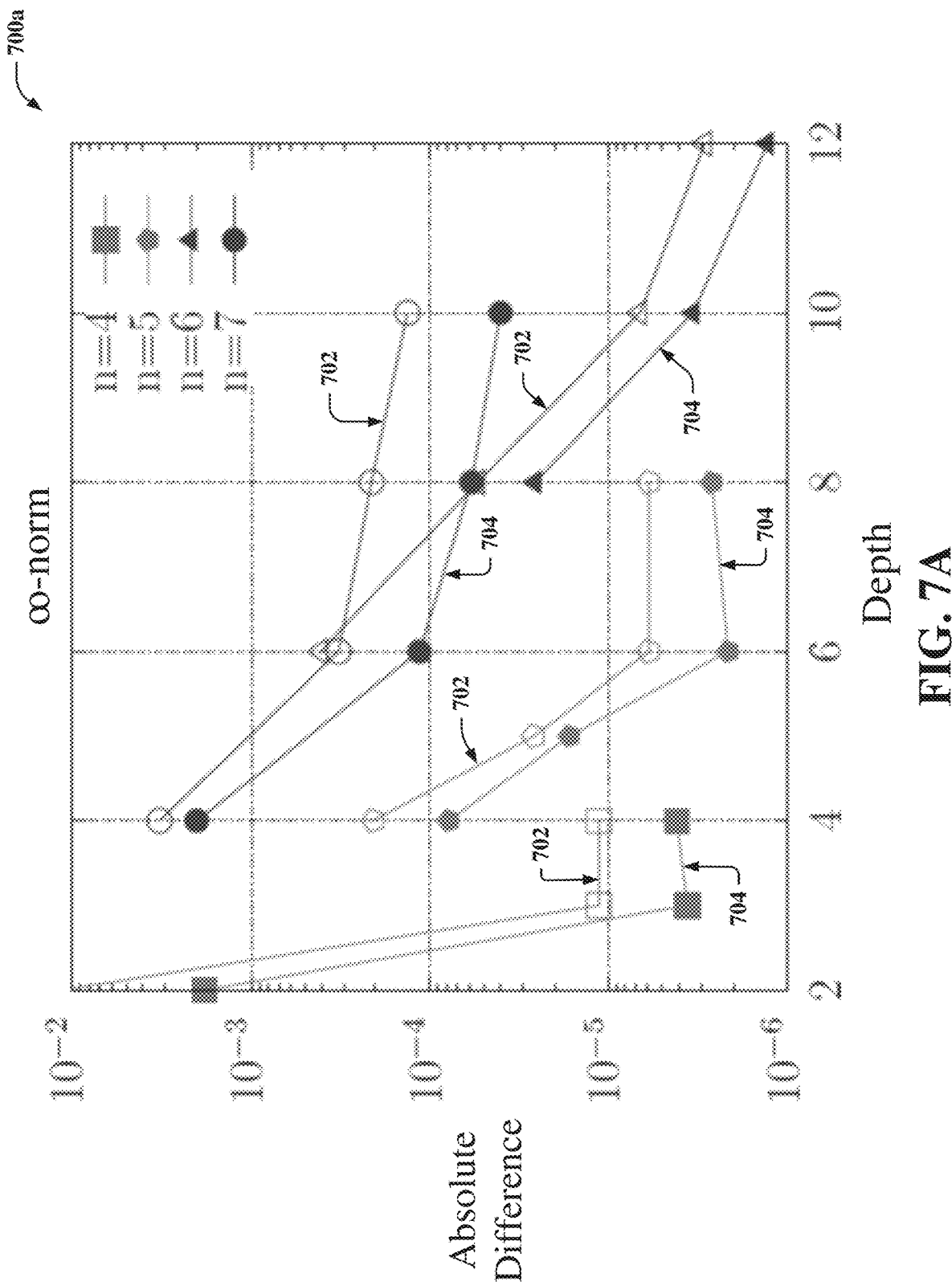
Figure 7B:
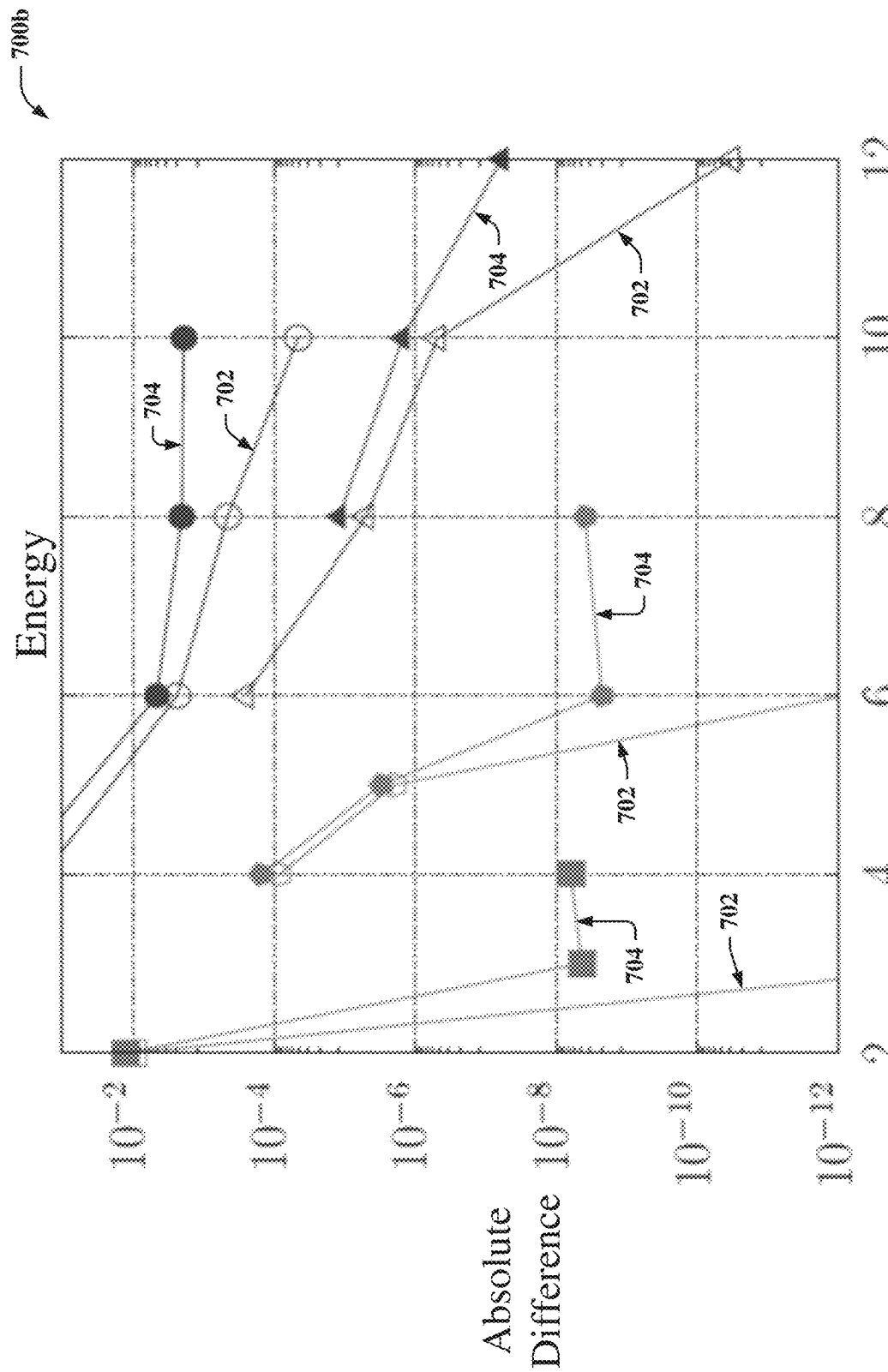

The complete outcome of the optimizations are illustrated in FIGS. 7A and 7B.

FIGS. 7A and 7B illustrate example, non-limiting graphs 700a and 700b, respectively, that can facilitate estimation of quantum resources to calculate an expectation value of a stochastic process using a re-parameterization method in accordance with one or more embodiments described herein. Repetitive description of like elements and/or processes employed in respective embodiments is omitted for sake of brevity.

Graph 700a illustrates the $L_\infty$ norm difference between the prepared and the target distribution as a function of the circuit depth L for different qubit register sizes n. Plotted in graph 700a are the best among the eight independent optimization for each parameter. Plots 702 in graph 700a correspond to optimization performed using the energy of the quantum harmonic oscillator as a cost function. Plots 704 in graph 700a correspond to the re-fined optimizations using the $L_\infty$ as cost function.

Graph 700b illustrates the difference in energy of the associate quantum harmonic oscillator model as a function of the circuit depth L for different qubit register sizes n. Plotted in graph 700b are the best among the eight independent optimization for each parameter. Plots 702 in graph 700b correspond to optimization performed using the energy of the quantum harmonic oscillator as a cost function. Plots 704 in graph 700b correspond to the re-fined optimizations using the $L_\infty$ as cost function. As expected the refinement targeting the $L_\infty$ does not improve this quantity. The results of the numerical study illustrated in graphs 700a and 700b show that the convergence to the exact ground state is exponential in the depth, hence in the number of gate operations.

Failure of the $L_\infty$ Norm Direct Optimization

Provided here is an empirical explanation concerning the observed failure of the direct norm optimization technique. To this end quantum resource estimation system 102 can probe the cost function landscape for both the methods, the energy based and the direct $L_\infty$ optimization. Quantum resource estimation system 102 can start from an optimized parameter configuration $\vec{\theta}_0$ and perform a cut in the parameter space, following the prescription $$\vec{\theta} = \vec{\theta}_0 + \lambda \vec{\eta} \quad (109)$$

where $\vec{\eta}$ is an vector containing uniformly distributed random numbers in the range $[-1,1]$ and $\lambda \in [-\pi, \pi]$ is a scalar which parametrizes the deformation form the optimal solution.

Figure 8A:
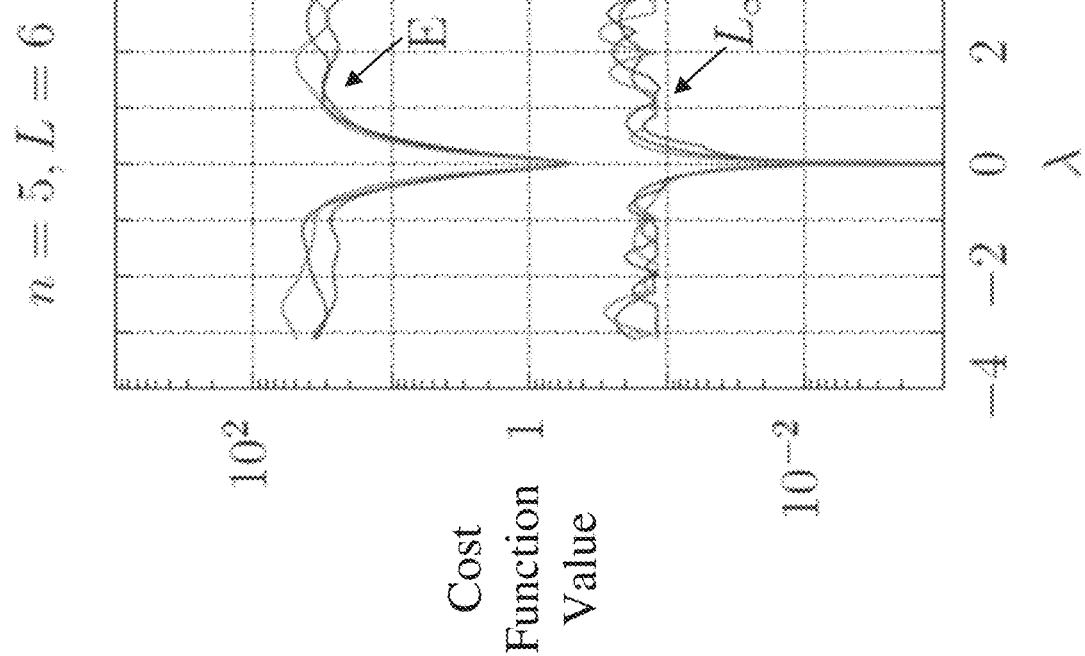
Figure 8B:
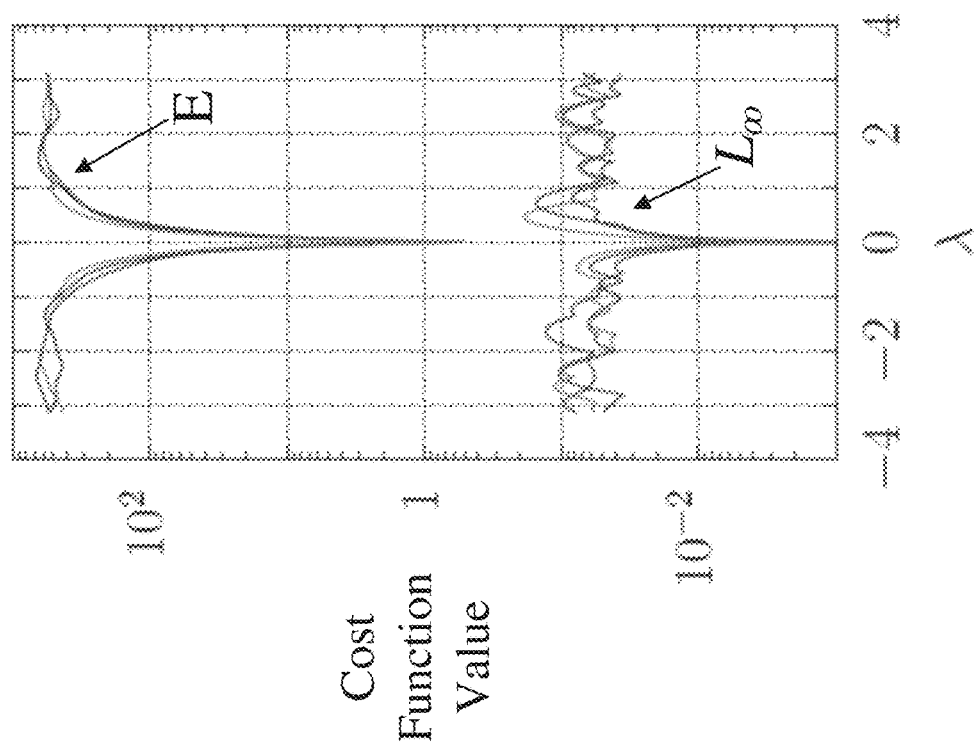

FIGS. 8A and 8B illustrate example, non-limiting graphs 800a and 800b, respectively, that can facilitate estimation of quantum resources to calculate an expectation value of a stochastic process using a re-parameterization method in accordance with one or more embodiments described herein. Repetitive description of like elements and/or processes employed in respective embodiments is omitted for sake of brevity.

Graphs 800a and 800b depicted in FIGS. 8A and 8B, respectively, illustrate probing of the cost function landscape for three different cut direction (e.g. three different realizations of the vector $\vec{\eta}$). The plots illustrated in the top portions of graphs 800a and 800b represent the cost function landscape for the energy E, while the plots illustrated in the bottom portions of graphs 800a and 800b represent the cost function landscape for the $L_\infty$ norm computed using three different cuts along the parameter space, and for two different setup n=5,7 and depths L=6,10 respectively.

From graphs 800a and 800b, it can be observed that the cost function defined by the $L_\infty$ norm is much more corrugated than the one defined by energy E of the associate quantum mechanical toy problem, which instead displays a smoother surface. The basins of attraction of the energy cost-function and the $L_\infty$ cost-function are overlapping, this happens because the ground state of the physical problem is close to the Gaussian function to be achieved, so the second optimization with the $L_\infty$ norm does not remain stuck in high-cost local minima outside such basin.

Variational Parameters Digitization

While the above described numerical results provide evidence for a rather efficient Gaussian state preparation in terms of circuit depths for a parametrized circuit, an additional step has to be made in view of a fault-tolerant implementation of such circuits. In this new-framework, the continuous rotation RY gate can be expanded as a finite product of discrete operations. Following again the Solovay-Kitaev theorem, or more specialized results, it is possible to have also an efficient representation of any SU(2) operator with a sequence of Clifford+T-gates that scale logarithmically with the threshold error $\epsilon$. It can be investigated how the results obtained before can be transferred in this regime where rotation's angles can take only discretized value. Therefore, it can be assumed that each parameter $\vartheta_q^k$ can only be represented by the format $i*2\pi/M_{digit}$, where i is an integer.

Quantum resource estimation system 102 can adopt a protocol to optimize the parameters on an a grid. First quantum resource estimation system 102 can project the original continuous values parameters on the grid taking for each parameter the closest grid points. Subsequently quantum resource estimation system 102 can perform a local search on the grid to find a better combination of the digitized parameters which reduce (e.g., minimize) the $L_\infty$ norm difference compared to the target distribution. Quantum resource estimation system 102 can numerically show that the error introduced by such digitization decreases systematically with the mesh size. If quantum resource estimation system 102 considers the $L_\infty$ norm difference error introduced by such digitization, it decreases as $1/Ma_{digit}$. It can be observed that in all cases, quantum resource estimation system 102 can obtain values compatible with the continuous valued solution, or even better, when the mesh size reach $M_{digit}\sim 10^5$, this equal in discretizing the space with $2\pi/M_{digit}\approx 0.0001$ radians (rad).

Figure 9A:
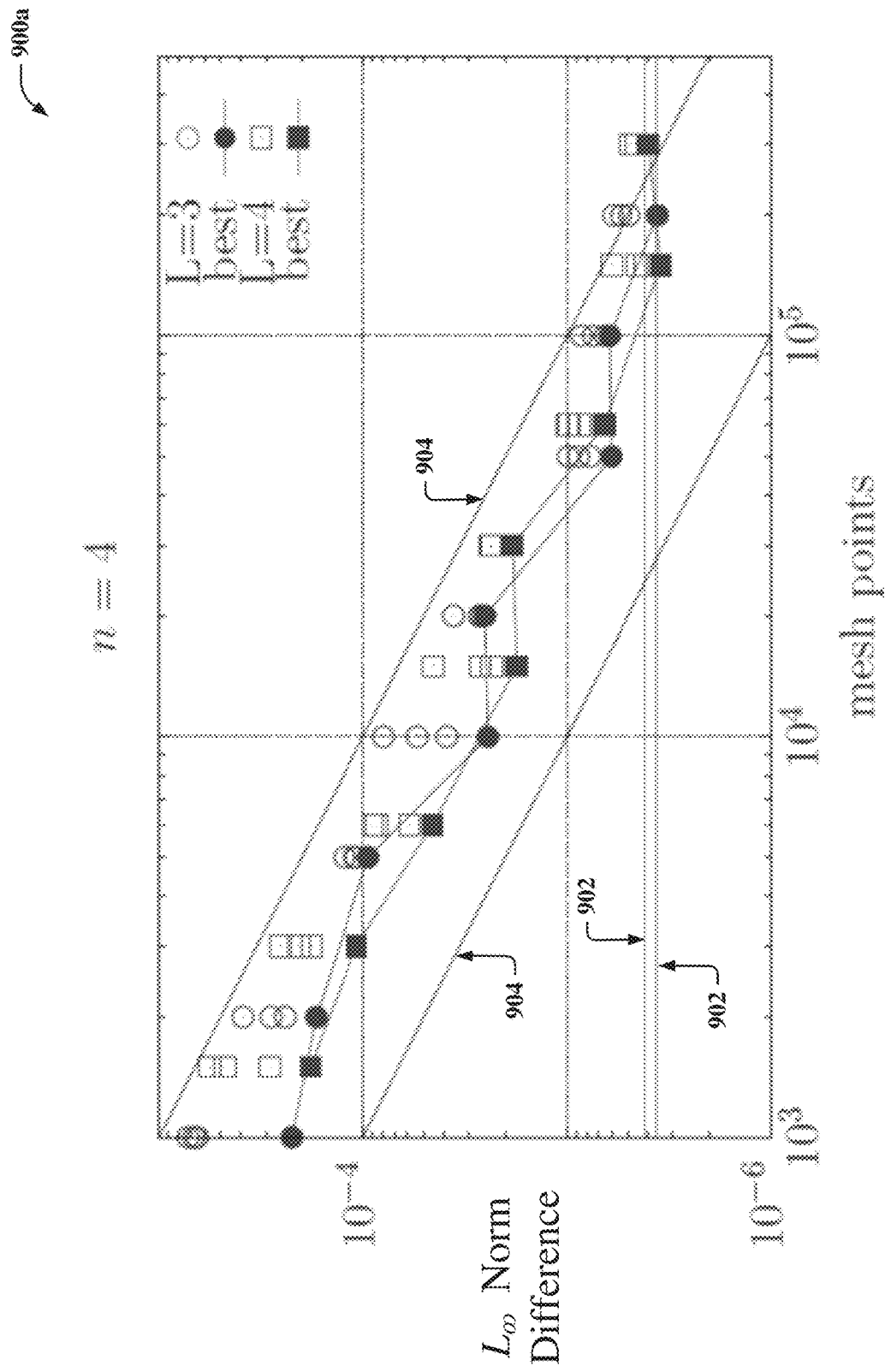
Figure 9B:
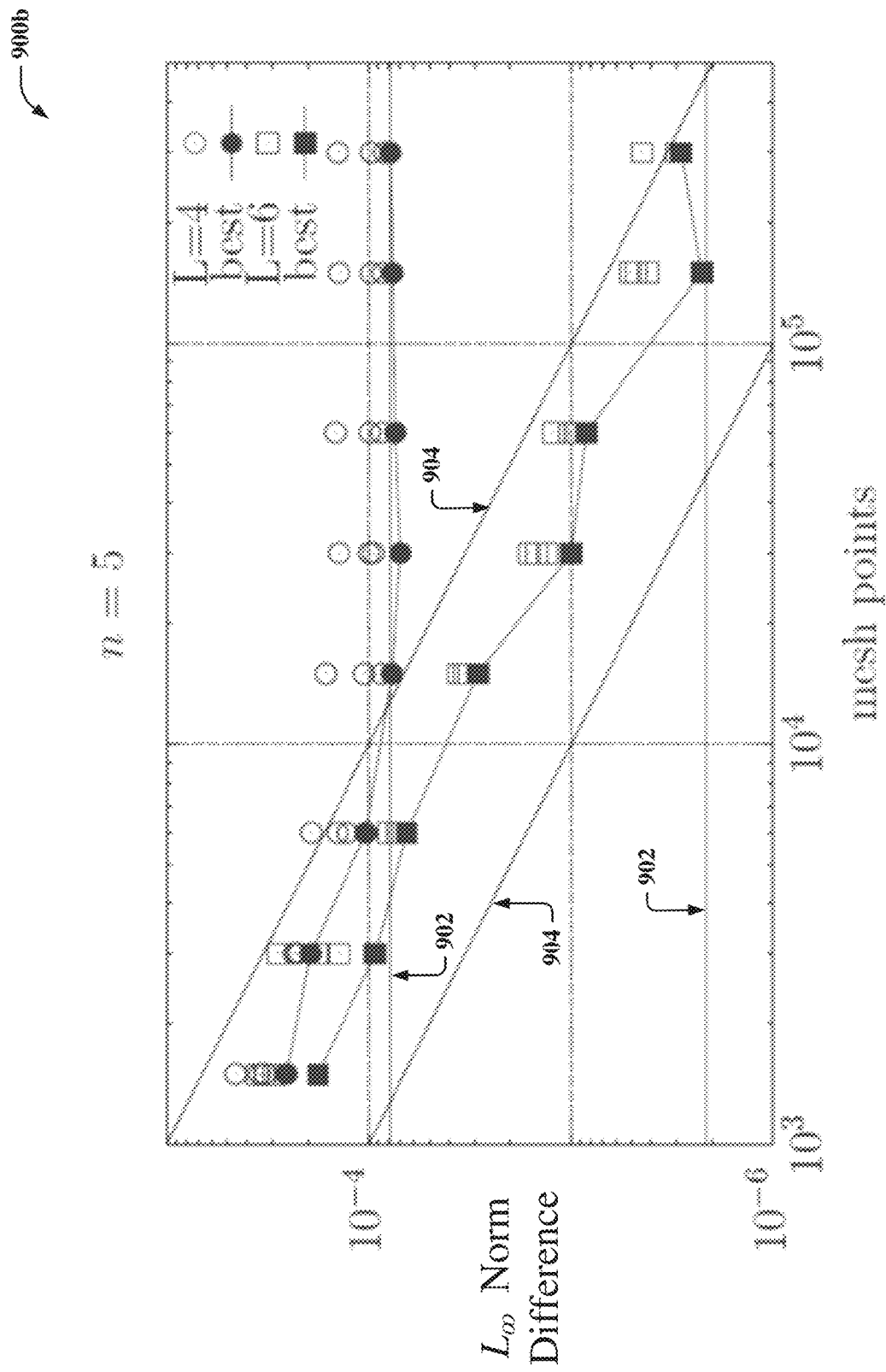
Figure 9C:
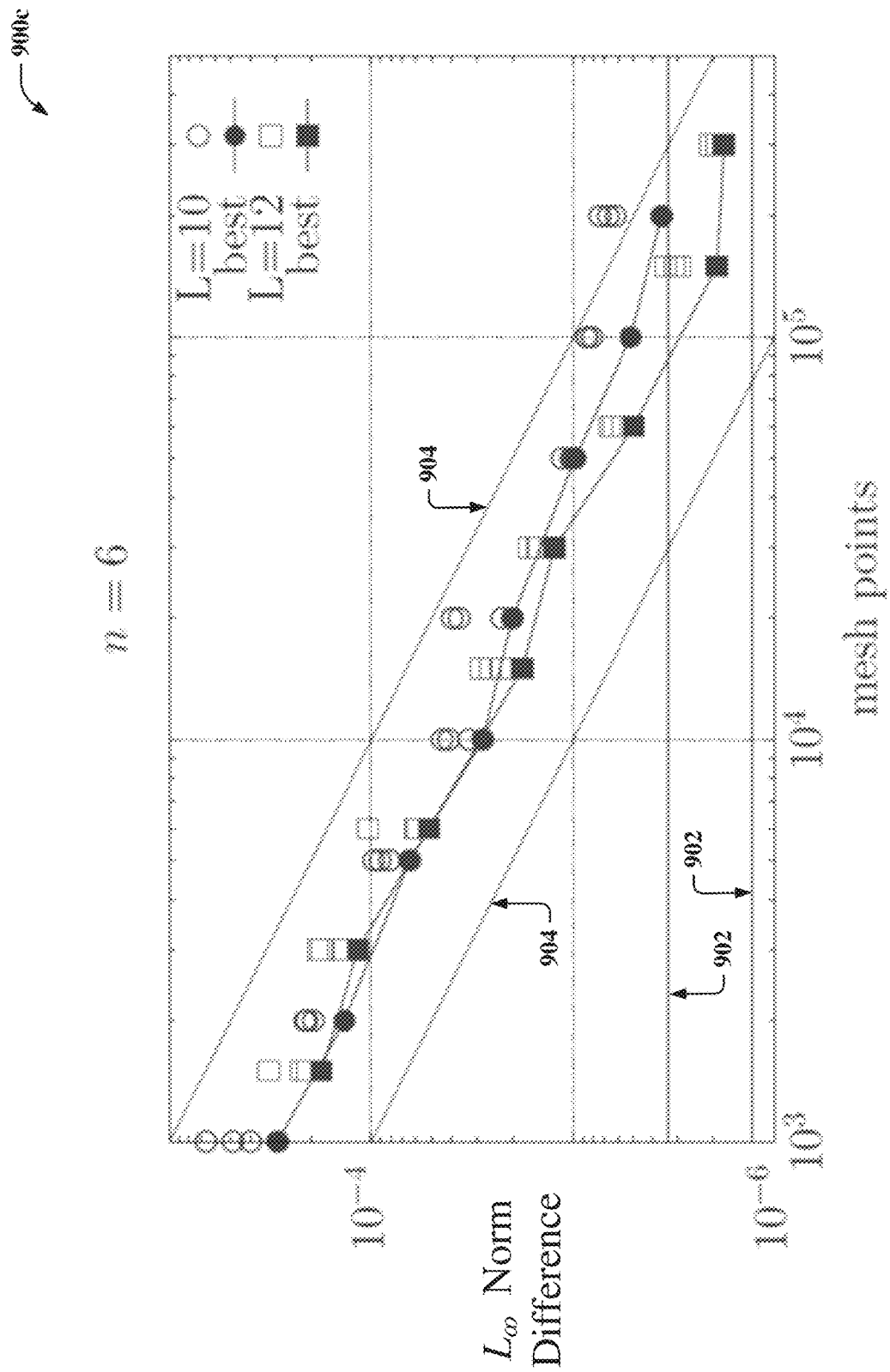

FIGS. 9A, 9B, and 9C illustrate example, non-limiting graphs 900a, 900b, and 900c, respectively, that can facilitate estimation of quantum resources to calculate an expectation value of a stochastic process using a re-parameterization method in accordance with one or more embodiments described herein. Repetitive description of like elements and/or processes employed in respective embodiments is omitted for sake of brevity.

Graph 900a depicted in FIG. 9A illustrates the $L_\infty$ norm difference between the prepared and the target distribution as a function of the digitization mesh size $M_{digit}$ for two different circuit depts L and for the n=4 qubit case. For each $M_{digit}$ quantum resource estimation system 102 can "digitize" the eight parameter sets obtained by the previous independent optimizations (e.g., done considering a continuous domain for rotation angle values). The empty (e.g., hollow) square and circle symbols represent to the full dataset, while the solid symbols represent minumum values in the set. Horizontal lines 902 denote the best values obtained in the previous optimizations done considering the a continuous domain for rotation angle values for each L parameters. In some examples, the digitization helps in escaping local minima and achieve slightly better solutions. Diagonal lines 904 are a guide-to-the-eye and represent the functions $1/M_{digit}$ and $0.1/M_{digit}$.

Graph 900b depicted in FIG. 9B comprises an example, non-limiting alternative embodiment of graph 900a, where graph 900b illustrates the $L_\infty$ norm difference between the prepared and the target distribution as a function of the digitization mesh size $M_{digit}$ for two different circuit depts L and for the n=5 qubit case. Graph 900c depicted in FIG. 9C comprises an example, non-limiting alternative embodiment of graph 900a, where graph 900c illustrates the $L_\infty$ norm difference between the prepared and the target distribution as a function of the digitization mesh size $M_{digit}$ for two different circuit depts L and for the n=6 qubit case.

Figure 10:
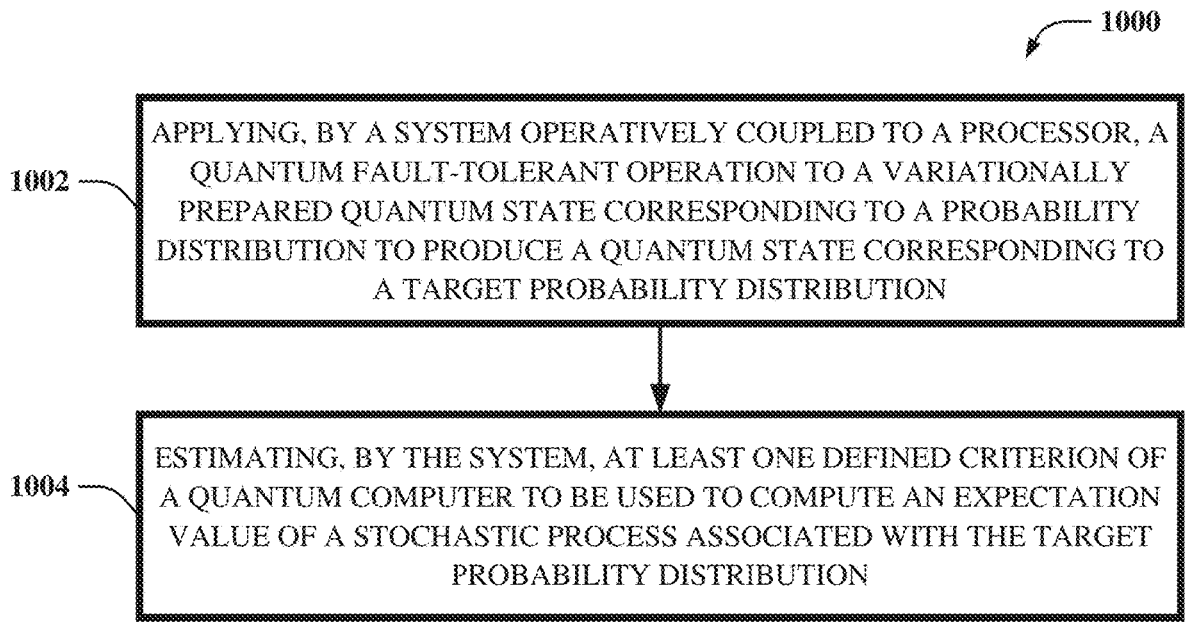
FIG. 10 illustrates a flow diagram of an example, non-limiting computer-implemented methods that can facilitate estimation of quantum resources to calculate an expectation value of a stochastic process using a re-parameterization method in accordance with one or more embodiments described herein.

FIG. 10 illustrates a flow diagram of an example, non-limiting computer-implemented method 1000 that can facilitate estimation of quantum resources to calculate an expectation value of a stochastic process using a re-parameterization method in accordance with one or more embodiments described herein. Repetitive description of like elements and/or processes employed in respective embodiments is omitted for sake of brevity.

At 1002, computer-implemented method 1000 can comprise applying, by a system (e.g., via quantum resource estimation system 102 and/or re-parameterization component 108) operatively coupled to a processor (e.g., processor 106), a quantum fault-tolerant operation to a variationally prepared quantum state corresponding to a probability distribution to produce a quantum state corresponding to a target probability distribution.

At 1004, computer-implemented method 1000 can comprise estimating, by the system (e.g., via quantum resource estimation system 102 and/or estimation component 110), at least one defined criterion of a quantum computer to be used to compute an expectation value of a stochastic process (e.g., the value of a derivative asset) associated with the target probability distribution.

Quantum resource estimation system 102 can be associated with various technologies. For example, quantum resource estimation system 102 can be associated with quantum computing technologies, quantum hardware and/or software technologies, quantum algorithm technologies, machine learning technologies, artificial intelligence technologies, cloud computing technologies, and/or other technologies.

Quantum resource estimation system 102 can provide technical improvements to systems, devices, components, operational steps, and/or processing steps associated with the various technologies identified above. For example, quantum resource estimation system 102 can: apply a quantum fault-tolerant operation to a variationally prepared quantum state corresponding to a probability distribution to produce a quantum state corresponding to a target probability distribution; and/or estimate at least one defined criterion of a quantum computer to be used to compute an expectation value of a stochastic process (e.g., the value of a derivative asset) associated with the target probability distribution. In this example, the at least one defined criterion can comprise an attribute, a condition, a property, a parameter, or a configuration of the quantum computer that enables the quantum computer to achieve a defined quantum advantage in computing the expectation value of the stochastic process (e.g., the value of a derivative asset) associated with the target probability distribution. In this example, quantum resource estimation system 102 can therefore be implemented to identify a quantum resource (e.g., a quantum computer, a quantum processor, and/or another quantum resource) that can leverage the advantage of quantum computing to calculate the expectation value of a stochastic process (e.g., the value of a derivative asset such as, for instance, an option contract), while accruing the least amount of computational costs relative to other quantum resources.

Quantum resource estimation system 102 can provide technical improvements to a processing unit (e.g., processor 106, a quantum processor, and/or another processor) associated with quantum resource estimation system 102. For example, as described above, quantum resource estimation system 102 can estimate, and therefore, can also determine the at least one defined criterion that can enable a quantum computer to leverage the advantage of quantum computing to calculate the expectation value of a stochastic process (e.g., the value of a derivative asset such as, for instance, an option contract), while accruing the least amount of computational costs relative to other quantum resources. In this example, a quantum processor in a quantum computer can be developed (e.g., engineered, designed, and/or fabricated) and/or modified such that it comprises the at least one defined criterion that can be estimated and/or identified by quantum resource estimation system 102 to enable the quantum computer to calculate the expectation value of a stochastic process (e.g., the value of a derivative asset such as, for instance, an option contract), while accruing the least amount of computational costs.

A practical application of quantum resource estimation system 102 is that it can be implemented using a classical computing device (e.g., a classical computer) to estimate at least one defined criterion that can enable a quantum computer to leverage the advantage of quantum computing to compute one or more solutions (e.g., heuristic(s)) to a variety of problems ranging in complexity (e.g., an estimation problem, an optimization problem, and/or another problem) in a variety of domains (e.g., finance, chemistry, medicine, and/or another domain). For example, a practical application of quantum resource estimation system 102 is that it can be implemented using a classical computing device (e.g., a classical computer) to estimate at least one defined criterion that can enable a quantum computer to leverage the advantage of quantum computing to compute one or more solutions (e.g., heuristic(s)) to an estimation problem and/or an optimization problem in the domain of chemistry, medicine, and/or finance, where such a solution can be used to engineer, for instance, a new chemical compound, a new medication, and/or a new option premium.

It should be appreciated that quantum resource estimation system 102 provides a new approach driven by relatively new quantum computing technologies. For example, quantum resource estimation system 102 provides a new approach to estimate at least one defined criterion that can enable a quantum computer to leverage the advantage of quantum computing to calculate an expectation value of a stochastic process (e.g., the value of a derivative asset such as, for instance, an option contract), while accruing the least amount of computational costs relative to other quantum resources.

Quantum resource estimation system 102 can employ hardware or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, and/or another type of specialized computer) to execute defined tasks related to the various technologies identified above. Quantum resource estimation system 102 and/or components thereof, can be employed to solve new problems that arise through advancements in technologies mentioned above, employment of quantum computing systems, cloud computing systems, computer architecture, and/or another technology.

It is to be appreciated that quantum resource estimation system 102 can utilize various combinations of electrical components, mechanical components, and circuitry that cannot be replicated in the mind of a human or performed by a human, as the various operations that can be executed by quantum resource estimation system 102 and/or components thereof as described herein are operations that are greater than the capability of a human mind. For instance, the amount of data processed, the speed of processing such data, or the types of data processed by quantum resource estimation system 102 over a certain period of time can be greater, faster, or different than the amount, speed, or data type that can be processed by a human mind over the same period of time.

According to several embodiments, quantum resource estimation system 102 can also be fully operational towards performing one or more other functions (e.g., fully powered on, fully executed, and/or another function) while also performing the various operations described herein. It should be appreciated that such simultaneous multi-operational execution is beyond the capability of a human mind. It should also be appreciated that quantum resource estimation system 102 can include information that is impossible to obtain manually by an entity, such as a human user. For example, the type, amount, and/or variety of information included in quantum resource estimation system 102, re-parameterization component 108, estimation component 110, variational component 202, and/or error analysis component 302 can be more complex than information obtained manually by a human user.

In some embodiments, quantum resource estimation system 102 can be associated with a cloud computing environment. For example, quantum resource estimation system 102 can be associated with cloud computing environment 1250 described below with reference to FIG. 12 and/or one or more functional abstraction layers described below with reference to FIG. 13 (e.g., hardware and software layer 1360, virtualization layer 1370, management layer 1380, and/or workloads layer 1390).

Quantum resource estimation system 102 and/or components thereof (e.g., re-parameterization component 108, estimation component 110, variational component 202, error analysis component 302, and/or another component) can employ one or more computing resources of cloud computing environment 1250 described below with reference to FIG. 12 and/or one or more functional abstraction layers (e.g., quantum software) described below with reference to FIG. 13 to execute one or more operations in accordance with one or more embodiments of the subject disclosure described herein. For example, cloud computing environment 1250 and/or such one or more functional abstraction layers can comprise one or more classical computing devices (e.g., classical computer, classical processor, virtual machine, server, and/or another classical computing device), quantum hardware, and/or quantum software (e.g., quantum computing device, quantum computer, quantum processor, quantum circuit simulation software, superconducting circuit, and/or other quantum hardware and/or quantum software) that can be employed by quantum resource estimation system 102 and/or components thereof to execute one or more operations in accordance with one or more embodiments of the subject disclosure described herein. For instance, quantum resource estimation system 102 and/or components thereof can employ such one or more classical and/or quantum computing resources to execute one or more classical and/or quantum: mathematical function, calculation, and/or equation; computing and/or processing script; algorithm; model (e.g., artificial intelligence (AI) model, machine learning (ML) model, and/or another type of model); and/or another operation in accordance with one or more embodiments of the subject disclosure described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies can alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 11:
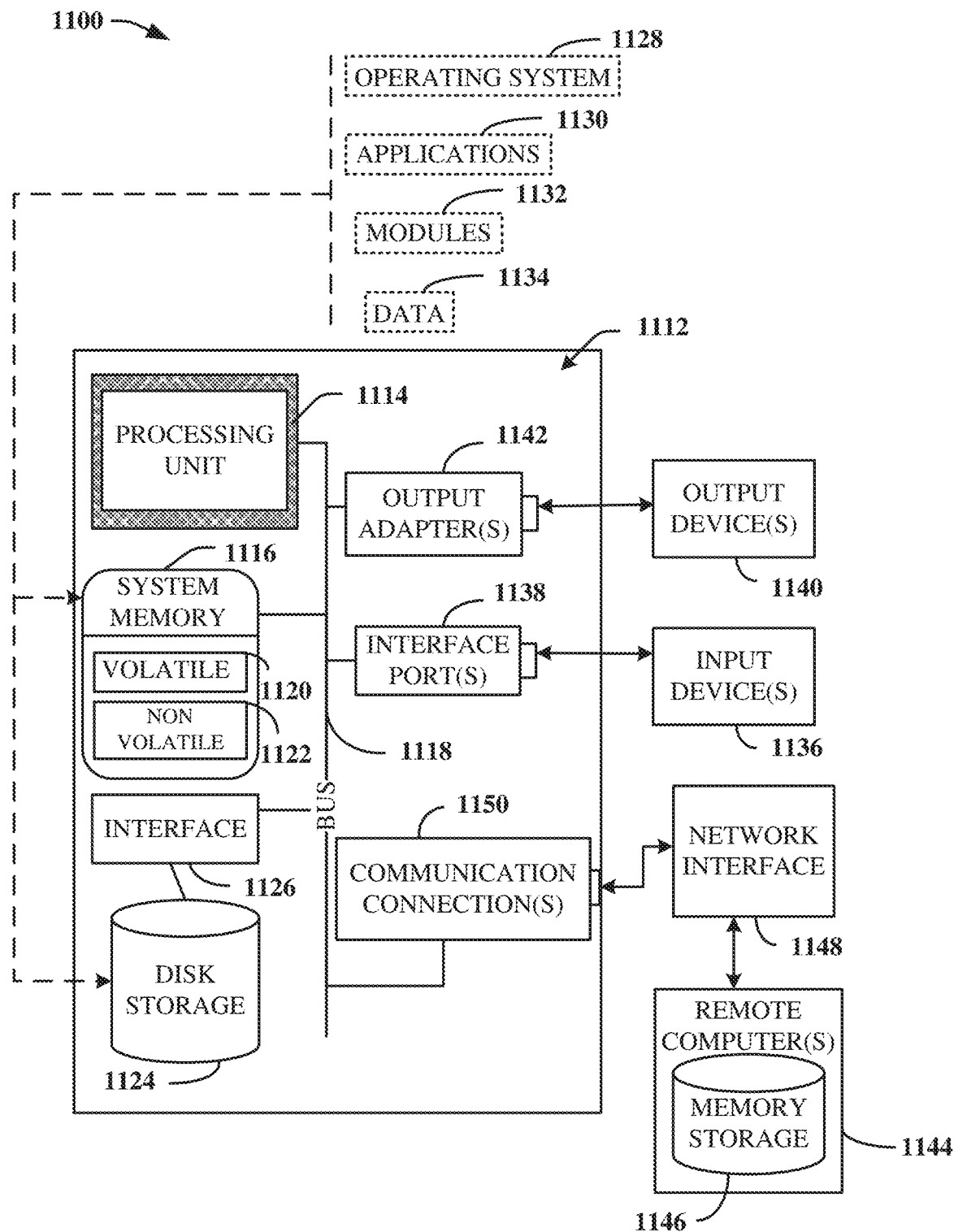
FIG. 11 illustrates a block diagram of an example, non-limiting operating environment in which one or more embodiments described herein can be facilitated.

In order to provide a context for the various aspects of the disclosed subject matter, FIG. 11 as well as the following discussion are intended to provide a general description of a suitable environment in which the various aspects of the disclosed subject matter can be implemented. FIG. 11 illustrates a block diagram of an example, non-limiting operating environment in which one or more embodiments described herein can be facilitated. Repetitive description of like elements employed in other embodiments described herein is omitted for sake of brevity.

With reference to FIG. 11, a suitable operating environment 1100 for implementing various aspects of this disclosure can also include a computer 1112. The computer 1112 can also include a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114. The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1116 can also include volatile memory 1120 and nonvolatile memory 1122. The basic input/output system (BIOS), containing the basic routines to transfer information between elements within the computer 1112, such as during start-up, is stored in nonvolatile memory 1122. Computer 1112 can also include removable/non-removable, volatile/non-volatile computer storage media. FIG. 11 illustrates, for example, a disk storage 1124. Disk storage 1124 can also include, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media. To facilitate connection of the disk storage 1124 to the system bus 1118, a removable or non-removable interface is typically used, such as interface 1126. FIG. 11 also depicts software that acts as an intermediary between users and the basic computer resources described in the suitable operating environment 1100. Such software can also include, for example, an operating system 1128. Operating system 1128, which can be stored on disk storage 1124, acts to control and allocate resources of the computer 1112.

System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems. A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140. Output adapter 1142 is provided to illustrate that there are some output devices 1140 like monitors, speakers, and printers, among other output devices 1140, which can require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a computer, a server, a router, a network PC, a workstation, a microprocessor based appliance, a peer device or other common network node and the like, and typically can also include many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, and/or another wire and/or wireless communication network. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1150 refers to the hardware/software employed to connect the network interface 1148 to the system bus 1118. While communication connection 1150 is shown for illustrative clarity inside computer 1112, it can also be external to computer 1112. The hardware/software for connection to the network interface 1148 can also include, for exemplary purposes only, internal and external technologies such as, modems including regular telephone grade modems, cable modems and DSL modems, ISDN adapters, and Ethernet cards.

Figure 12:
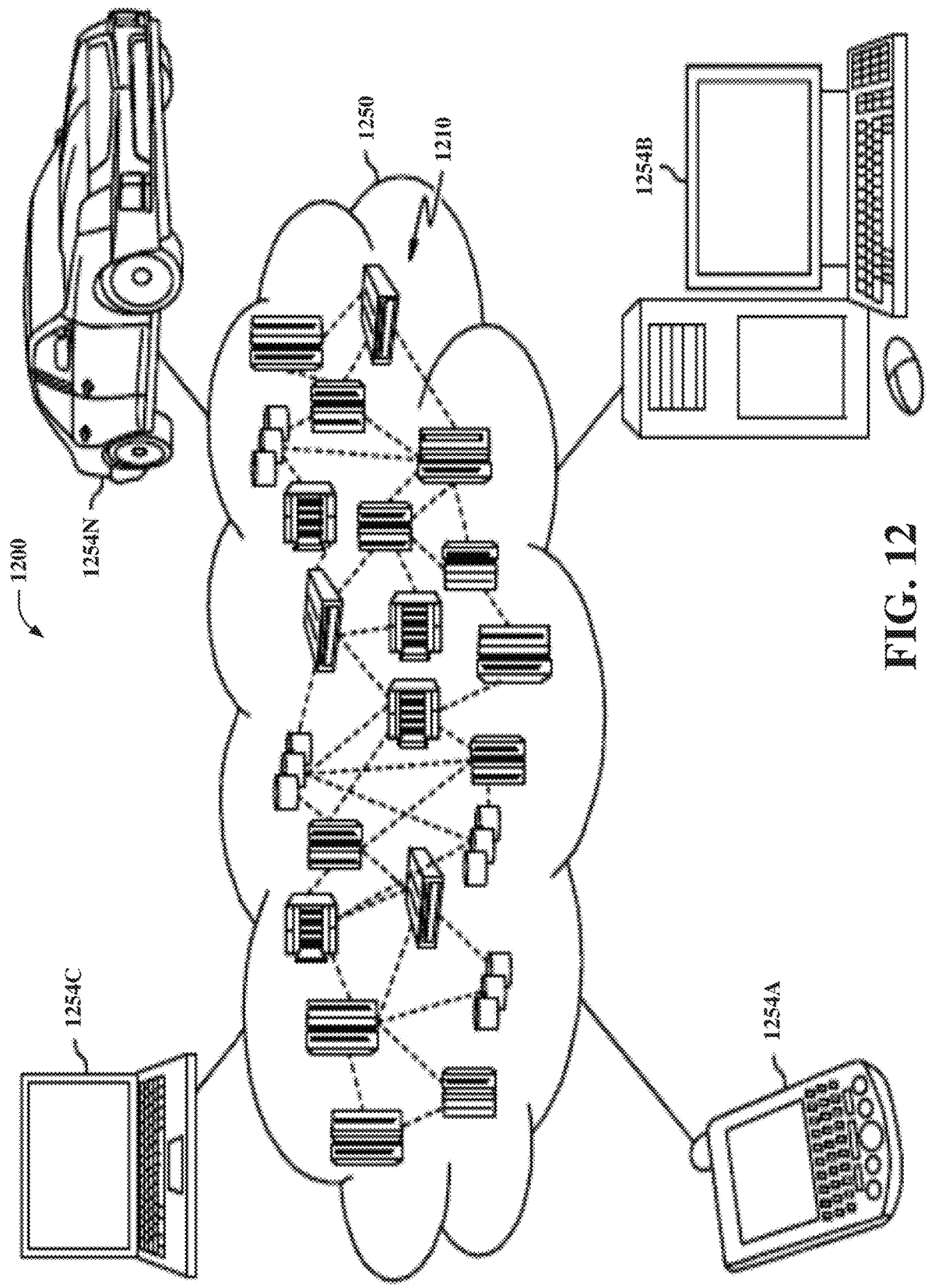
FIG. 12 illustrates a block diagram of an example, non-limiting cloud computing environment in accordance with one or more embodiments of the subject disclosure.

Referring now to FIG. 12, an illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Although not illustrated in FIG. 12, cloud computing nodes 1210 can further comprise a quantum platform (e.g., quantum computer, quantum hardware, quantum software, and/or another quantum platform) with which local computing devices used by cloud consumers can communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 12 are intended to be illustrative only and that computing nodes 1210 and cloud computing environment 1250 can communicate with any type of computerized device over any type of network and/or network addressable connection (e.g., using a web browser).

Figure 13:
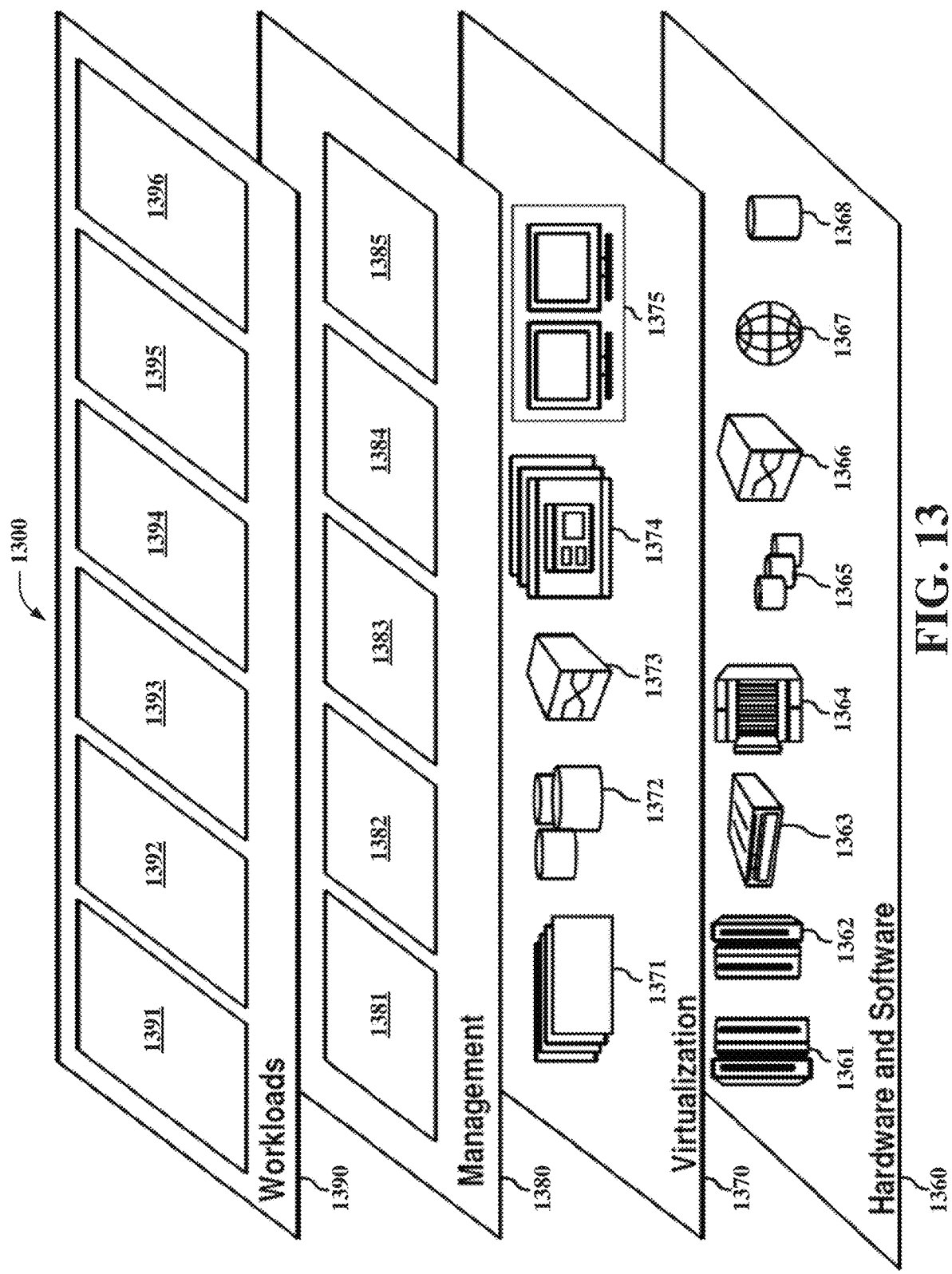
FIG. 13 illustrates a block diagram of example, non-limiting abstraction model layers in accordance with one or more embodiments of the subject disclosure.

Referring now to FIG. 13, a set of functional abstraction layers provided by cloud computing environment 1250 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 1360 includes hardware and software components. Examples of hardware components include: mainframes 1361; RISC (Reduced Instruction Set Computer) architecture based servers 1362; servers 1363; blade servers 1364; storage devices 1365; and networks and networking components 1366. In some embodiments, software components include network application server software 1367, database software 1368, quantum platform routing software (not illustrated in FIG. 13), and/or quantum software (not illustrated in FIG. 13).

Virtualization layer 1370 provides an abstraction layer from which the following examples of virtual entities may be provided: virtual servers 1371; virtual storage 1372; virtual networks 1373, including virtual private networks; virtual applications and operating systems 1374; and virtual clients 1375.

In one example, management layer 1380 may provide the functions described below. Resource provisioning 1381 provides dynamic procurement of computing resources and other resources that are utilized to perform tasks within the cloud computing environment. Metering and Pricing 1382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1383 provides access to the cloud computing environment for consumers and system administrators. Service level management 1384 provides cloud computing resource allocation and management such that required service levels are met. Service Level Agreement (SLA) planning and fulfillment 1385 provide pre-arrangement for, and procurement of, cloud computing resources for which a future requirement is anticipated in accordance with an SLA.

Workloads layer 1390 provides examples of functionality for which the cloud computing environment may be utilized. Non-limiting examples of workloads and functions which may be provided from this layer include: mapping and navigation 1391; software development and lifecycle management 1392; virtual classroom education delivery 1393; data analytics processing 1394; transaction processing 1395; and quantum resource estimation software 1396.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, and/or other program modules that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a processor that executes computer executable components stored in memory, the computer executable components comprising:
      a re-parameterization component that applies a quantum fault-tolerant operation to a variationally prepared quantum state corresponding to a probability distribution to produce a quantum state corresponding to a target probability distribution, wherein the applying the quantum fault-tolerant operation comprises:
         applying a first defined number of Gaussian operators to a second defined number of qubits, wherein the second defined number is a multiple of the first defined number by a third defined number corresponding to a length of a qubit register, and
         performing affine transformations to adjust respective centers and respective volatilities of Gaussians resulting from the applying; and
      an estimation component that estimates at least one defined criterion of a quantum computer to be used to compute an expectation value of a stochastic process associated with the target probability distribution.

2. The system of claim 1, wherein the performing the affine transformations obtains at least one of: a defined mean of the target probability distribution; a defined standard deviation of the target probability distribution; or one or more explicit parameters that specify the target probability distribution.

3. The system of claim 1, wherein the re-parameterization component applies the quantum fault-tolerant operation to the variationally prepared quantum state to prepare the quantum state as a superposition over possible paths of a discrete time multivariate stochastic process.

4. The system of claim 1, wherein the computer executable components further comprise:
   a variational component that trains a variational quantum circuit to prepare the variationally prepared quantum state and to reduce computational costs of quantum arithmetic operations performed by the quantum computer to compute the expectation value of the stochastic process associated with the target probability distribution.

5. The system of claim 1, wherein the computer executable components further comprise:
   a variational component that trains a variational quantum circuit to prepare the variationally prepared quantum state, and wherein the variational component trains the variational quantum circuit using a Hamiltonian operator to generate a ground state corresponding to the target probability distribution.

6. The system of claim 1, wherein the computer executable components further comprise:
   an error analysis component that calculates one or more errors associated with at least one of: the application of the quantum fault-tolerant operation to the variationally prepared quantum state to produce the quantum state; the estimation of the at least one defined criterion; or the computation of the expectation value of the stochastic process associated with the target probability distribution.

7. The system of claim 1, wherein the at least one defined criterion is selected from a group consisting of an attribute, a condition, a property, a parameter, or a configuration of the quantum computer that enables the quantum computer to achieve a defined quantum advantage in computing the expectation value of the stochastic process associated with the target probability distribution, and wherein the probability distribution comprises a standard normal probability distribution and the target probability distribution comprises a normal probability distribution.

8. A computer-implemented method, comprising:
   applying, by a system operatively coupled to a processor, a quantum fault-tolerant operation to a variationally prepared quantum state corresponding to a probability distribution to produce a quantum state corresponding to a target probability distribution, wherein the applying the quantum fault-tolerant operation comprises:
      applying a first defined number of Gaussian operators to a second defined number of qubits, wherein the second defined number is a multiple of the first defined number by a third defined number corresponding to a length of a qubit register, and
      performing affine transformations to adjust respective centers and respective volatilities of Gaussians resulting from the applying; and
   estimating, by the system, at least one defined criterion of a quantum computer to be used to compute an expectation value of a stochastic process associated with the target probability distribution.

9. The computer-implemented method of claim 8, wherein the performing the affine transformations obtains at least one of: a defined mean of the target probability distribution; a defined standard deviation of the target probability distribution; or one or more explicit parameters that specify the target probability distribution.

10. The computer-implemented method of claim 8, wherein the applying the quantum fault-tolerant operation to the variationally prepared quantum state prepares the quantum state as a superposition over possible paths of a discrete time multivariate stochastic process.

11. The computer-implemented method of claim 8, further comprising:
training, by the system, a variational quantum circuit to prepare the variationally prepared quantum state and to reduce computational costs of quantum arithmetic operations performed by the quantum computer to compute the expectation value of the stochastic process associated with the target probability distribution.

12. The computer-implemented method of claim 8, further comprising:
training, by the system, a variational quantum circuit to prepare the variationally prepared quantum state; and
training, by the system, the variational quantum circuit using a Hamiltonian operator to generate a ground state corresponding to the target probability distribution.

13. The computer-implemented method of claim 8, further comprising:
calculating, by the system, one or more errors associated with at least one of: the application of the quantum fault-tolerant operation to the variationally prepared quantum state to produce the quantum state; the estimation of the at least one defined criterion; or the computation of the expectation value of the stochastic process associated with the target probability distribution.

14. The computer-implemented method of claim 8, wherein the at least one defined criterion is selected from a group consisting of an attribute, a condition, a property, a parameter, or a configuration of the quantum computer that enables the quantum computer to achieve a defined quantum advantage in computing the expectation value of the stochastic process associated with the target probability distribution, and wherein the probability distribution comprises a standard normal probability distribution and the target probability distribution comprises a normal probability distribution.

15. A computer program product comprising a computer readable storage medium having program instructions embodied therewith, the program instructions executable by a processor to cause the processor to:
apply a quantum fault-tolerant operation to a variationally prepared quantum state corresponding to a probability distribution to produce a quantum state corresponding to a target probability distribution, wherein the applying the quantum fault-tolerant operation comprises:
applying a first defined number of Gaussian operators to a second defined number of qubits, wherein the second defined number is a multiple of the first defined number by a third defined number corresponding to a length of a qubit register, and
performing affine transformations to adjust respective centers and respective volatilities of Gaussians resulting from the applying; and
estimate at least one defined criterion of a quantum computer to be used to compute an expectation value of a stochastic process associated with the target probability distribution.

16. The computer program product of claim 15, wherein the performing the affine transformations obtains at least one of: a defined mean of the target probability distribution; a defined standard deviation of the target probability distribution; or one or more explicit parameters that specify the target probability distribution.

17. The computer program product of claim 15, wherein the applying the quantum fault-tolerant operation to the variationally prepared quantum state prepares the quantum state as a superposition over possible paths of a discrete time multivariate stochastic process.

18. The computer program product of claim 15, wherein the program instructions are further executable by the processor to cause the processor to:
train a variational quantum circuit to prepare the variationally prepared quantum state and to reduce computational costs of quantum arithmetic operations performed by the quantum computer to compute the expectation value of the stochastic process associated with the target probability distribution.

19. The computer program product of claim 15, wherein the program instructions are further executable by the processor to cause the processor to:
train a variational quantum circuit to prepare the variationally prepared quantum state; and
train the variational quantum circuit using a Hamiltonian operator to generate a ground state corresponding to the target probability distribution.

20. The computer program product of claim 15, wherein the program instructions are further executable by the processor to cause the processor to:
calculate one or more errors associated with at least one of: the application of the quantum fault-tolerant operation to the variationally prepared quantum state to produce the quantum state; the estimation of the at least one defined criterion; or the computation of the expectation value of the stochastic process associated with the target probability distribution.

* * * * *